(12) United States Patent
Aoshima et al.

(10) Patent No.: US 6,343,185 B1
(45) Date of Patent: Jan. 29, 2002

(54) LENS CLEANING APPARATUS AND METHOD AND RECYCLING APPARATUS AND METHOD FOR LENS-FITTED PHOTO FILM UNIT

(75) Inventors: Shinsuke Aoshima; Shoichi Uchida; Masaya Morita; Yoshihiro Tominaga; Yukihiko Yamaguchi; Ryo Mori, all of Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 09/426,720

(22) Filed: Oct. 26, 1999

(30) Foreign Application Priority Data

| Oct. 26, 1998 | (JP) | ................................ 10-304212 |
| Nov. 19, 1998 | (JP) | ................................ 10-329150 |
| Nov. 19, 1998 | (JP) | ................................ 10-329151 |
| Nov. 19, 1998 | (JP) | ................................ 10-329503 |
| Nov. 19, 1998 | (JP) | ................................ 10-329504 |
| Nov. 19, 1998 | (JP) | ................................ 10-329505 |

(51) Int. Cl.[7] ............................................. G03B 17/02
(52) U.S. Cl. ................................... 396/6; 396/661
(58) Field of Search ....................... 396/6, 429, 661

(56) References Cited

U.S. PATENT DOCUMENTS 5,615,395 A * 3/1997 Komaki et al. ................ 396/6

5,659,491 A * 8/1997 Ichikawa et al. .............. 702/65

FOREIGN PATENT DOCUMENTS

| JP | 8-211565 | 8/1996 | ............ G03C/3/00 |
| JP | 10-62915 | 3/1998 | ............ G03C/3/00 |

* cited by examiner

Primary Examiner—Russell Adams
Assistant Examiner—Arthur A Smith
(74) Attorney, Agent, or Firm—Sughrue Mion, PLLC

(57) ABSTRACT

A taking lens of a used lens-fitted photo film unit is cleaned according to sequential steps for recycling. A cleaning head is caused to press a loosened cleaning tape against the taking lens. While the cleaning tape is pressed against the taking lens, the cleaning head is moved, to wipe the taking lens with the cleaning tape. Furthermore, before wiping with the cleaning tape, the taking lens may be brushed by rotating the cleaning head back and forth. In a preferred embodiment, a recycling apparatus includes a disassembly line which disassembles the lens-fitted photo film unit after removal of a cassette shell with photo film being exposed. A main body is obtained with at least a cassette shutter closing mechanism for a cassette shutter and a frame counter mechanism. Furthermore, an inspection line inspects operation of the mechanical parts and a cleaning line cleans at least a viewfinder lens.

40 Claims, 43 Drawing Sheets

FIG. 24A
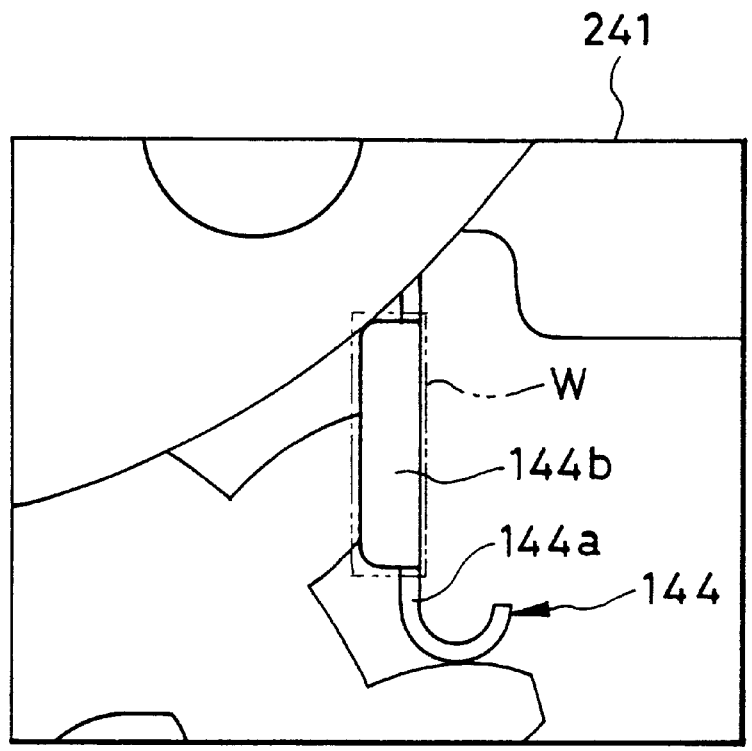
FIG. 24B    FIG. 24C
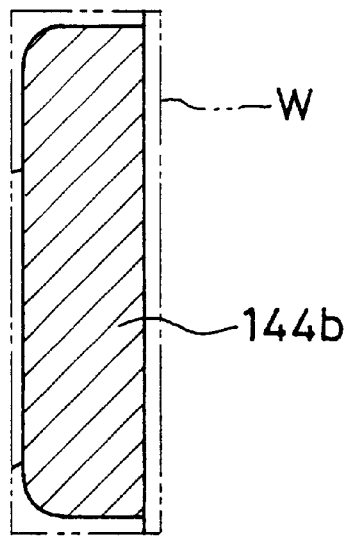 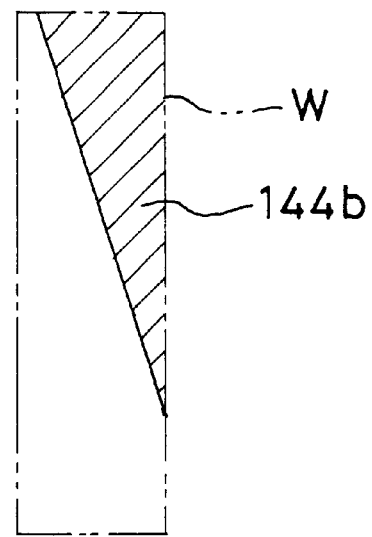

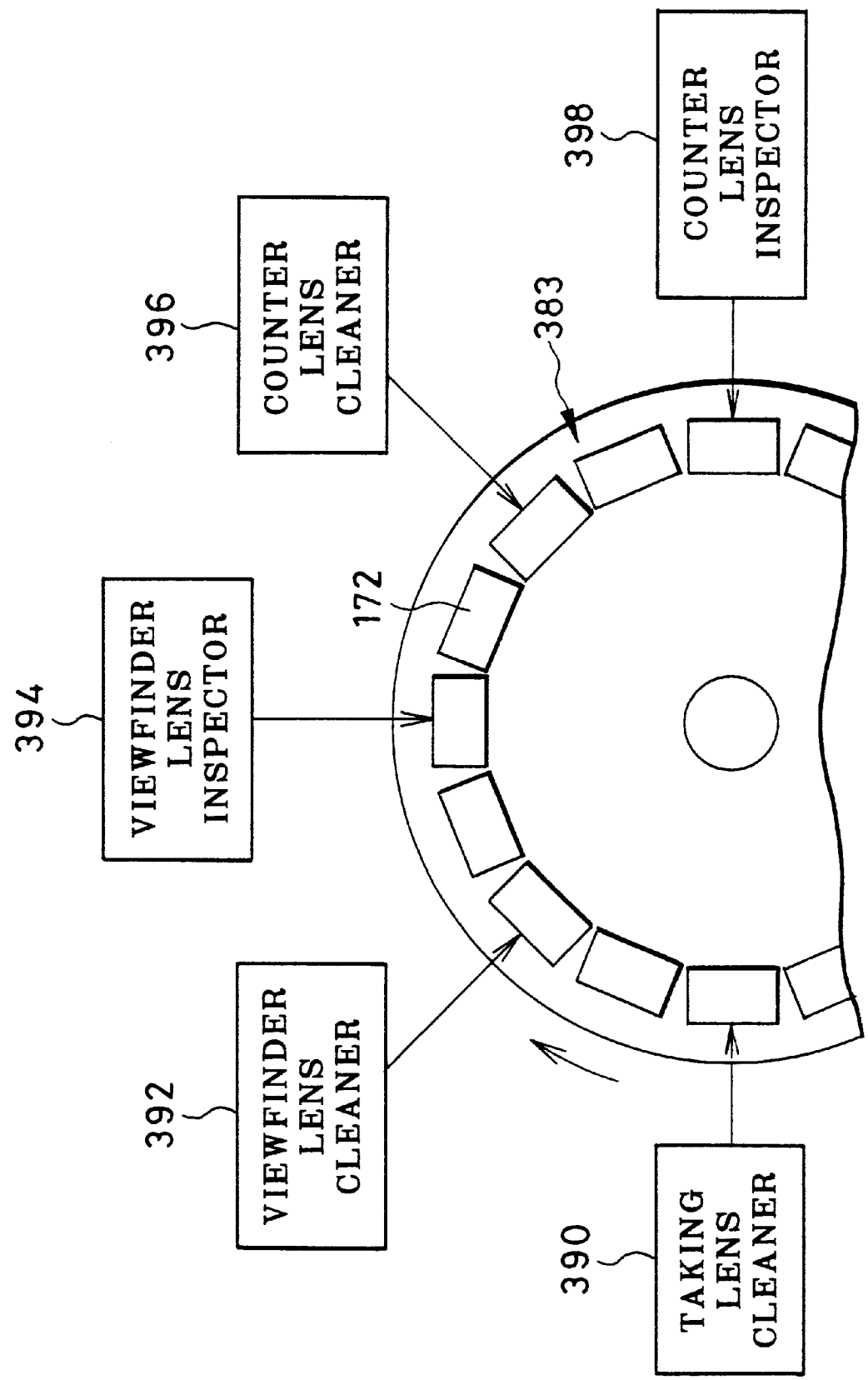

LENS CLEANING APPARATUS AND METHOD AND RECYCLING APPARATUS AND METHOD FOR LENS-FITTED PHOTO FILM UNIT

BACKGROUND OF THE INVENTION

1. Field of the Invention

The present invention relates to a lens cleaning apparatus and method and a recycling apparatus and method for a lens-fitted photo film unit. More particularly, the present invention relates to a lens cleaning apparatus and method in which a taking lens of a used lens-fitted photo film unit can be effectively cleaned for the purpose of recycling, and a recycling apparatus and method for a lens-fitted photo film unit.

2. Description Related to the Prior Art

Lens-fitted photo film units of various kinds are sold in the market. Each lens-fitted photo film unit is pre-loaded with photo film, and incorporates a simple structure for taking an exposure. The lens-fitted photo film unit is constituted by various parts including a main body, an exposure unit, an electronic flash unit, a front cover, a rear cover and an outer belt. The main body is loaded with the photo film. The exposure unit is a component provided with a taking lens and a shutter mechanism. The flash unit includes a flash circuit and a flash emitter. The front cover covers a front face of the main body. The rear cover covers a rear face of the main body. The outer belt is wound about and attached to the front and rear covers.

The lens-fitted photo film unit, after a user forwards it to a photo laboratory for development and printing, is withdrawn collectively in a great scale, and recycled in recycling factories of each manufacturer. To be precise, the front and rear covers are likely to have considerable dirt or scratches on the outside of the lens-fitted photo film unit, and are collapsed and pelletized to be reused as raw material for plastic parts. The main body, the exposure unit and the flash unit mounted on the main body are also reused after being subjected to cleaning and inspection.

The taking lens is always located in an outer face of the lens-fitted photo film unit, and is also likely to have dust or scratches. However the taking lens is cleaned and reused, chiefly because of its higher cost than other plastic parts of the lens-fitted photo film unit. The taking lens is cleaned by use of ultrasonic waves after being removed from the exposure unit. In general, most of the dirt or dust of the taking lens is located only on its surface. JP-A 10-62915 suggests a device for cleaning the taking lens mounted on the exposure unit for the purpose of reducing the recycling cost. A cleaning head is used with a cleaning tape, and the cleaning head causes the cleaning tape to wipe the taking lens on the exposure unit.

To clean the taking lens as mounted on the exposure unit, a cleaning head is rotated while tension is applied to the cleaning tape. However this method has a shortcoming in that the entirety of the cleaning device must be rotated or that the exposure unit on a pallet must be rotated. A cost for relevant recycling equipments is high due to the structural complexity.

To feed the cleaning tape in a continuous shape by a predetermined length, a dancer roller, a photoelectric sensor and the like are used, the sensor detecting a moved position of the dancer roller. But if a cleaning apparatus is provided with those mechanisms, a recycling cost of the lens-fitted photo film unit is further increased.

SUMMARY OF THE INVENTION

In view of the foregoing problems, an object of the present invention is to provide a lens cleaning apparatus and method in which a taking lens of a used lens-fitted photo film unit can be effectively cleaned, and a recycling apparatus and method for a lens-fitted photo film unit.

Another object of the present invention is to provide a recycling apparatus and method for a lens-fitted photo film unit in which mechanical parts of the lens-fitted photo film unit can be readjusted efficiently and effectively at a low cost for recycling.

Still another object of the present invention is to provide a recycling apparatus and method for a lens-fitted photo film unit in which its cassette shutter closing mechanism can be readjusted effectively for recycling.

Another object of the present invention is to provide a recycling apparatus and method for a lens-fitted photo film unit in which a resilient member incorporated therein can be inspected effectively for recycling.

A further object of the present invention is to provide a recycling apparatus and method for a lens-fitted photo film unit in which its frame counter mechanism can be readjusted effectively for recycling.

Another object of the present invention is to provide a recycling apparatus and method for a lens-fitted photo film unit in which inspecting/readjusting processes can be protected from influences of dust or particles created from cleaning processes.

In order to achieve the above and other objects and advantages of this invention, a taking lens of a lens-fitted photo film unit is cleaned by the following steps. Loosened cleaning tape is opposed to the taking lens. A cleaning head is caused to press the cleaning tape against the taking lens. While the cleaning tape is pressed against the taking lens, the cleaning head is moved, to wipe the taking lens with the cleaning tape.

In a preferred embodiment, a tape feed unit is operable in a conveying step and a cleaning step alternately, the tape feed unit, when in the conveying step, conveys cleaning tape past a position of the taking lens, and when in the cleaning step, loosens a portion of the cleaning tape opposed to the taking lens. A cleaning head presses the cleaning tape against the taking lens and moves when the tape feed unit is in the cleaning step, to wipe the taking lens.

The tape feed unit includes a first roller disposed upstream from the cleaning head, the cleaning head being supplied with the cleaning tape after contact with the first roller. A second roller is disposed downstream from the cleaning head, the cleaning tape being withdrawn from the cleaning head before contact with the second roller. A cleaner holder is provided with the first and second rollers and the cleaning head is mounted thereon. A third roller is disposed between the first roller and the cleaning head, for contacting the cleaning tape. A fourth roller is disposed between the second roller and the cleaning head, for contacting the cleaning tape. A moving mechanism moves the cleaner holder to a retracted position when in the conveying step, and to a cleaning position when in the cleaning step, wherein when the cleaner holder is in the retracted position, the cleaning head is located farther from the taking lens than the third and fourth rollers, and when the cleaner holder is in the cleaning position, the cleaning tape is loosened between the first and second rollers, and the cleaning head advances toward the taking lens relative to the third and fourth rollers, presses the loosened cleaning tape against the taking lens, and rotates back and forth.

Furthermore, there is a supply reel about which the cleaning tape being unused is wound in a roll form, and which supplies the first roller with the cleaning tape. A winder reel winds the cleaning tape from the second roller in a roll form. A stationary stand is disposed in a stationary manner, for supporting the cleaner holder movably, the stationary stand being provided with the third and fourth rollers mounted thereon.

Furthermore, a brush device is actuated before wiping with the cleaning head, for moving in contact with the taking lens to brush the taking lens.

Thus, by the use of the loosened cleaning tape, the taking lens of the used lens-fitted photo film unit can be effectively cleaned.

According to one aspect of the present invention, an apparatus for a lens-fitted photo film unit is provided. The lens-fitted photo film unit includes a main body, having a cassette holder chamber and a roll holder chamber. A photo film cassette shell is contained in the cassette holder chamber. Photo film is previously drawn from the cassette shell, wound in a roll form, and contained in the roll holder chamber. A shutter mechanism is disposed in the main body, for providing a frame of the photo film with an exposure. A frame counter mechanism is disposed in the main body, has a train of numbers, for counting by designating a portion of the number train each time that the frame is exposed. A spool is contained in the cassette shell rotatably, for winding the photo film thereabout. A photo film passageway is formed in the cassette shell, for passage of the photo film being wound. A cassette shutter is disposed in the photo film passageway rotatably, for closing the photo film passageway openably. A cassette shutter closing mechanism is disposed in the main body, connected with the cassette shutter, and while the photo film is passed through the photo film passageway, shifted in a shutter opening position, for keeping the cassette shutter open, and after the photo film is entirely wound into the cassette shell, shifted in a shutter closing position, for closing the cassette shutter. The recycling apparatus includes a disassembly line for disassembling the lens-fitted photo film unit after removal of the cassette shell and the photo film, so as to obtain the main body with at least the cassette shutter closing mechanism and the frame counter mechanism. A closing mechanism setter device sets the cassette shutter closing mechanism in the shutter opening position. A counter setter device sets the frame counter mechanism in an initial position thereof, the frame counter mechanism, when in the initial position, designating an initial one of the numbers in the train.

By the construction that readjusts the cassette shutter closing mechanism and the frame counter mechanism, the mechanical parts of the lens-fitted photo film unit can be readjusted efficiently and effectively at a low cost for recycling.

According to another aspect of the present invention, the cassette shutter closing mechanism includes a cassette shutter closing member, disposed rotatably, and engaged with an axial end of the cassette shutter. The lens-fitted photo film unit further includes a bias member for biasing the cassette shutter closing member toward the shutter closing position. A lock lever is disposed in the main body in a pivotally movable manner, the lock lever, when in an opening shifted position, retaining the cassette shutter closing member in the shutter opening position, and when in a closing shifted position, allowing the cassette shutter closing member to rotate to the shutter closing position. A detection gear is disposed in the main body, has a toothed wheel portion and a cam wheel portion coaxial therewith, the toothed wheel portion being rotated in response to winding of the photo film by the frame, wherein the cam wheel portion, when offset from a predetermined rotational position, retains the lock lever in the opening shifted position, and when in the predetermined rotational position, allows the lock lever to rotate to the closing shifted position, the cam wheel portion comes in the predetermined rotational position when all frames of the photo film are wound. The closing mechanism setter device includes a closing member setter, operated for the main body positioned in a predetermined orientation, for rotating the cassette shutter closing member from the shutter closing position to the shutter opening position against the bias member, so as to open the cassette shutter. A lock lever setter swings the lock lever to the opening shifted position, to engage the lock lever with the cassette shutter closing member, so as to keep the cassette shutter closing member in the shutter opening position. A detection gear setter sets the detection gear in an initial rotational position by rotation thereof, the cam wheel portion being offset from the predetermined rotational position when the detection gear is in the initial rotational position.

In a preferred embodiment, a periphery of the toothed wheel portion has a toothed section and a toothless arc-shaped section, the toothed section, when in a predetermined meshing rotational position, being rotated by winding of the frame of the photo film, the toothless arc-shaped section being rotated to the meshing rotational position by winding of all frames of the photo film, for preventing the toothed wheel portion from rotating further. The detection gear setter rotates the toothed wheel portion to move the toothless arc-shaped section past the meshing rotational position, so as to set one end of the toothed section in the meshing rotational position, the detection gear thereby being set in the initial rotational position.

By the construction of setting positions of the cassette shutter closing member, the lock lever and the detection gear, the cassette shutter closing mechanism can be readjusted effectively for recycling.

According to still another aspect of the present invention, the lens-fitted photo film unit further includes at least one outer cover mounted outside the main body. A resilient member is disposed in the main body and covered by the outer cover. Furthermore, a pick-up unit picks up the resilient member while the resilient member is partially uncovered externally after removal of the outer cover from the main body, to obtain shape information representing a shape of the resilient member. A comparator effects comparison to check whether the shape information is within a predetermined acceptable range. A discriminator determines that the resilient member is unacceptable if the shape information is outside the acceptable range, so as to discriminate the main body having the resilient member being unacceptable.

In a preferred embodiment, the lens-fitted photo film unit includes a one-toothed gear, having a single tooth, and rotated in response to winding of the frame of the photo film. A speed reduction gear is rotated by the single tooth. The cassette shutter closing mechanism includes a cassette shutter closing member, disposed rotatably, engaged with an axial end of the cassette shutter, and rotated to the shutter closing position by rotating force transmitted by the speed reduction gear. The resilient member is a plate spring associated with the speed reduction gear, the plate spring, when the speed reduction gear is disengaged from the single tooth, keeps the speed reduction gear rotationally stopped by pressing the speed reduction gear, and when the speed reduction gear is meshed with the single tooth, becomes deformed to allow the speed reduction gear to rotate. The disassembly line removes the one-toothed gear from the speed reduction gear before the pick-up unit operates.

By the construction for picking up the image of the resilient member and for evaluating the same, the resilient member can be inspected effectively for recycling.

According to another aspect of the present invention, the photo film has a train of perforations. The lens-fitted photo film unit includes a sprocket wheel, disposed in the main body, meshed with the perforations in the photo film, and rotated by a predetermined amount each time that the photo film is moved by the frame. A charge cam projection portion is disposed to be rotatable with the sprocket wheel. A shutter drive mechanism is disposed in the main body, shiftable between a charge state and a release state, shifted to the charge state by the charge cam projection portion in response to movement of the photo film by the frame, and shifted to the release state in response to a releasing operation, for driving the shutter mechanism. A drive gear is disposed to be rotatable with the sprocket wheel. The frame counter mechanism includes a rotatable counter disk provided with the number train. A stepping tooth train of plural stepping teeth are formed on a periphery of the counter disk, meshed with the drive gear, and rotated by the drive gear at a predetermined angle in response to movement of the photo film by the frame, for stepping the number train by one. The stepping tooth train includes a first tooth and a final tooth, the first tooth being meshed with the drive gear when the counter disk is in the initial position, and the final tooth is meshed with the drive gear when frames of the photo film are exposed to use up the photo film. A toothless arc-shaped portion is formed on the periphery of the counter disk, extended between the final and first teeth, for rendering the counter disk free from the drive gear when opposed to the drive gear. The counter setter device includes a counter setter, operated after the main body is positioned, for rotating the counter disk while the toothless arc-shaped portion is opposed to the drive gear, to cause the first tooth to contact the drive gear. A sprocket wheel setter rotates the sprocket wheel by the predetermined amount, to mesh the first tooth with the drive gear by rotation of the drive gear, so as to shift the shutter drive mechanism to the charge state. A first drive mechanism setter is operated after the sprocket wheel setter sets the sprocket wheel, for shifting the shutter drive mechanism to the release state.

In a preferred embodiment, the lens-fitted photo film unit further includes a sector-shaped lock portion, disposed on the counter disk, retained by a part of the shutter drive mechanism while the shutter dive mechanism is in a release state after all frames of the photo film is wound, for blocking rotation of the counter disk. Furthermore, a second drive mechanism setter shifts the shutter drive mechanism to the charge state before the counter setter rotates the counter disk, for unlocking the sector-shaped lock portion from the shutter drive mechanism.

Furthermore, a third drive mechanism setter is operated after the counter setter rotates the counter disk, for shifting the shutter drive mechanism to the release state.

By the construction for setting the positions of the counter disk, the sprocket wheel and the shutter drive mechanism, the frame counter mechanism can be readjusted effectively for recycling.

According to a further aspect of the present invention, the lens-fitted photo film unit includes a taking lens, a viewfinder lens, and plural mechanical parts. The recycling apparatus includes an inspection line for inspecting operation of the mechanical parts. A cleaning line cleans at least the viewfinder lens. A conveyor conveys the lens-fitted photo film unit between the inspection line and the cleaning line.

In a preferred embodiment, the conveyor conveys the lens-fitted photo film unit from the inspection line to the cleaning line.

The lens-fitted photo film unit further includes a counter lens, mounted in the main body, for covering the frame counter mechanism in an externally observable manner and for enlarging an image thereof. The cleaning line includes a first cleaner for cleaning the taking lens. A second cleaner cleans the viewfinder lens. A first inspector optically inspects the viewfinder lens. A third cleaner cleans the counter lens. A second inspector optically inspects the counter lens.

By the construction with the cleaning line separate from the inspection line, inspecting/readjusting processes can be protected from influences of dust or particles created from cleaning processes.

BRIEF DESCRIPTION OF THE DRAWINGS

The above objects and advantages of the present invention will become more apparent from the following detailed description when read in connection with the accompanying drawings, in which:

FIG. 24A is an explanatory view illustrating a monitor screen for displaying a shape of the plate spring;

FIG. 24B is an explanatory view illustrating an acceptable state of the plate spring;

FIG. 24C is an explanatory view illustrating a failing state of the plate spring with a deformation;

FIG. 44 is an explanatory view in plan, illustrating a construction for the cleaning sequence.

DETAILED DESCRIPTION OF THE PREFERRED EMBODIMENT(S) OF THE PRESENT INVENTION

Figure 1:
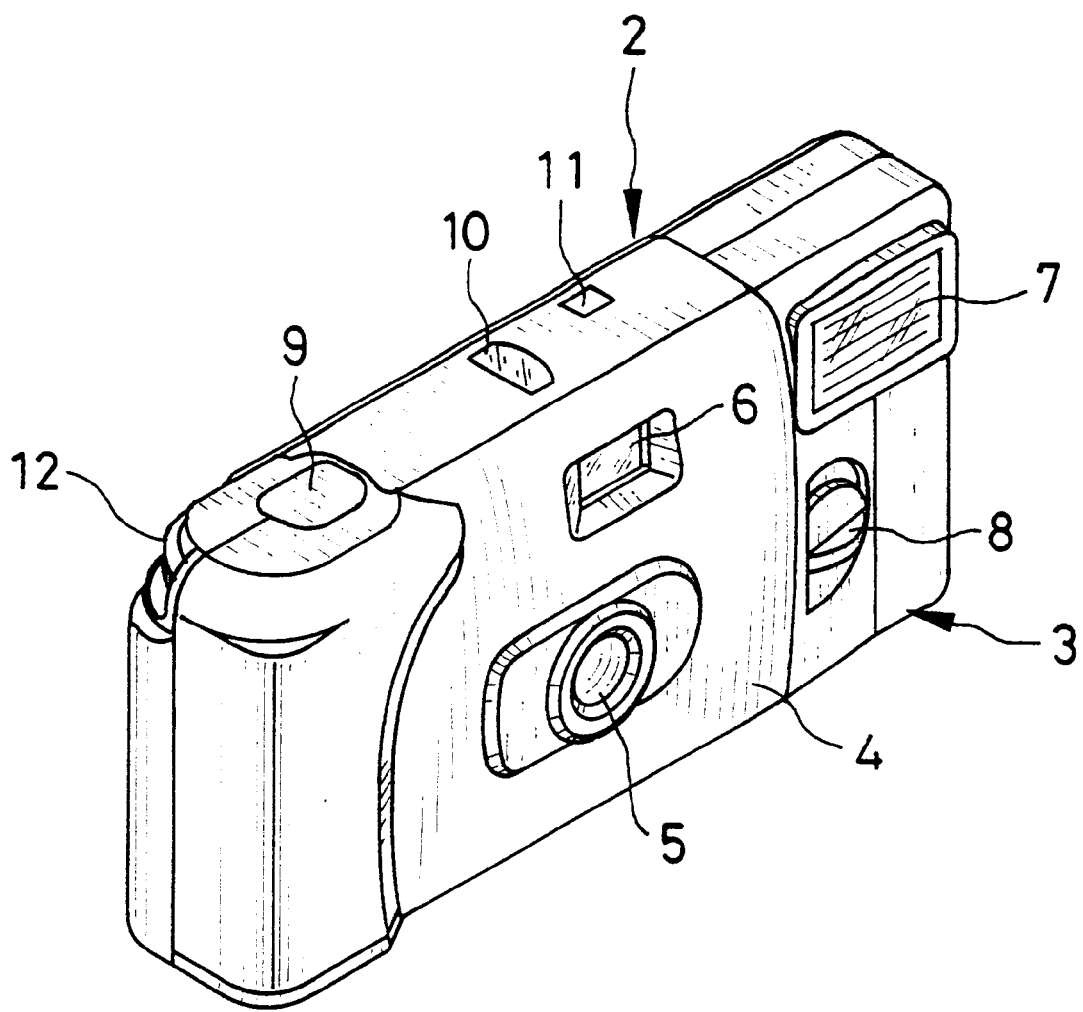
FIG. 1 is a perspective illustrating a lens-fitted photo film unit.

In FIG. 1, a lens-fitted photo film unit (e.g., a disposable camera) 2 is illustrated. The lens-fitted photo film unit 2 is constituted by a housing 3 pre-loaded with photo film and incorporating various mechanical parts, and a plastic belt 4 attached to the outside of the lens-fitted photo film unit 2. The front of the housing 3 is provided with a taking lens 5, a viewfinder window 6, a flash emitter 7 and a flash charger button 8. The top of the housing 3 is provided with a shutter release button 9, a frame counter window 10 and a light guide member 11 for indication of finish of charge. A winder wheel 12 partially emerges through the rear wall of the housing 3, to be used for winding of photo film.

Figure 2:
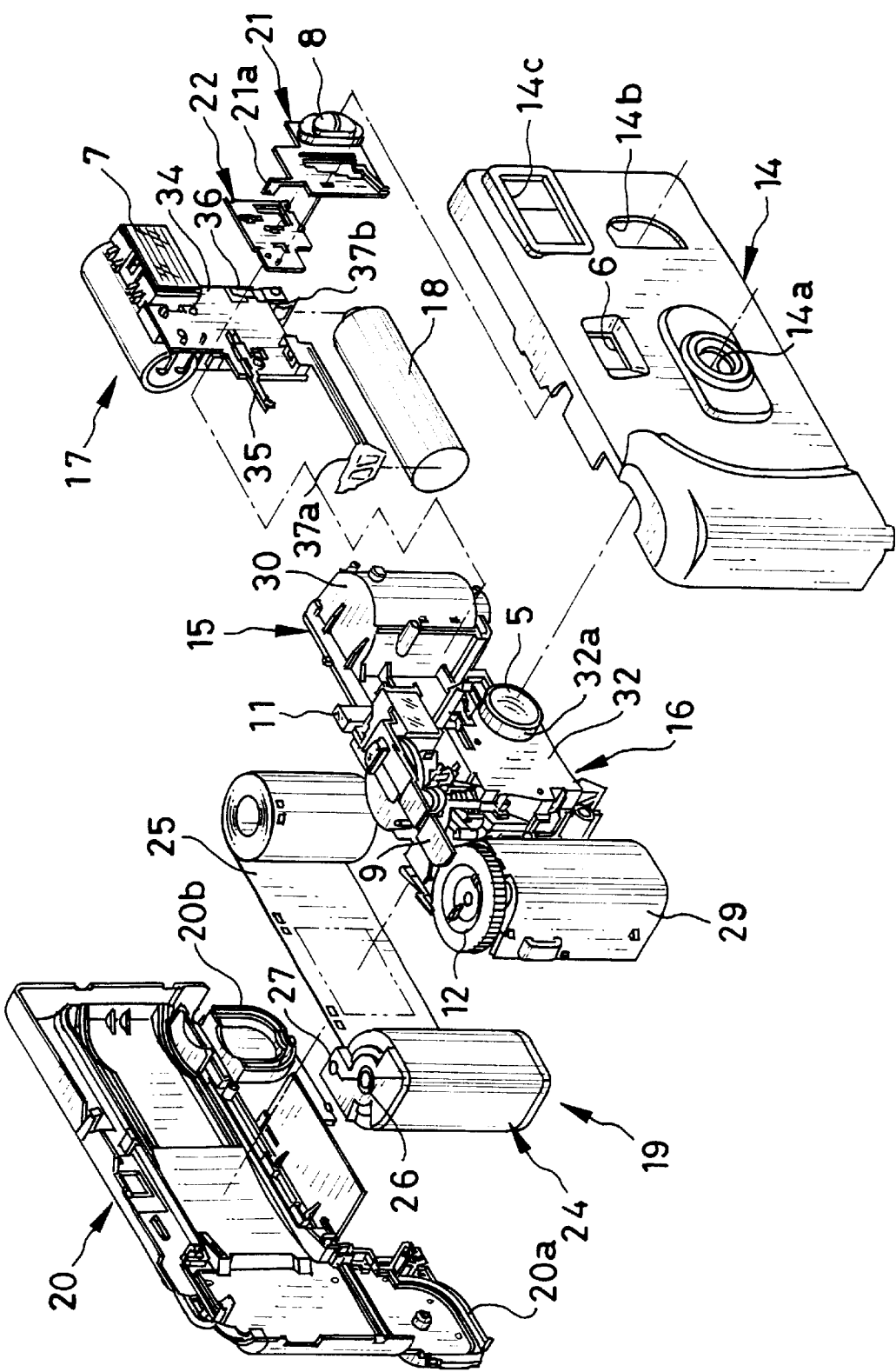
FIG. 2 is an exploded perspective illustrating the lens-fitted photo film unit.

In FIG. 2, the housing 3 includes a front cover 14 or outer cover, a main body 15, an exposure unit 16, an electronic flash unit 17, a dry battery 18, a photo film cassette 19, a rear cover 20 or outer cover, a switch plate 21 and a receiver plate 22. The photo film cassette 19 is the IX240 type, and is constituted by a photo film cassette shell 24 and a roll of photo film 25 contained in the cassette shell 24. The cassette shell 2 accommodates a spool 26 and a cassette shutter 27. The photo film 25 is wound about the spool 26. The cassette shutter 27 has a rod shape, is disposed in an inner position of the photo film passageway, and is rotatable to open and close the passageway. An axial end of the cassette shutter 27 appears through an end face of the cassette shell 24, and is rotated externally.

There are a cassette holder chamber 29 and a roll holder chamber 30 formed in the main body 15. The cassette holder chamber 29 contains the cassette shell 24. The roll holder chamber 30 contains the photo film 25 which is drawn from the cassette shell 24 and wound in a form of a roll. A light-shielded tunnel and an exposure aperture are disposed between the cassette holder chamber 29 and the roll holder chamber 30. The light-shielded tunnel defines a photographic light path in a state shielded from ambient light. The exposure aperture is located at the rear of the light-shielded tunnel. The exposure unit 16 is secured to the front face of the light-shielded tunnel. The battery 18 for a power source of the flash unit 17 is contained under the light-shielded tunnel.

The winder wheel 12 is mounted on the top of the cassette holder chamber 29 in a rotatable manner. The winder wheel 12 is provided with an engaging shaft (not shown), which is engaged with the spool 26 of the cassette shell 24. When the winder wheel 12 is manually rotated, the photo film 25 being unexposed is drawn from the roll holder chamber 30 and set at an exposure aperture in the rear of the exposure unit 16. At the same time, an exposed portion of the photo film 25 is wound into the cassette shell 24. There is a cassette shutter closing mechanism under the winder wheel 12 on the top of the cassette holder chamber 29, for closing the cassette shutter 27 of the cassette shell 24 upon detecting a rotating amount of the winder wheel 12 corresponding to winding the entirety of the photo film 25 into the cassette shell 24.

The exposure unit 16 has a combined shape, and is constituted by the taking lens 5, a viewfinder lens including an objective lens element and an ocular lens element, the shutter release button 9, the light guide member 11, a shutter releasing mechanism, a shutter charging mechanism, a one-frame advancing mechanism, and a frame counter mechanism. A lens-holder/shutter-cover 32 is secured to the front face of the exposure unit 16. The taking lens 5 is supported in a lens holder ridge 32a of the lens-holder/shutter-cover 32. The lens-holder/shutter-cover 32 is tightly kept fixed by the inner face of the front cover 14 without dropping away. In relation to the lens-fitted photo film unit 2, the main body 15 is reused in a state including the exposure unit 16 and the cassette shutter closing mechanism after elimination of the shutter release button 9 and the light guide member 11.

The flash unit 17 is constituted by a printed circuit board 34 and the flash emitter 7. The printed circuit board 34 consists of a flash circuit and includes various electrical parts. The flash emitter 7 includes an electronic flash tube, a reflector, a diffusion plate and the like. The printed circuit board 34 includes a synchro switch 35 and a charger switch 36. The synchro switch 35 is turned on upon a releasing operation of the shutter release mechanism in the exposure unit 16, and emits flash light. The charger switch 36 is turned on and off by sliding operation of the flash charger button 8. A pair of contact segments 37a and 37b are mounted on the bottom of the printed circuit board 34, and connects the battery 18 to the flash circuit. In a disassembly line, the flash unit 17 is removed from the main body 15, and subjected to inspection and cleaning before being reused.

The rear cover 20 is secured to the rear of the main body 15. Bottom lids 20a and 20b are formed with the rear cover 20 to close bottom openings of the cassette holder chamber 29 and the roll holder chamber 30. The bottom lids 20a and 20b are closed after fitting the rear cover 20 on the main body 15, to keep the cassette holder chamber 29 and the roll holder chamber 30 closed in a light-tight manner. The bottom lid 20a is opened in a photo laboratory for removing the photo film cassette 19. After the disassembly of the lens-fitted photo film unit 2, the rear cover 20 is collapsed and pelletized to be recycled as raw material used for the rear cover 20.

The front cover 14 is provided with a lens opening 14a and openings 14b and 14c. The lens opening 14a is positioned in front of the taking lens 5. The opening 14b is positioned in front of the flash charger button 8. The opening 14c is positioned in front of the flash emitter 7. The front cover 14 is secured to the front of the main body 15 to cover the exposure unit 16 and the flash unit 17. The front cover 14 is removed in the disassembly line from the main body 15, and collapsed and pelletized to be recycled as raw material for newly producing the front cover 14.

The switch plate 21 and the receiver plate 22 are disposed between the flash unit 17 and the front cover 14. The switch plate 21 has the flash charger button 8 formed integrally therewith. The receiver plate 22 supports the switch plate 21 in a slidable manner. The switch plate 21, when slid upwards, turns on the charger switch 36 of the printed circuit board 34 to cause a flash circuit to store charge for flash emission. An engaging portion 21a is disposed on the switch plate 21 and engageable with the light guide member 11 of the exposure unit 16. When the flash charger button 8 is slid up, the light guide member 11 also moves up, and comes to project from the top face of the lens-fitted photo film unit 2. An LED (light-emitting diode) is connected with the printed circuit board 34 to emit light upon the completion of the charging operation for flashing. The light from the LED is guided by the light guide member 11 to the outside of the lens-fitted photo film unit 2, and informs users of the state ready for taking an exposure.

The plastic belt 4 is attached to the outer surfaces of the front cover 14 and the rear cover 20 by use of pressure sensitive adhesive agent. The plastic belt 4 is provided with plural openings through which relevant portions of the housing 3 appear. A base material of the plastic belt 4 is formed from plastic film having compatibility with plastic material of the front cover 14 and the rear cover 20. Thus the plastic belt 4 can be pelletized together with the front cover 14 and the rear cover 20 to be recycled.

The lens-fitted photo film unit 2, after being withdrawn in each photo laboratory, is collected in a recycling factory. The recycling factory has a disassembly line and an inspection/cleaning line. The disassembly line disassembles the lens-fitted photo film unit 2. The inspection/cleaning line inspects performance of the relevant parts to be reused, and cleans the parts. The disassembly line is constituted by devices and units which are described hereinafter.

In the first process of the disassembly line, the plastic belt 4 is cut down by a laser marker or the like along junctures between the front cover 14 and the rear cover 20 on the top face and the bottom face. In the second process, holes are formed in the plastic belt 4 in predetermined positions. This is for the purpose of facilitating insertion of jigs for disengagement of engaging portions by which the front cover 14 and the rear cover 20 are engaged with the main body 15. In the third process, the front cover 14 is disengaged from the main body 15. In the fourth process, the front cover 14 is removed from the main body 15. In the fifth process, the switch plate 21 and the receiver plate 22 are removed from the main body 15. In the sixth process, the flash unit 17 and the battery 18 are removed from the main body 15. In the seventh process, the rear cover 20 is disengaged from the main body 15. In the eighth process, the rear cover 20 is removed from the main body 15. In the ninth process, the shutter release button 9, the light guide member 11 and the winder wheel 12 are removed from the main body 15.

The main body 15 with the exposure unit 16 and the cassette shutter closing mechanism is sent to the inspection/cleaning line. Similarly the flash unit 17, the switch plate 21 and the receiver plate 22 are sent to inspection/cleaning lines respectively installed for them. The front cover 14 and the rear cover 20 are pelletized and reused as raw material.

Figure 3:
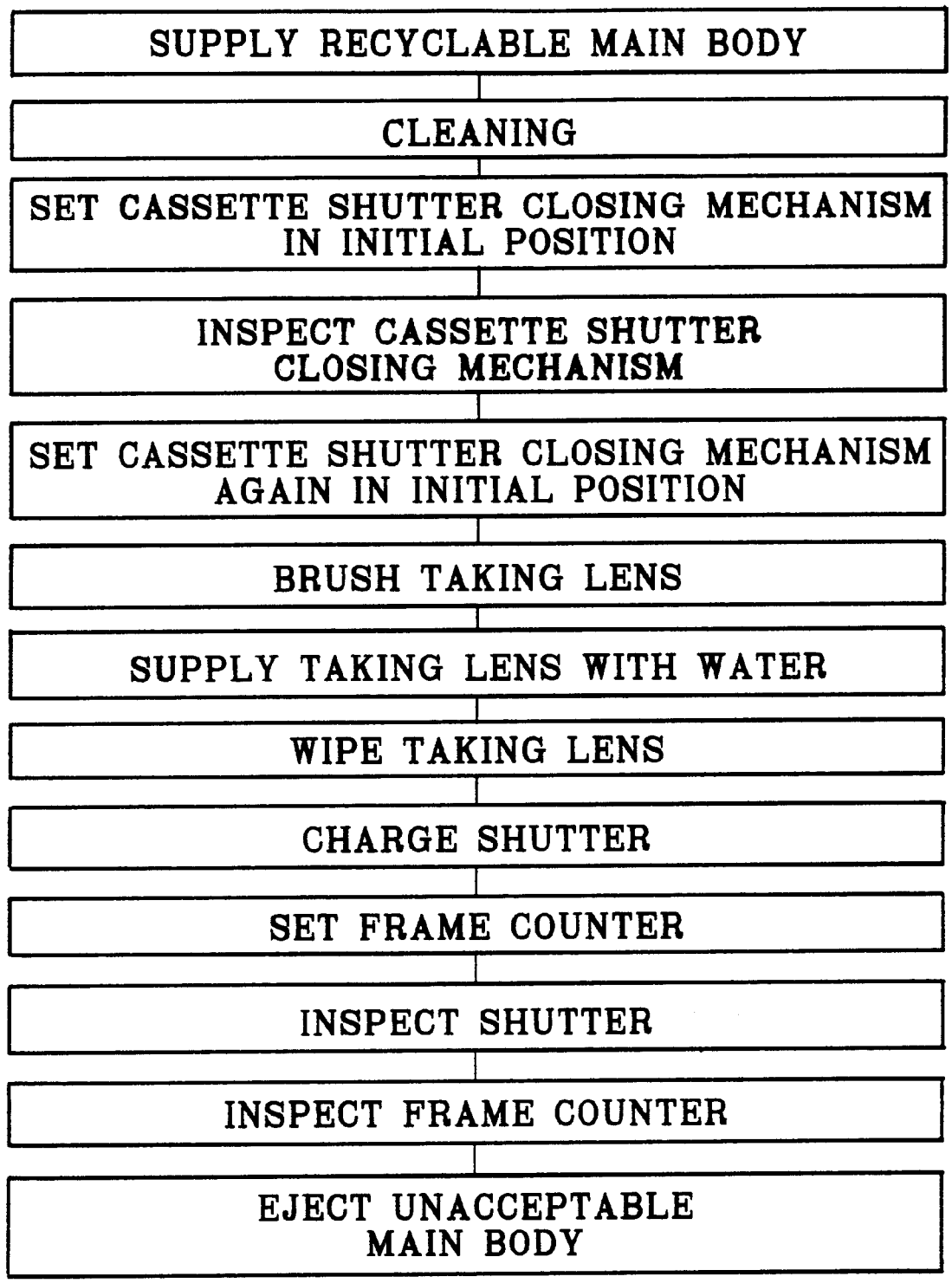
FIG. 3 is a flow chart illustrating a sequence of inspecting/readjusting a recyclable main body and of cleaning the same.

In FIG. 3, a flow of operation of the inspection/cleaning line for the main body 15 is illustrated. Various devices are arranged along the periphery of an indexing table which is rotatable intermittently for the inspection/cleaning line. A plurality of pallets 40 in a plate shape are arranged on the indexing table. See FIG. 4. The main body 15 is placed on the pallet 40 to be conveyed.

For the inspection/cleaning line, there are 13 processes of the operation. In the first process, the inspection/cleaning line is supplied with the main body 15. In the second process, dust, particles and static charge are removed from the main body 15 by air blow or antistatic blow. In the third process, the cassette shutter closing mechanism is set in its initial position. In the fourth process, the cassette shutter closing mechanism is inspected. In the fifth process, the cassette shutter closing mechanism is set in its initial position for a second time. In the sixth, seventh and eighth processes, the taking lens 5 is cleaned according to the present embodiment. In the ninth process, the shutter mechanism is charged. In the tenth process, the frame counter is set in its initial position. In the eleventh process, the shutter mechanism is inspected. In the twelfth process, the frame counter mechanism is inspected. In the thirteenth process, unacceptable articles are ejected from the line. The main body 15, detected as acceptable and cleaned, is conveyed to an assembly factory for the lens-fitted photo film unit 2, and reused as a component of a new lens-fitted photo film unit.

Figure 4:
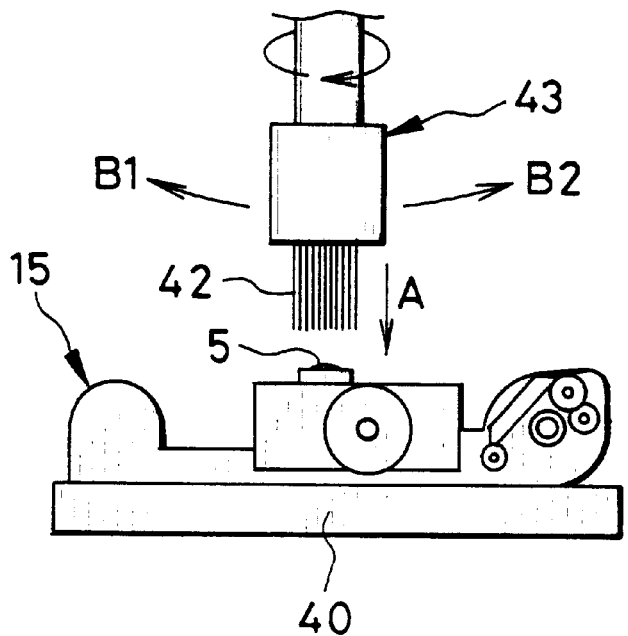
FIG. 4 is an explanatory view in elevation, illustrating a brush device together with the recyclable main body.
Figure 5:
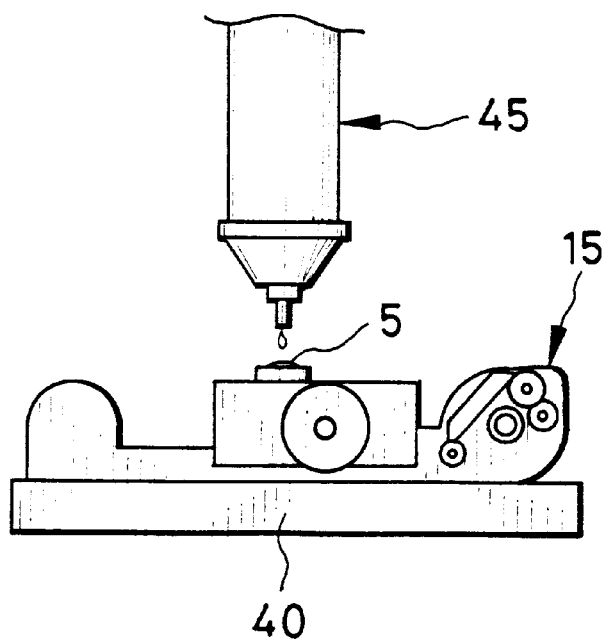
FIG. 5 is an explanatory view in elevation, illustrating a cleaning liquid supplier together with the recyclable main body.

In FIG. 4, a station for the sixth process in the inspection/cleaning line is illustrated. A brush device 43 includes a brush 42. A power source, such as a solenoid, an air cylinder, a cam mechanism or the like is associated with the brush device 43, and causes the brush device 43 to move down in the arrow direction A. The brush device 43 contacts the taking lens 5, and caused by a motor (not shown) to rotate in an axial direction. Also the brush device 43 is caused by the cam mechanism or the like to move back and forth in the arrow directions B1 and B2. Accordingly dust, dirt and small particles stuck on the taking lens 5 can be removed from it. In FIG. 5, a station for the seventh process in the inspection/cleaning line is illustrated. A cleaning liquid supplier 45 supplies a surface of the taking lens 5 with a small amount of water or other cleaning solution or cleaning liquid suitable for the cleaning purpose.

Figure 6:
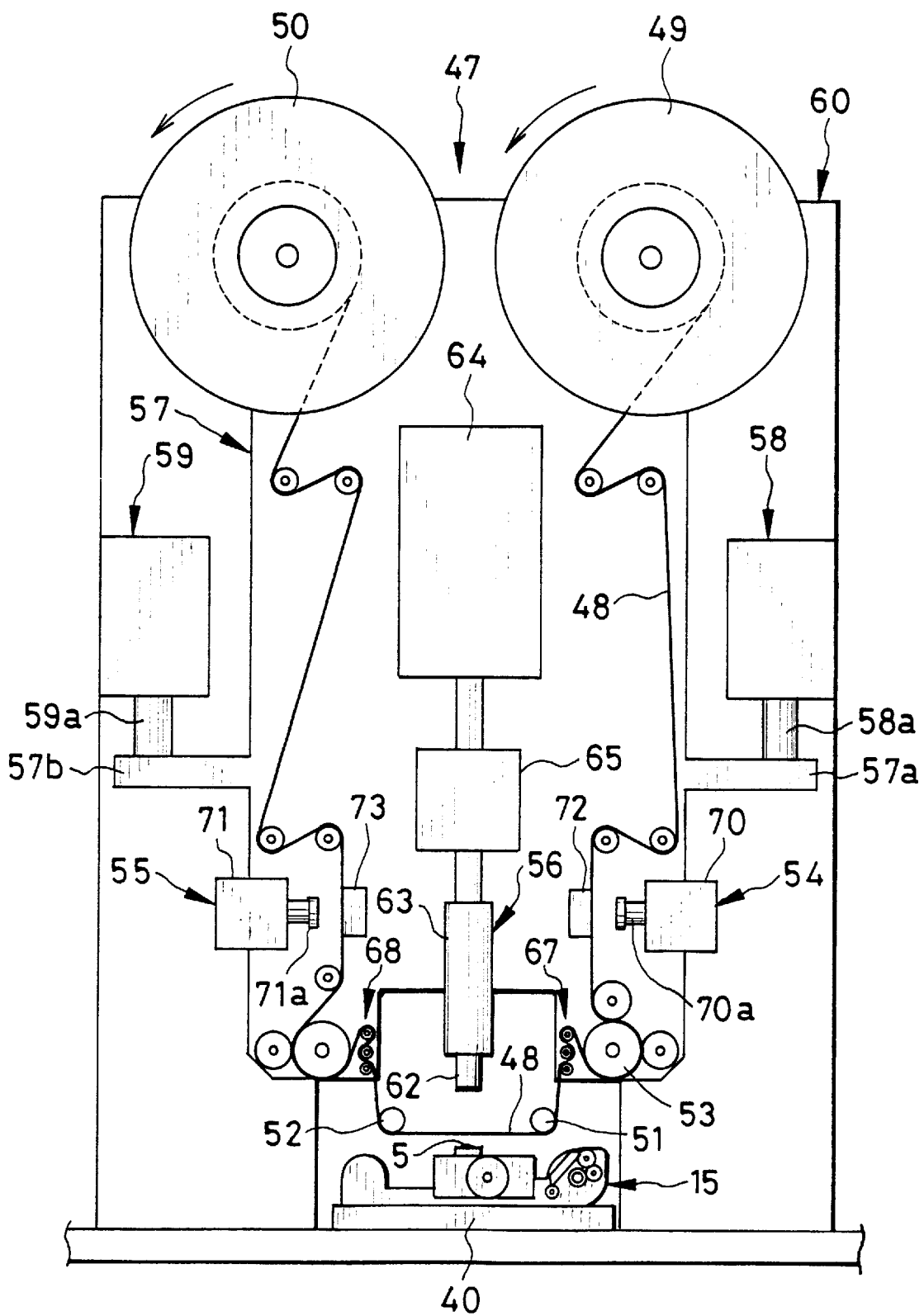
FIG. 6 is a front elevation illustrating a taking lens cleaner.

In FIG. 6, a taking lens cleaner 47 for the seventh process of the inspection/cleaning line is illustrated. The taking lens cleaner 47 consists of a combination including a supply reel 49, a winder reel 50, a third roller 51, a fourth roller 52, an advancing roller 53, plural rollers, a first nipping mechanism 54, a second nipping mechanism 55, a cleaning head 56, a cleaner holder plate 57, solenoids 58 and 59 or moving mechanism and a stationary stand 60. The supply reel 49 is provided with unused cleaning tape 48 wound thereabout. The winder reel 50 winds the cleaning tape 48 after being used. The third and fourth rollers 51 and 52 are disposed between the supply reel 49 and the winder reel 50, and contacted by the cleaning tape 48. The advancing roller 53 as tape advancing mechanism draws the cleaning tape 48 from the third and fourth rollers 51 and 52 for advance. The plural rollers are arranged between the supply reel 49 and the winder reel 50, and contacted by the cleaning tape 48. The first and second nipping mechanisms 54 and 55 keep the cleaning tape 48 stopped while the taking lens 5 is cleaned. The cleaner holder plate 57 has components or parts other than the third and fourth rollers 51 and 52. The solenoids 58 and 59 move the cleaner holder plate 57 up and down vertically. The stationary stand 60 supports the cleaner holder plate 57 in connection with the solenoids 58 and 59.

The supply reel 49 and the winder reel 50 are caused by motors behind the cleaner holder plate 57 to rotate constantly with small rotating force in the winding directions, which are indicated by the arrows in the drawing. Tension is constantly applied to the cleaning tape 48. Both of the supply reel 49 and the winder reel 50 exert force to draw the cleaning tape 48 away from each other. However the rotating force is the same between the two. A first set of three rollers 67 and a second set of three rollers 68 are arranged in the vicinity of the third and fourth rollers 51 and 52 to apply load to the movement of the cleaning tape 48. Thus the cleaning tape 48 does not move because the drawing force of the supply reel 49 and the winder reel 50 is well-balanced.

The cleaning head 56 is constituted by a rubber member 62, a support 63, a motor 64 and a gear box 65. The rubber member 62 is formed from urethane rubber, and has a cylindrical shape. The support 63 supports the rubber member 62. The motor 64 is a power source of the cleaning head 56. The gear box 65 converts one-directional rotation of the motor 64 into reciprocal rotation, and at the same time reduces the speed of the rotation of the motor 64. The cleaning head 56 presses the cleaning tape 48 against the taking lens 5, rotates back and forth for the cleaning tape 48 to rub the taking lens 5, and wipes dust or dirt away from the taking lens 5.

The cleaner holder plate 57 is disposed in front of the stationary stand 60, and supported on the stationary stand 60 in connection with the solenoids 58 and 59. The solenoids 58 and 59 are fixedly secured to the stationary stand 60. Plungers 58a and 59a of the solenoids 58 and 59 are connected with projections 57a and 57b disposed to project laterally from the cleaner holder plate 57. The solenoids 58 and 59 move the cleaner holder plate 57 vertically between a retracted position and a cleaning position by moving the plungers 58a and 59a to the outside of or to the inside of the solenoids 58 and 59. The cleaner holder plate 57, when in the retracted position, causes the rubber member 62 of the cleaning head 56 to lie above the taking lens 5, and when in the cleaning position of FIG. 7, causes the rubber member 62 to contact the taking lens 5.

When the cleaner holder plate 57 is moved down from the retracted position to the cleaning position, there occurs looseness in a first section of the cleaning tape 48 between the first and second roller sets 67 and 68 of the cleaner holder plate 57 or under the third and fourth rollers 51 and 52 on the stationary stand 60. The cleaning head 56 with the cleaning tape 48 pushes the taking lens 5, and rotates back and forth. The cleaning tape 48, because of its looseness, can rub the taking lens 5 in the range of the looseness, to remove dust and dirt from the surface of the taking lens 5. It is to be noted that the term rotation itself is used to mean rotation in both forward and backward directions, and also rotation in only one direction.

The first nipping mechanism 54 is constituted by a solenoid 70 and a nipping plate 72. The solenoid 70 is opposed to one surface of the cleaning tape 48. The nipping plate 72 is so disposed that the cleaning tape 48 is disposed between the nipping plate 72 and the solenoid 70. Similarly the second nipping mechanism 55 is constituted by a solenoid 71 and a nipping plate 73. When the cleaner holder plate 57 is moved down to the cleaning position, the first and second nipping mechanisms 54 and 55 cause plungers 70a and 71a to protrude from the solenoids 70 and 71, to nip the cleaning tape 48 in cooperation with the nipping plates 72 and 73. Thus the cleaning tape 48 is kept positioned without moving. Namely, the looseness of the cleaning tape 48 can be kept, because the supply reel 49 and the winder reel 50 are prevented from winding the cleaning tape 48 and from absorbing the looseness. When the cleaner holder plate 57 moves up from the cleaning position to the retracted position, the first and second nipping mechanisms 54 and 55 shift and release the cleaning tape 48 from being nipped.

Figure 8:
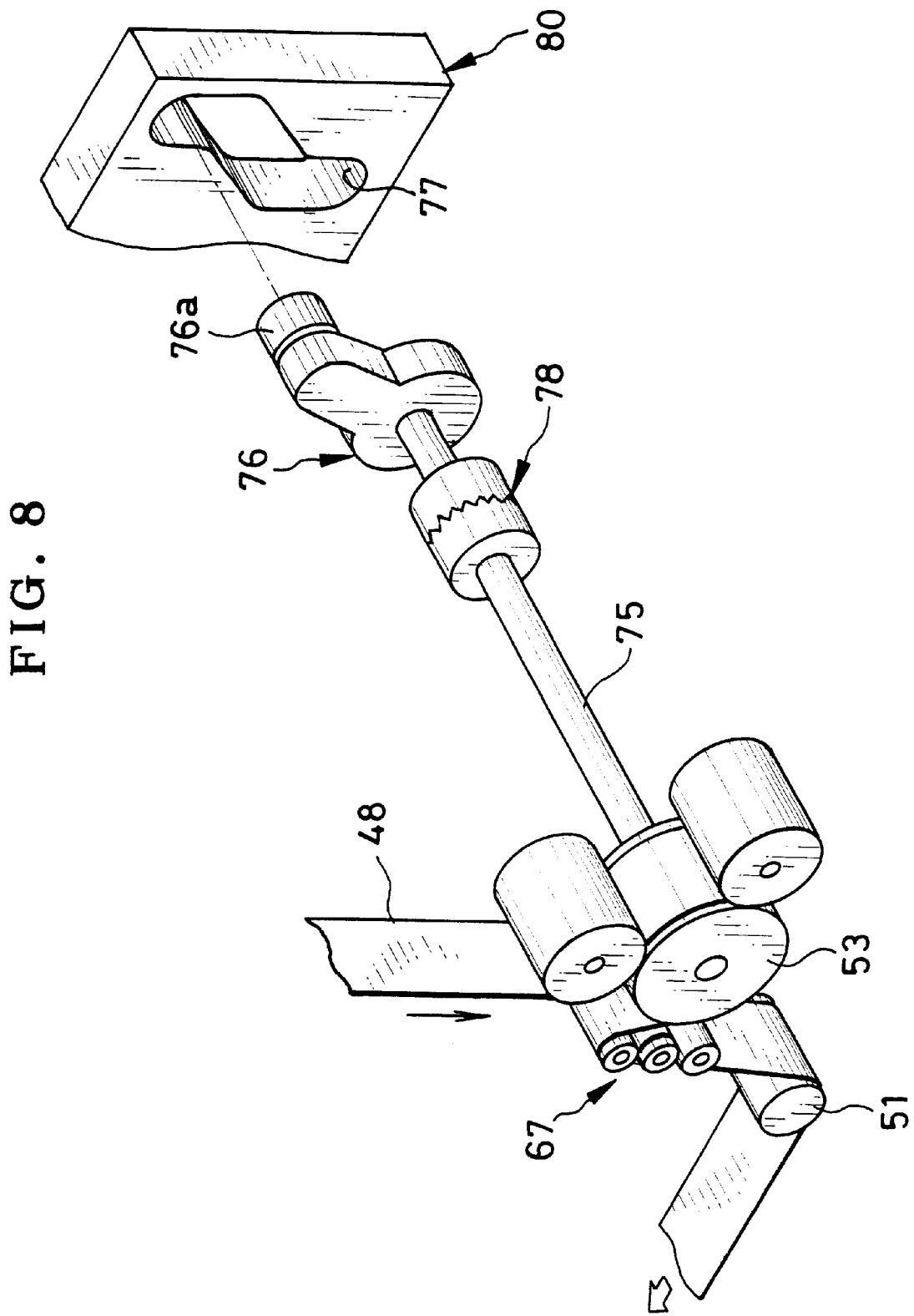
FIG. 8 is an exploded perspective illustrating an assembly, provided with a cam, a clutch and the like, for advancing cleaning tape by a unit length.

In FIG. 8, a roller shaft 75 in the tape advancing mechanism supports the advancing roller 53 in a rotatable manner. A cam lever 76 is secured to the remaining axial end of the roller shaft 75. The cam lever 76 nearly has a crank shape, and has a cam follower pin 76a inserted in a cam groove 77. The cam groove 77 has a crank shape with combined inclinations. The cam groove 77 is disposed on the stationary stand 60 together with the third and fourth rollers 51 and 52. A one-way clutch 78 is disposed between the advancing roller 53 and the cam lever 76, for transmitting only clockwise rotation of the cam lever 76 to the advancing roller 53 without transmission of counterclockwise rotation of the cam lever 76.

When the cleaner holder plate 57 is in the retracted position of FIG. 6, then the cam follower pin 76a of the cam lever 76 is disposed at a top end of the cam groove 77. See FIG. 9. When the cleaner holder plate 57 moves down to the cleaning position, the cam follower pin 76a is guided by the cam groove 77 and moved to a bottom end of the cam groove 77. The cam lever 76 rotates in the counterclockwise direction. See FIG. 10. However, the one-way clutch 78 exists and absorbs the counterclockwise rotation. Thus the advancing roller 53 does not rotate.

When in turn the cleaner holder plate 57 moves up from the cleaning position to the retracted position, the cam lever 76 rotates in the clockwise direction. The clockwise rotation of the cam lever 76 is transmitted by the one-way clutch 78 to the advancing roller 53, which advances the cleaning tape 48 from the supply reel 49. In response to this, there occurs looseness of the cleaning tape 48 between the advancing roller 53 and the supply reel 49. The loose portion of the cleaning tape 48, however, is wound by the winder reel 50 shortly. Thus the cleaning tape 48 can be advanced by a predetermined amount. It is unnecessary to use a dancer roller or a sensor for measuring the advanced amount of the cleaning tape 48. A manufacturing cost of the line or the devices can be lowered.

The operation of the above construction is described now. Used lens-fitted photo film units withdrawn from photo laboratories are forwarded to a recycling factory. In the recycling factory, the lens-fitted photo film units are classified in consideration of their types. Each of the lens-fitted photo film units is conveyed to one of disassembly lines installed for the respective types. In the disassembly line, the lens-fitted photo film unit 2 of FIGS. 1 and 2 is disassembled to obtain a combination of the main body 15, the exposure unit 16 and the cassette shutter closing mechanism after elimination of the shutter release button 9 and the light guide member 11. The front cover 14 and the rear cover 20 removed from the main body 15 is recycled as raw material. The main body 15, the flash unit 17, the switch plate 21 and the receiver plate 22 are transferred to their inspection/cleaning stations.

In the inspection/cleaning line, the main body 15 is inspected and cleaned according to the flow of FIG. 3. In the station for the first process, the line is supplied with the main body 15. In the station for the second process, dust, particles and static charge are eliminated from the main body 15. In the station for the third process, the cassette shutter closing mechanism is set in the initial position. In the station for the fourth process, the cassette shutter closing mechanism is inspected. In the station for the fifth process, the cassette shutter closing mechanism is set again in the initial position.

In the station for the sixth process, the brush device 43 is moved down in the arrow direction A by the solenoid, air cylinder, cam mechanism and the like. The brush 42 is caused to contact the taking lens 5. See FIG. 4. The brush device 43 is rotated about its own axis by the motor (not shown), and is also swung back and forth in the arrow directions B1 and B2 by the cam mechanism, so as to brush away dust, dirt or particles from the taking lens 5. In the station for the seventh process, the cleaning liquid supplier 45 supplies the surface of the taking lens 5 with a small amount of water in a downward direction. See FIG. 5. It is to be noted that a vessel or tray may be used for cleaning liquid or water, and that the taking lens 5 may be supplied with the cleaning liquid by transfer from the vessel or tray filled with the cleaning liquid.

In the station for the eighth process, the taking lens cleaner 47 in FIG. 6 is set above the main body 15. The main body 15 being stopped in a predetermined position, the solenoids 58 and 59 of the taking lens cleaner 47 are actuated to cause the plungers 58a and 59a to protrude. The plungers 58a and 59a push the projections 57a and 57b of the cleaner holder plate 57, to move the cleaner holder plate 57 down from the retracted position toward the cleaning position. At the same time the solenoids 70 and 71 of the first and second nipping mechanisms 54 and 55 start being actuated, to squeeze the cleaning tape 48 between the plunger 70a and the nipping plate 72 and between the plunger 71a and the nipping plate 73.

Figure 7:
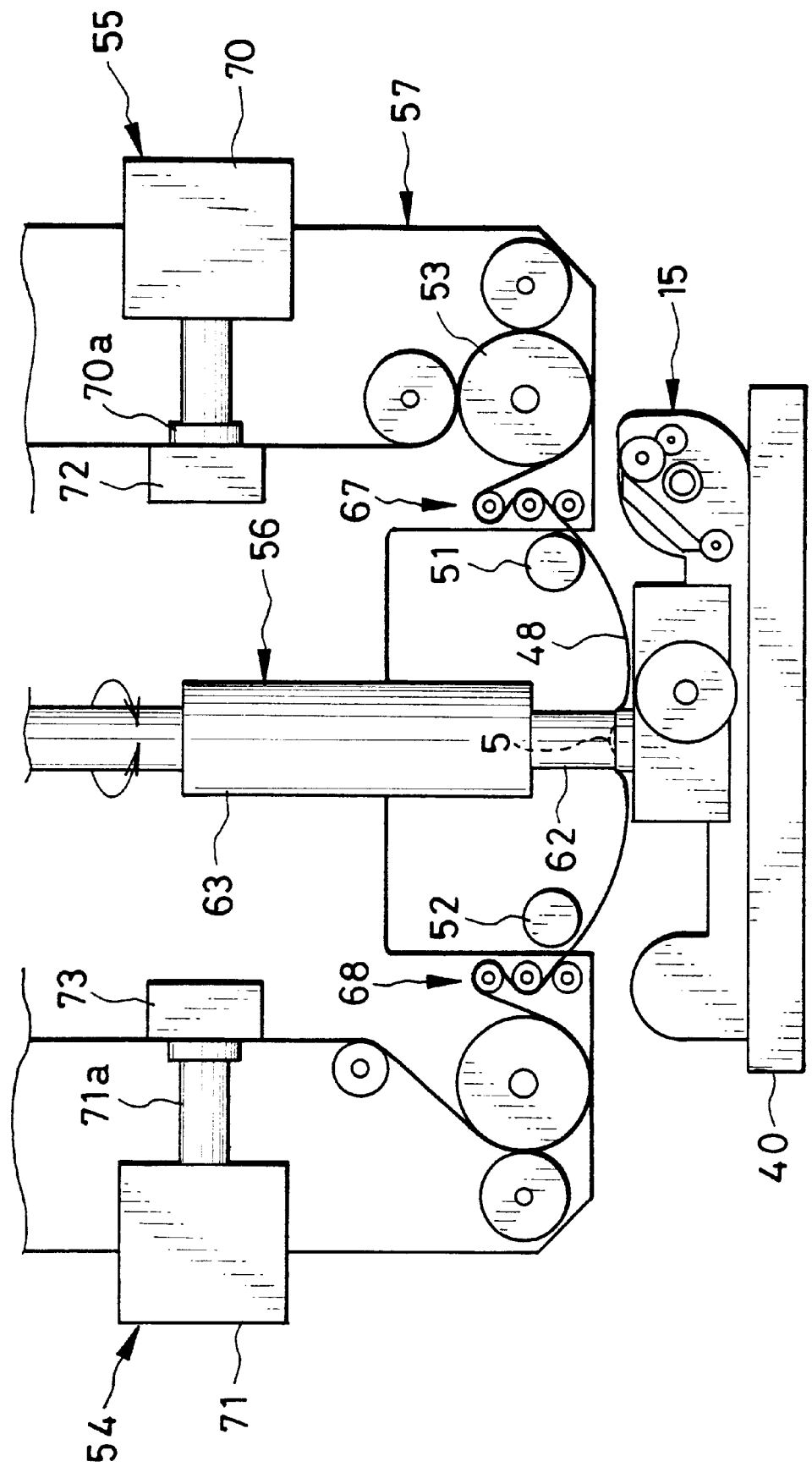
FIG. 7 is a front elevation, partially cutaway, illustrating the taking lens cleaner.

The cleaner holder plate 57 further moves down. In FIG. 7, there is created looseness of the cleaning tape 48 at its portions between the first and second roller sets 67 and 68 of the cleaner holder plate 57 under the third and fourth rollers 51 and 52. The rubber member 62 of the cleaning head 56 contacts the taking lens 5 indirectly with the cleaning tape 48 having looseness. After this, the motor 64 is driven to rotate the cleaning head 56 back and forth, to rub the cleaning tape 48 on to the taking lens 5. The rubber member 62, as formed from urethane rubber, is deformed by the contact with the taking lens 5. The cleaning tape 48 reliably follows the back-and-forth rotation of the rubber member 62 because of the looseness. This being so, dust, dirt and the like can be eliminated from the surface of the taking lens 5 without using such complicated mechanisms which rotate the entire device.

In FIG. 8, the cam follower pin 76a of the cam lever 76 is shifted inside the cam groove 77 because the cleaner holder plate 57 with the advancing roller 53 is moved down. The cam lever 76 is rotated in a counterclockwise direction from a position of FIG. 9 to a position of FIG. 10. The rotation of the cam lever 76 is absorbed by the one-way clutch 78, so that the advancing roller 53 does not rotate.

When the predetermined time elapses for the back-and-forth rotation of the rubber member 62, the plungers 58a and 59a are moved back to the inside of the solenoids 58 and 59. The cleaner holder plate 57 is moved from the cleaning position up to the retracted position. Also the plungers 70a and 71a in the first and second nipping mechanisms 54 and 55 are moved back to the inside of the solenoids 70 and 71, to stop nipping the cleaning tape 48.

Figure 9:
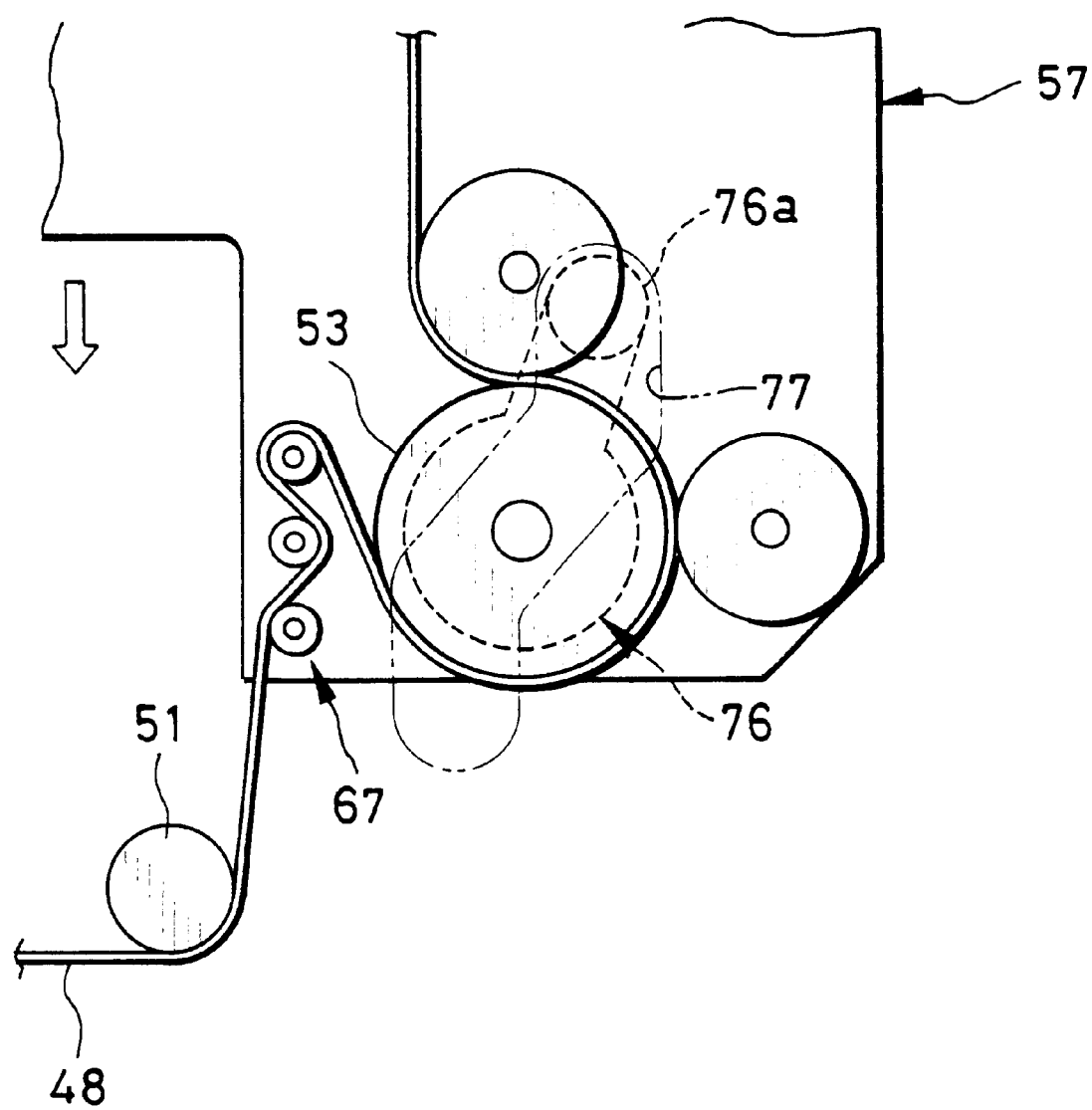
FIG. 9 is an explanatory view in elevation, illustrating the same as FIG. 8 but in which the cleaning tape has finished being advanced by the unit length.
Figure 10:
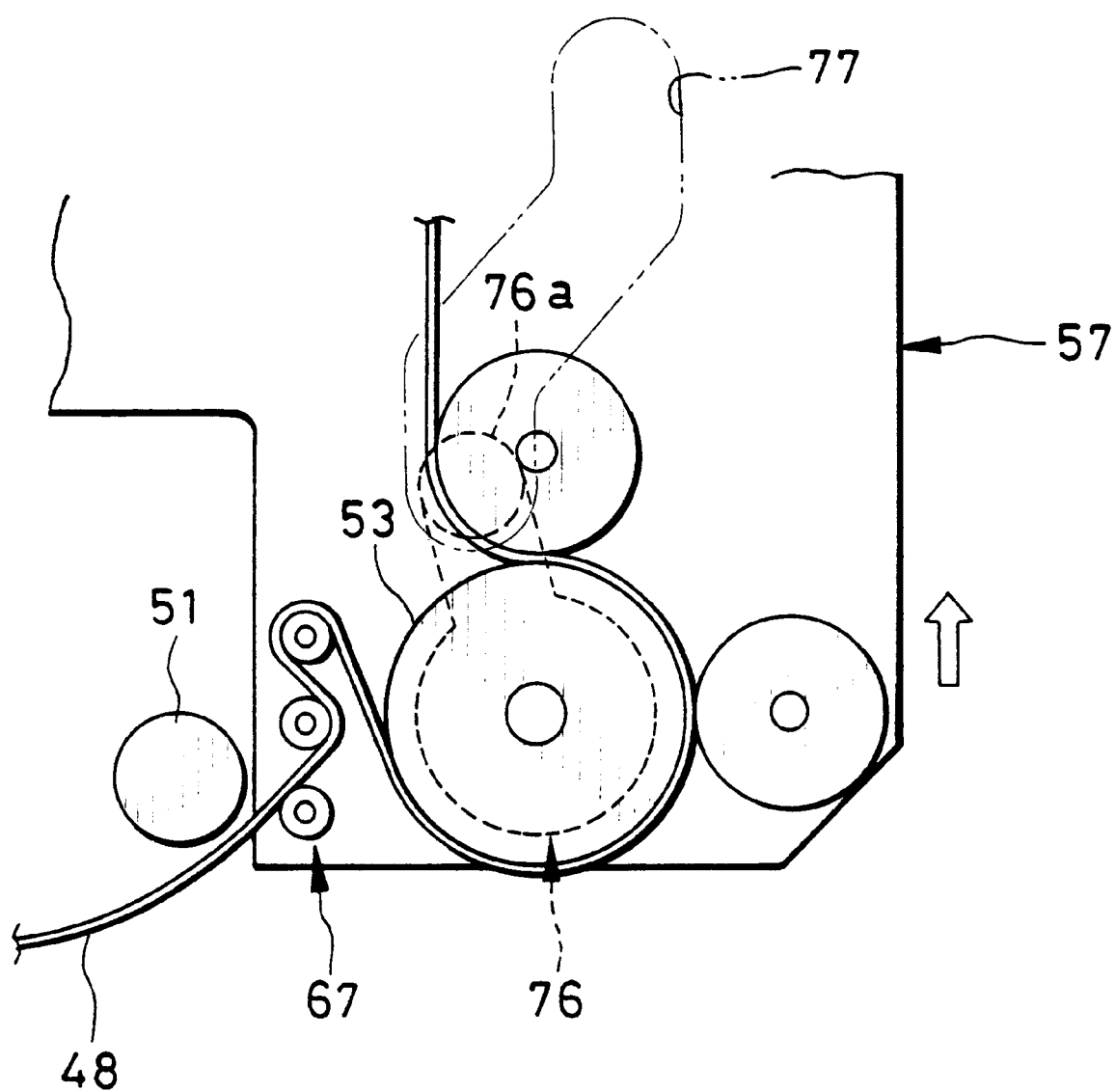
FIG. 10 is an explanatory view in elevation, illustrating the same as FIG. 9 but in which the cleaning tape is about to be advanced by the unit length.

When the cleaner holder plate 57 is moved up, the cam lever 76 is shifted from the position of FIG. 10 to the position of FIG. 9, or in the clockwise direction rotationally. The clockwise rotation of the cam lever 76 is transmitted by the one-way clutch 78 to the advancing roller 53. The advancing roller 53, in FIG. 6, rotates in the clockwise direction, to draw the cleaning tape 48 from the supply reel 49 by the predetermined amount. Although there occurs looseness of the cleaning tape 48 between the advancing roller 53 and the supply reel 49, a loosened portion of the cleaning tape 48 is wound by the winder reel 50 shortly. Thus the cleaning tape 48 can be advanced by a predetermined amount. It is unnecessary to use a dancer roller or a sensor. A manufacturing cost of the line can be lowered.

After the taking lens 5 is cleaned, the main body 15 is transferred to the station of the ninth process, where the shutter mechanism is charged. In the tenth process, the frame counter mechanism is set to its initial position. In the eleventh process, the shutter mechanism is inspected. In the twelfth process, the frame counter mechanism is inspected. In the station for the thirteenth process, the main body 15 detected as unacceptable is ejected. The main body 15 which has been detected as acceptable after inspections and also cleaned is forwarded to a factory for assembly of parts of the lens-fitted photo film unit 2. The main body 15 is reused as a component of a newly manufactured product.

In the present embodiment, the lens-fitted photo film unit 2 is the type of which the taking lens 5 always appears in the front wall. However the lens-fitted photo film unit 2 may be a type which has a slidable lens cover or lid, and in which the lens cover can be closed to cover the taking lens 5 when the lens-fitted photo film unit 2 is not used. In the above embodiment, the taking lens 5 is constituted by a single lens element. However the lens-fitted photo film unit 2 may be a type having a taking lens system including plural lens elements.

In the above embodiment, the taking lens 5 is cleaned while kept mounted on the exposure unit. However the taking lens 5 can be cleaned by the method of the present invention in a separate state removed from the exposure unit. Thus the taking lens 5 with an exposure unit obtained from the factory as an unused new component can be cleaned with great ease according to the present invention. Furthermore, lens elements of the viewfinder lens, the flash emitter or other elements of the lens-fitted photo film unit 2 can be cleaned by use of the present invention. Although the cleaning liquid is used in the above embodiment, it is possible in the present invention to wipe and clean the taking lens 5 without cleaning liquid.

In the above embodiment, the brush device 43 and the cleaning head 56 are rotated or swung back and forth. However it is possible to construct the brush device 43 and the cleaning head 56 movably in any manner suitable for their purposes. For example the brush device 43 and the cleaning head 56 may be moved in a straight path back and forth.

Another preferred embodiment is described now by referring to FIGS. 11–35, in which the cassette shutter closing mechanism and the frame counter mechanism are respectively set in initial positions.

Figure 12:
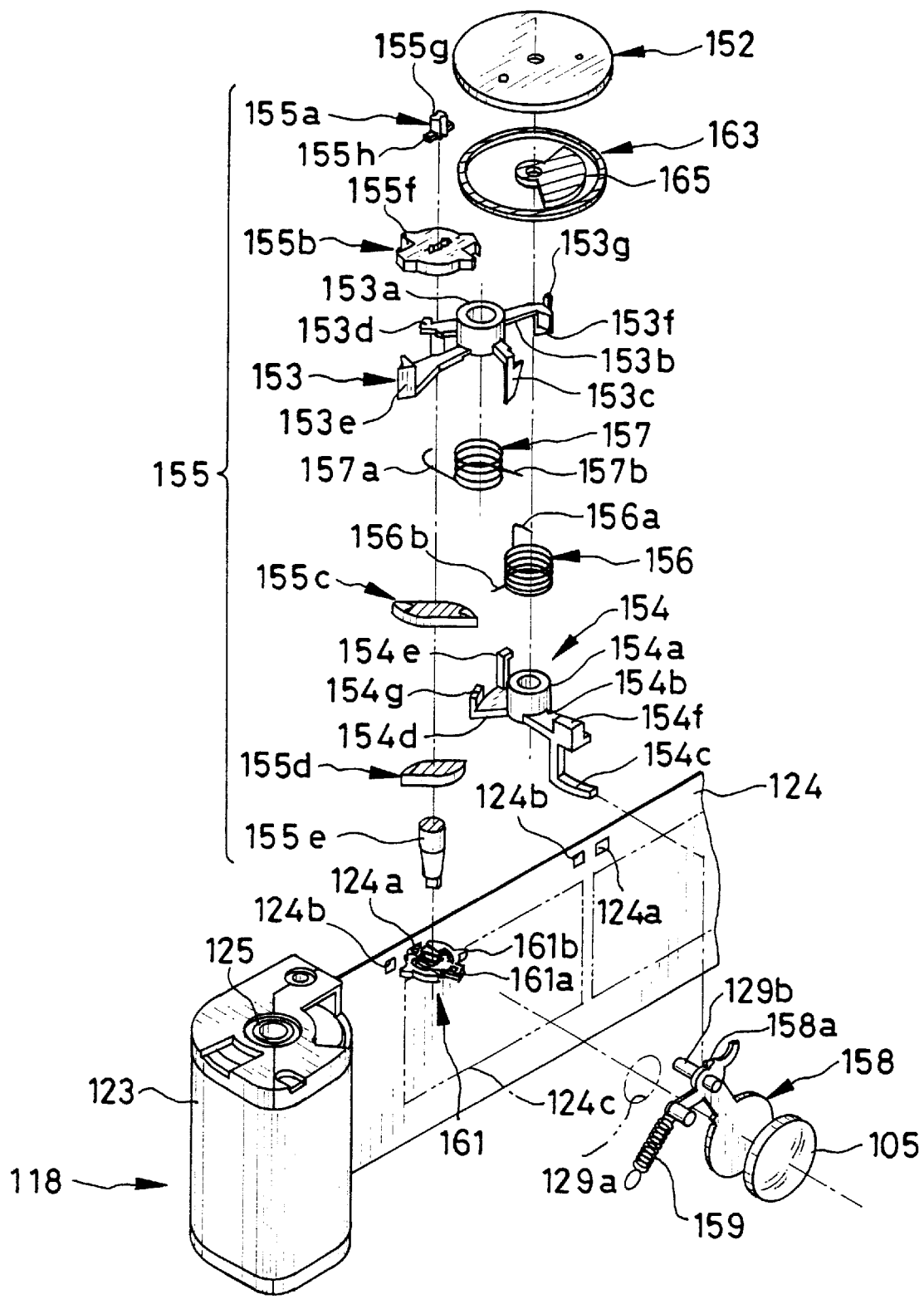
FIG. 12 is an exploded perspective illustrating mechanical parts relevant to taking exposures in the lens-fitted photo film unit.

A photo film 124 for use in the lens-fitted photo film unit is depicted in FIG. 12. The photo film 124 has perforations 124a in a large size and perforations 124b in a small size. The perforations 124b are arranged in a manner alternate with the perforations 124a. There are two intervals in the arrangement of all the perforations 124a and 124b. The photo film 124 is provided with 25 frames 124c. A longer side line of the frames 124c corresponds to the longer intervals of the perforations 124a and 124b. A gap defined between two adjacent ones of the frames 124c corresponds to the shorter intervals of the perforations 124a and 124b. The photo film 124 has exposure-inhibit regions before and after an effective exposure region for recording the 25 frames 124c. Each of the exposure-inhibit regions has a size of a number of frames.

The lens-fitted photo film unit includes a light-shielded tunnel 129, a front of which has a shutter opening for introduction of subject light to the light-shielded tunnel 129. See FIG. 12. An exposure aperture is formed in the rear of the light-shielded tunnel 129 for defining a region of each frame on the photo film 124. A photo film rail surface 129c is disposed on the rear of the light-shielded tunnel 129 and defines upper and lower edges of the exposure aperture. See FIG. 25. The photo film rail surface 129c supports each of the two lateral edges of the photo film 124. The outer surface of the light-shielded tunnel 129 is provided with the various parts constituting the shutter mechanism and the frame counter mechanism, and also a taking lens 105, a light guide member for indication of finish of charge, a viewfinder lens 132 and the like.

Figure 11:
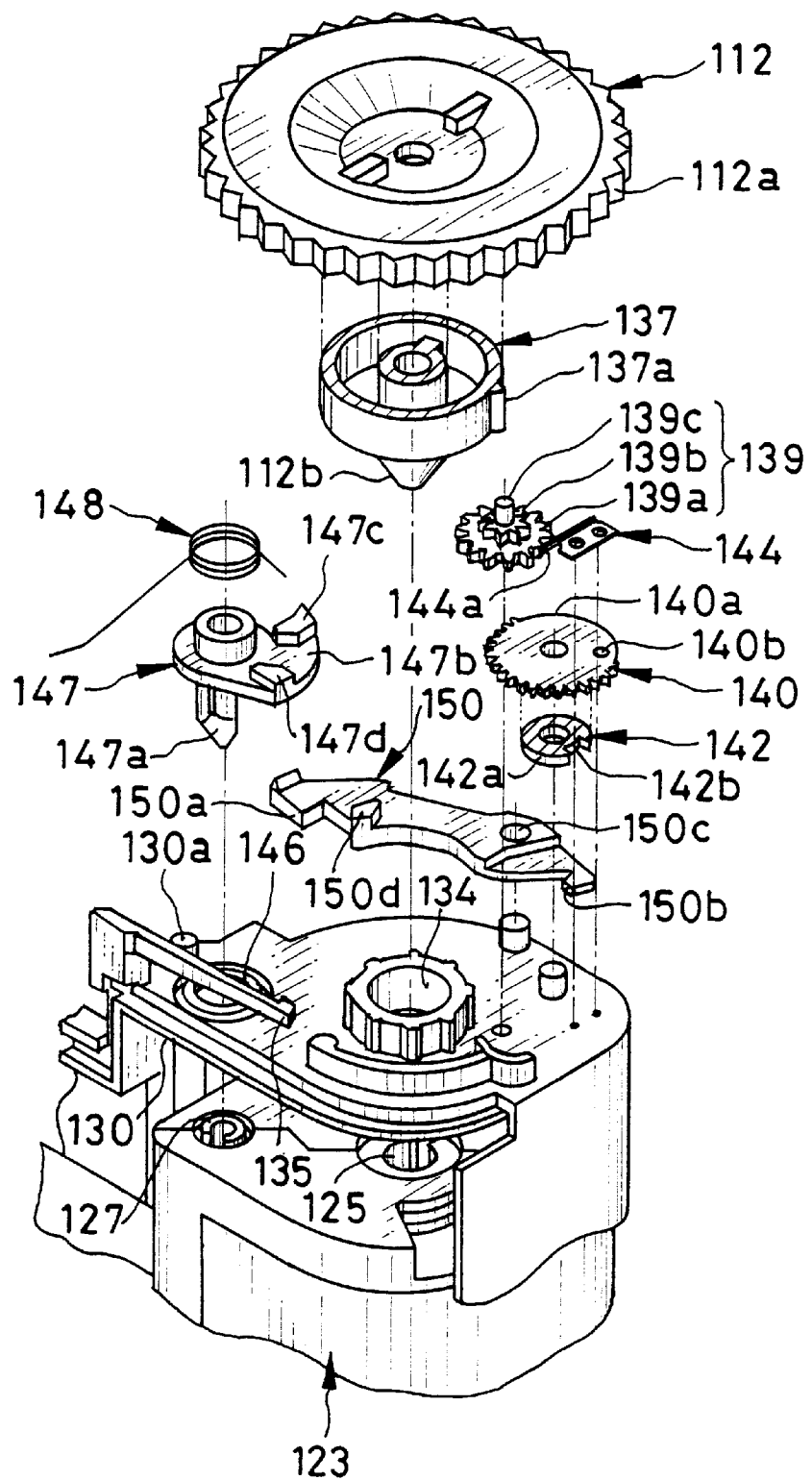
FIG. 11 is an exploded perspective illustrating a top wall of a cassette holder chamber and relevant mechanical parts disposed thereon.

In FIG. 11, a cassette holder chamber 130 is provided with a sleeve portion 134 disposed on its top face. A winder wheel 112 is supported on the sleeve portion 134 in a rotatable manner. A wheel portion 112a is included in the periphery of the winder wheel 112, and facilitates manual rotation of a user's fingers for the winder wheel 112 in the counterclockwise direction. A lock arm of a retainer lever of the shutter drive mechanism, to be described later, comes in mesh with the wheel portion 112a upon one-frame advance of the photo film. Also an anti-unwinding claw 135 is meshed with the wheel portion 112a for preventing the winder wheel 112 from rotating in reverse to the winding direction. The anti-unwinding claw 135 is formed with the top wall of the cassette holder chamber 130.

A lower surface of the winder wheel 112 has a shaft portion 112b and a one-toothed gear portion 137. The shaft portion 112b is inserted through the sleeve portion 134 and engaged with an axial end of a spool 125 of a photo film cassette shell 123. The one-toothed gear portion 137 has a ring shape, is disposed around the shaft portion 112b, and when combined with the sleeve portion 134, is located around the sleeve portion 134. The one-toothed gear portion 137 constitutes a cassette shutter closing mechanism, includes a single tooth 137a, which transmits one rotation of the winder wheel 112 to a relevant part included in the cassette shutter closing mechanism.

Plural pins are disposed on the top wall of the cassette holder chamber 130. There are a speed reduction gear 139 and a toothed wheel portion 140 of a detection gear, which are supported on two of the plural pins in a rotatable manner. The speed reduction gear 139 includes a great-diameter gear portion 139a, a small-diameter gear portion 139b and a positioning shaft 139c. The small-diameter gear portion 139b is disposed on the top of the great-diameter gear portion 139a. The positioning shaft 139c is disposed on the top of the small-diameter gear portion 139b. The great-diameter gear portion 139a is meshed with the single tooth 137a of the one-toothed gear portion 137 intermittently, and rotated stepwise by a predetermined angle of one tooth each time that the winder wheel 112 makes one rotation. The small-diameter gear portion 139b is meshed with the toothed wheel portion 140 for detecting a rotating amount of the winder wheel 112, to transmit rotation of the winder wheel 112 to the toothed wheel portion 140. The positioning shaft 139c has a D-shape as viewed in section, and is used to setting of the cassette shutter closing mechanism in its initial position.

A toothless arc-shaped section 140a in connection with a toothed section is disposed on the periphery of the toothed wheel portion 140, and operates for setting the winder wheel 112 rotationally free after the photo film 124 is entirely wound into the cassette shell 123. A positioning hole 140b is formed in the toothed wheel portion 140 and used in rotational positioning of the toothed wheel portion 140. A cam wheel portion 142 of the detection gear is disposed under the toothed wheel portion 140, and is combined therewith as one piece. A cam surface 142a and a cam notch 142b are disposed on the periphery of the cam wheel portion 142.

A plate spring 144 or a resilient member is secured to a position under the toothed wheel portion 140 near to the speed reduction gear 139, and is a thin plate of metal. A resilient portion 144a of the plate spring 144 is engaged with the great-diameter gear portion 139a of the speed reduction gear 139, and prevents the speed reduction gear 139 and the toothed wheel portion 140 from being rotated by shock or vibration while the one-toothed gear portion 137 is not meshed with the speed reduction gear 139.

The cassette shell 123 has a cassette shutter 127. An axial hole 146 is formed in the top wall of the cassette holder chamber 130 and opposed to the cassette shutter 127. A cassette shutter closing member 147 is disposed at the axial hole 146 in a rotatable manner for closing the cassette shutter 127. The cassette shutter closing member 147 includes a keyed shaft 147a and a lever portion 147b. The keyed shaft 147a is engaged with an engaging hole formed in an axial end of the cassette shutter 127. The lever portion 147b is formed integrally with a top of the keyed shaft 147a. A bias spring 148 is secured to the top of the lever portion 147b, and biases the cassette shutter closing member 147 in the counterclockwise direction toward a shutter closing position, which corresponds to a closed position of the cassette shutter 127.

A lock lever 150 is located on the top wall of the cassette holder chamber 130, and includes an axial hole 150c, an engaging claw 150a and a detection projection 150b. The axial hole 150c is rotatably supported on a pin on the top of the cassette holder chamber 130. The engaging claw 150a is disposed on a first end of the lock lever 150, and engageable with a claw portion 147c at the lever portion 147b of the cassette shutter closing member 147. The detection projection 150b is disposed on a second end of the lock lever 150, and contacts the cam surface 142a of the cam wheel portion 142. The lock lever 150 is pivotally movable between a locking position and an unlocking position, and when in the locking position, keeps the cassette shutter closing member 147 in the shutter opening position for opening the cassette shutter 127 by engaging the engaging claw 150a with the claw portion 147c, and when in the unlocking position, releases the cassette shutter closing member 147 from retention in its opening position.

If the lock lever 150 is in the locking position, the detection projection 150b contacts the cam surface 142a of the cam wheel portion 142, to retain the lock lever 150 without swinging. The cam notch 142b in the cam wheel portion 142 becomes opposed to the detection projection 150b when the winder wheel 112 is rotated by a predetermined amount required for entire winding of the photo film 124 into the cassette shell 123. As the lock lever 150 is biased by the bias spring 148 indirectly with the cassette shutter closing member 147, the positioning of the cam notch 142b at the detection projection 150b causes the detection projection 150b to swing into the cam notch 142b, thus in a direction toward the unlocking position. The cassette shutter closing member 147 is released from the retention in the shutter opening position corresponding to the open position of the cassette shutter 127. Thus the cassette shutter closing member 147 is caused by the bias spring 148 to rotate toward the shutter closing position corresponding to the closed position of the cassette shutter 127.

A stopper pin 130a is disposed near to the axial hole 146, and contacts the cassette shutter closing member 147 for retaining the same in the shutter closing position associated with the closed position of the cassette shutter 127. Thus the stopper pin 130a prevents the cassette shutter 127 from being broken, as the stopper pin 130a keeps the cassette shutter closing member 147 from rotating. It is to be noted that a photo film cassette 118 contains the photo film of a 25-exposure type, but may contain a photo film of a 15 or 40-exposure type. For position setting of the cassette shutter 127 suitable to each number of the exposures, the numbers of the teeth of the toothed wheel portion 140 and the position of the cam notch 142b of the cam wheel portion 142 are changed.

There are plural shafts and shaft receivers (not shown) on the top of the light-shielded tunnel 129. In FIG. 12, those shafts and shaft receivers rotationally support various parts such as a frame counter disk 152, a retainer lever 153, a shutter drive lever 154, a cam member 155, a first coil spring 156 and a second coil spring 157. The counter disk 152 constitutes a frame counter mechanism. The retainer lever 153 and the shutter drive lever 154 constitute a shutter drive mechanism. A shutter opening 129a is formed in a front wall of the light-shielded tunnel 129. A pin 129b is disposed near to the shutter opening 129a. A shutter blade 158 or shutter mechanism is secured to the pin 129b in a pivotally movable manner for opening and closing the shutter opening 129a. A return spring 159 biases the shutter blade 158 in a direction to close the shutter opening 129a. A lens-holder/shutter-cover 160 covers the shutter blade 158 and is secured to the front wall of the light-shielded tunnel 129. See FIG. 15. The taking lens 105 is held in the lens-holder/shutter-cover 160 and opposed to the shutter opening 129a. A sprocket wheel 161 is disposed in the light-shielded tunnel 129 at a height opposed to the perforations 124a and 124b of the photo film 124.

The cam member 155 is one piece in a combined shape, and includes a counter drive portion 155a, a one-frame advancing cam 155b, a charge cam projection portion 155c, a bias cam 155d and a shaft 155e in the downward order. The shaft 155e is rotatably inserted in a sleeve portion on the top of the light-shielded tunnel 129. The shaft 155e is engaged with the sprocket wheel 161 in the light-shielded tunnel 129. The cam member 155 rotates together with the sprocket wheel 161. There are first and third sprocket teeth 161b and second and fourth sprocket teeth 161a disposed on the periphery of the sprocket wheel 161 in a rotationally symmetrical manner, for being meshed with the perforations 124a and 124b. The sprocket wheel 161 is caused to make half a rotation in the counterclockwise direction by movement of the photo film 124 as much as one frame into the cassette shell 123.

The shutter drive lever 154 has a combined shape and includes a sleeve portion 154a, an engaging arm 154b, a knocker arm 154c and a charge arm 154d. The engaging arm 154b, the knocker arm 154c and the charge arm 154d project from the sleeve portion 154a radially. The shutter drive lever 154 is rotatably supported on a shaft on the top of the light-shielded tunnel 129 by use of the sleeve portion 154a. The shutter drive lever 154 is rotatable between a release position and a charge position which is located in the clockwise direction from the release position. The shutter drive lever 154 is biased toward the release position by the first coil spring 156 which is disposed on the periphery of the sleeve portion 154a. The first coil spring 156 has a first end 156a and a second end 156b. The first end 156a is secured to a pin disposed on the light-shielded tunnel 129. The second end 156b is secured to a spring retainer 154e formed with the charge arm 154d. The first coil spring 156 has stronger biasing force than the second coil spring 157.

A driven projection 158a is disposed on the top of the shutter blade 158. When the shutter drive lever 154 is in the charge position, the end of the knocker arm 154c in the L-shape is disposed in the left of the driven projection 158a. At the time of the shutter releasing, the shutter drive lever 154 is rotated toward the release position by the bias of the first coil spring 156. During the rotation, the knocker arm 154c of the shutter drive lever 154 knocks the driven projection 158a forcibly. Thus the shutter blade 158 swings about the pin 129b in the clockwise direction against the return spring 159. The shutter opening 129a is opened to introduce subject light to the photo film 124. Then the return spring 159 swings the shutter blade 158 to close the shutter opening 129a.

The retainer lever 153 has a combined shape and includes a cylindrical sleeve portion 153a, a retention arm 153b, a release arm 153c, a one-frame advancing arm 153d and a lock arm 153e. The retention arm 153b, the release arm 153c and the one-frame advancing arm 153d project from the sleeve portion 153a radially. The retainer lever 153 is rotatably supported on a shaft on the top of the light-shielded tunnel 129 by use of the sleeve portion 153a. The retainer lever 153 is rotatable between a retention position and a non-retention position which is located in the counterclockwise direction from the retention position. The retainer lever 153 is biased toward the retention position by the second coil spring 157 which is disposed at a bottom of the retainer lever 153 in a coaxial manner. The second coil spring 157 has a first end 157a and a second end 157b. The first end 157a is fitted on a pin disposed on the light-shielded tunnel 129. The second end 157b is fitted on the release arm 153c.

The one-frame advancing cam 155b has a cam notch 155f formed therein. When the retainer lever 153 is in the retention position, the end of the one-frame advancing arm 153d is engaged with the cam notch 155f to block rotation of the cam member 155 and the sprocket wheel 161. The end of the lock arm 153e is engaged with the wheel portion 112a of the winder wheel 112 to block rotation of the winder wheel 112. In contrast, when the retainer lever 153 is in the non-retention position, the ends of the one-frame advancing arm 153d and the lock arm 153e are shifted away from respectively the one-frame advancing cam 155b and the winder wheel 112, and keep those rotationally free.

The first end 157a of the second coil spring 157 is curved in an arc shape, and contacts the bias cam 155d which includes two projections being rotationally symmetrical. In the photo film 124, the perforations 124a and 124b are arranged not at one pitch. There occurs a phenomenon of regular disengagement of the sprocket teeth 161a and 161b of the sprocket wheel 161 with any of the perforations 124a and 124b due to the longer interval. Upon occurrence of this disengagement, the first end 157a of the second coil spring 157 pushes the bias cam 155d to rotate the cam member 155 and the sprocket wheel 161 in the driven direction.

An engaging projection 153f is formed on the underside of the retention arm 153b of the retainer lever 153. An engaging projection 154f is formed on the upside of the engaging arm 154b of the shutter drive lever 154 for engagement with the engaging projection 153f. While the shutter is not charged, the shutter drive lever 154 is kept rotated in the release direction by the bias of the first coil spring 156. The first coil spring 156, which has the higher biasing force, causes the engaging projection 154f to push the engaging projection 153f. The retainer lever 153 is rotated toward the non-retention position against the second coil spring 157.

When the winder wheel 112 is rotated to wind the photo film 124 into the cassette shell 123, the sprocket wheel 161 and the cam member 155 are caused by the photo film 124 to make half a rotation in the counterclockwise direction. The charge cam projection portion 155c has the two projections extending in directions opposite to each other. A projection portion 154g of the engaging arm 154b is pushed by the charge cam projection portion 155c in the course of the half rotation with the sprocket wheel 161. Thus the shutter drive lever 154 is rotated toward the charge position.

When the shutter drive lever 154 is rotated toward the charge position, the retainer lever 153 is released from being pushed by the engaging projection 154f, and is rotated by the second coil spring 157 toward the retention position. The engaging projection 153f comes into a moving path of the engaging projection 154f, becomes engaged with the engaging projection 154f, and retains the shutter drive lever 154 in the charge position. The retainer lever 153 having come to the retention position, the one-frame advancing arm 153d is engaged with the cam notch 155f of the one-frame advancing cam 155b, to position the photo film in a one-frame advanced state. An end of the lock arm 153e of the retainer lever 153 comes in mesh with the wheel portion 112a of the winder wheel 112, to block the winding operation.

Then the shutter release button is depressed. A drive arm formed with the shutter release button pushes the release arm 153c to rotate the retainer lever 153 to the non-retention position. The shutter drive lever 154 is released from being retained in the charge position with the retainer lever 153. The shutter drive lever 154 is moved by the first coil spring 156 from the charge position to the release position, to swing the shutter blade 158.

An upper plate 167 is secured to the top of the light-shielded tunnel 129, and supports upper portions of the counter disk 152, the retainer lever 153, the shutter drive lever 154 and the cam member 155. The shutter release button is located in a position over the upper plate 167, and emerges through a cutout formed in a top wall of the front cover. The upper plate 167 is formed from transparent plastic material, and is provided with a counter lens 167a, which enlarges the numbers and the dots on the counter disk 152. A pointer 167b is provided with the counter lens 167a for pointing a designated one of the numbers or dots located at the counter lens 167a. See FIGS. 13A and 13B.

Figure 13A:
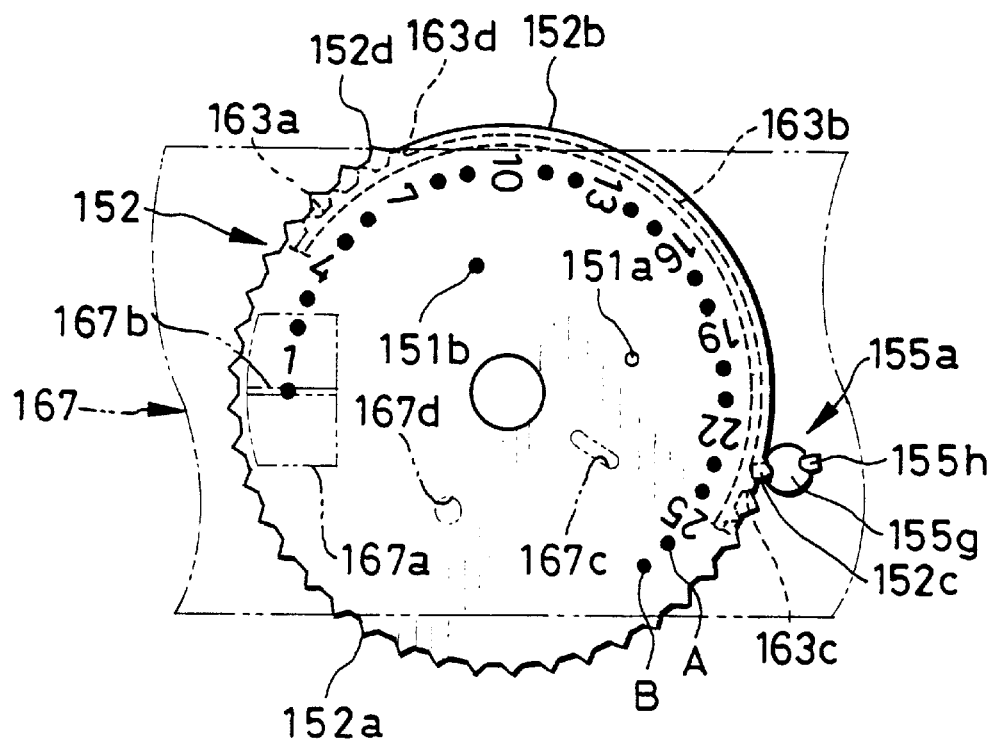
FIG. 13A is a plan illustrating a frame counter mechanism in which a dot after No. 1 is pointed for the finish position.
Figure 13B:
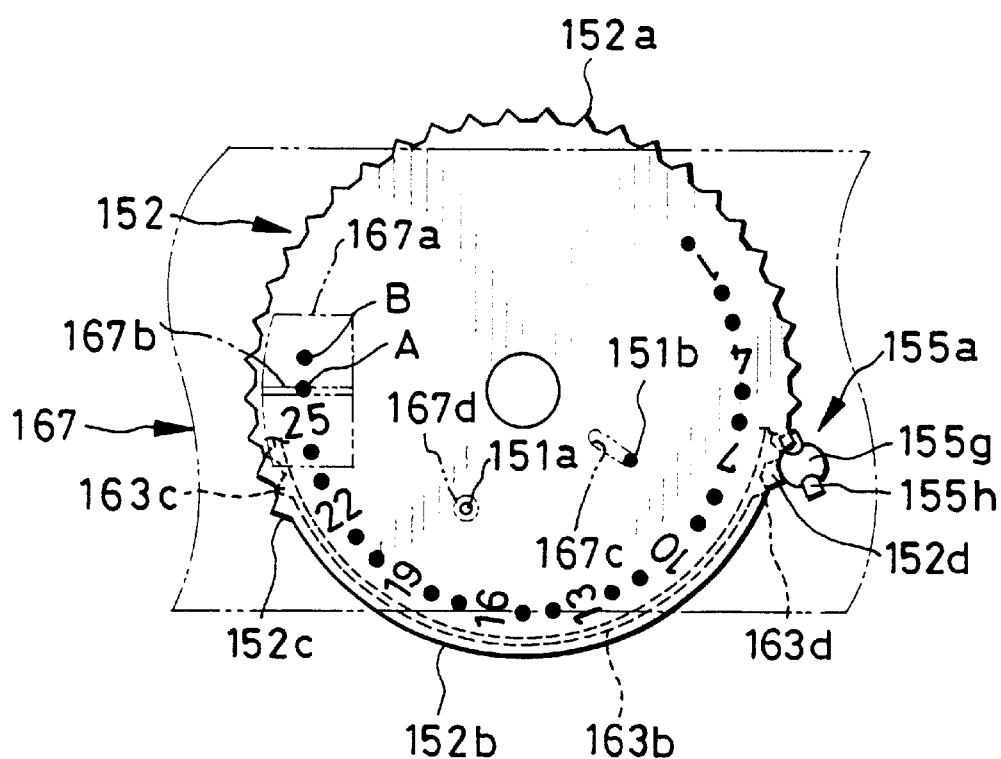
FIG. 13B is a plan illustrating the frame counter mechanism in which a dot before No. 25 is pointed for the initial position.

A top face of the counter disk 152 is provided with a combined train of numbers and dots arranged in a rotational direction. The counter disk 152 is a decremental counter of which an indicated number is stepped down each time that one exposure is taken so as to indicate the number of remaining available frames. As the counter disk 152 is adapted to the 25 frames of the lens-fitted photo film unit, the train of the numbers is 0–25 as illustrated in FIGS. 13A and 13B. In FIG. 13A, the dot for indicating the number zero "0" is pointed by the pointer 167b of the counter lens 167a, to designate that the counter disk 152 is in a rotational position of finish of the use upon completion of exposures to all the frames. In FIG. 13B, a dot A adjacent to the number "25" is pointed by the pointer 167b, to designate that the frame counter mechanism is in the initial position. Note that a dot B is also disposed on the counter disk 152 near to the dot A, for use in a temporary manner at the time of setting the frame counter mechanism in the initial position.

The lens-fitted photo film unit is shipped out after the indicia A of the counter disk 152 is positioned at the pointer 167b. When the lens-fitted photo film unit is used for the first time, the winder wheel 112 is rotated to wind the photo film 124 to charge the shutter mechanism. Upon this winding, the counter disk 152 is rotated stepwise by one step. The number 25 becomes pointed by the pointer 167b, to inform a user that there are 25 available frames now.

A retention gear 152a is included in the counter disk 152 and disposed in its periphery. A retention cam 155g is meshed with the retention gear 152a. The retention cam 155g has a shape of the number eight as viewed in section, and constitutes the counter drive portion 155a of the cam member 155.

A ring-shaped ridge 163 is formed integrally with the bottom face of the counter disk 152. A stepping tooth train 163a of a smaller diameter is located on the periphery of the ring-shaped ridge 163 for rotating the counter disk 152 by one step. A drive gear 155h is disposed under the retention cam 155g and constituted by a pair of projections. The stepping tooth train 163a is meshed with the drive gear 155h, and when the cam member 155 makes half a rotation, is rotated by one tooth in the clockwise direction.

The retention gear 152a and the retention cam 155g cooperate for preventing the counter disk 152 from being rotated upon vibration or shock while stepping tooth train of a ring-shaped ridge is not meshed with a drive gear. The stepping tooth train 163a has a small phase difference from the retention gear 152a in the rotational direction. The phase difference is approximately half a tooth. This is for the purpose of keeping meshed at least either one of a combination of the retention cam 155g and the retention gear 152a and a combination of the drive gear 155h and the stepping tooth train 163a while the cam member 155 rotates. The counter disk 152 can be protected from shock or vibration and prevented from indicating incorrect information in a manner irrespective of a rotational position in which the counter disk 152 is located.

A toothless arc-shaped portion 152b is formed with the periphery of the retention gear 152a, and has a length of a series of several teeth. A toothless arc-shaped portion 163b is formed with the periphery of the stepping tooth train 163a, and has a length of a series of several teeth. The toothless arc-shaped portion 152b is located between a final tooth 152c and a first tooth 152d. In FIG. 13A, the final tooth 152c comes in mesh with the retention cam 155g upon the finish of the use of the lens-fitted photo film unit. In FIG. 13B, the first tooth 152d is meshed with the retention cam 155g at the time of setting the counter disk 152 in the initial position. The toothless arc-shaped portion 163b is located between a final tooth 163c and a first tooth 163d of the stepping tooth train 163a. The final tooth 163c corresponds to the final tooth 152c of the retention gear 152a. The first tooth 163d corresponds to the final tooth 152c of the retention gear 152a. The toothless arc-shaped portions 152b and 163b are used for initial setting of the frame counting mechanism in reusing the lens-fitted photo film unit.

A sector-shaped lock portion 165 is formed with the underside of the counter disk 152 and located inside the ring-shaped ridge 163. A projection 153g is disposed to project from a top of the retention arm 153b of the retainer lever 153, and located inside the ring-shaped ridge 163. Upon the winding operation of the photo film 124 after exposing a final frame, the sector-shaped lock portion 165 comes in contact with the projection 153g of the retainer lever 153 which is not in a state of charging the shutter. See FIG. 25. This avoids rotation of the counter disk 152, the cam member 155 and the sprocket wheel 161, and hinders charging of the shutter. No exposure is taken in the exposure-inhibit regions of the photo film even when shock or vibration occurs.

In FIG. 13A, a detection hole 151a is formed in the counter disk 152 to be used in the initial setting of the frame counter mechanism. The upper plate 167 is provided with a slot 167c and a hole 167d. The detection hole 151a is moved past the slot 167c at the time of the initial setting of the counter disk 152. In FIG. 13B, the hole 167d is positioned at the detection hole 151a when the counter disk 152 is in the initial position.

There is a detection indicia 151b disposed on a top face of the counter disk 152. The slot 167c of the upper plate 167 is positioned at the detection indicia 151b when the counter disk 152 is set in its initial position. The detection indicia 151b is used for detecting the position of the counter disk 152 after the lens-fitted photo film unit is assembled. There is an opening which has the same shape as the slot 167c, is formed in the top wall of the rear cover and positioned at the slot 167c of the upper plate 167.

It is to be noted that other types of lens-fitted photo film units include a 15-exposure type and a 40-exposure type. For construction of the frame counter adapted to each number of the exposures, the numbers of the teeth of the retention gear 152a of the counter disk 152 and the stepping tooth train 163a are changed.

Recycling is hereinafter described. The lens-fitted photo film unit, after being withdrawn in each photo laboratory, is collected in a recycling factory. The recycling factory has a disassembly line 100 and an inspection/cleaning line. Also see FIG. 15. The disassembly line 100 disassembles the lens-fitted photo film unit. The inspection/cleaning line inspects performance of the relevant parts to be reused, and cleans the parts. The disassembly line 100 is constituted by devices and units which are described below.

The disassembly line 100 includes nearly the same first to ninth processes as those described in relation to the lens-fitted photo film unit of FIGS. 1 and 2. Only the fifth process of the disassembly line 100 is different from that described above. In the fifth process, the switch plate, the receiver plate and the taking lens 105 are removed from a main body 115. The main body 115 will be treated in a state without the taking lens 105 throughout the sequence of the inspection/cleaning line.

A recyclable main body, or the main body 115 provided with various parts, is transferred to the inspection/cleaning line, the various parts including such at the cassette holder chamber 130 as the speed reduction gear 139, the toothed wheel portion 140, the cam wheel portion 142, the plate spring 144, the cassette shutter closing member 147, the bias spring 148 and the lock lever 150, and such at the light-shielded tunnel 129 as the viewfinder lens 132, the counter disk 152, the retainer lever 153, the shutter drive lever 154, the cam member 155, the first coil spring 156, the second coil spring 157, the shutter blade 158, the return spring 159, the lens-holder/shutter-cover 160, the sprocket wheel 161 and the upper plate 167. Similarly the electronic flash unit, the switch plate and the receiver plate are sent to inspection/cleaning lines respectively installed for them. The front cover and the rear cover are pelletized and reused as raw material.

Figure 14:
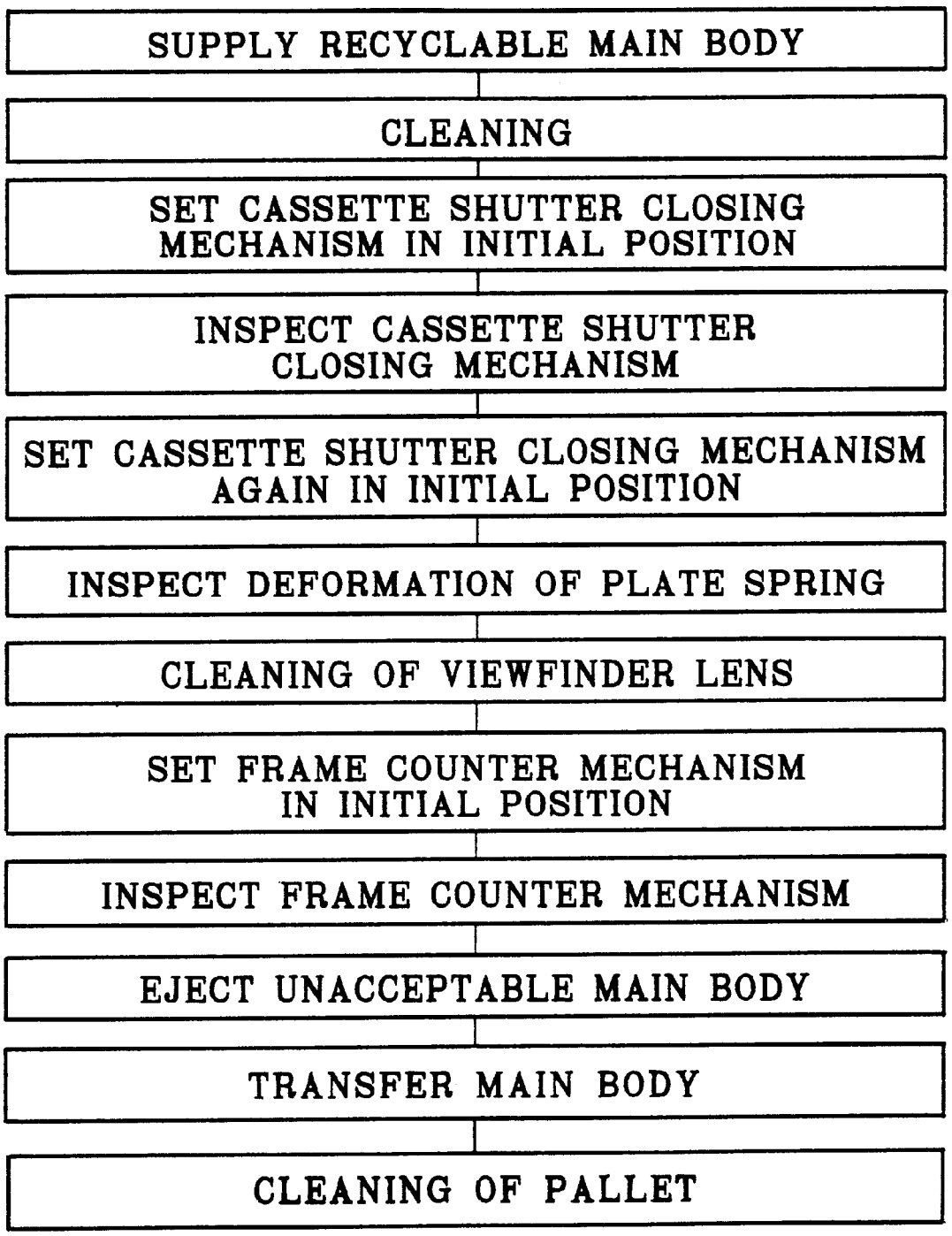
FIG. 14 is a flow chart illustrating operations on the inspection/cleaning line.

In FIG. 14, a flow of operations on the inspection/cleaning line for a recyclable main body 171 or reusable unit is illustrated. For the recyclable main body 171, see FIG. 15. Processes in the flow of the inspection/cleaning line includes a process of supplying the recyclable main body, a process of cleaning the recyclable main body, a process of setting the cassette shutter closing mechanism, a process of inspecting the cassette shutter closing mechanism, a second process of setting the cassette shutter closing mechanism, a process of inspecting deformation of the plate spring for the speed reduction gear, a process of cleaning the viewfinder lens, a process of initially setting the frame counter mechanism, a process of inspecting the frame counter mechanism, a process of ejecting unacceptable articles, a process of transferring the main body, and a process of cleaning pallets.

Figure 15:
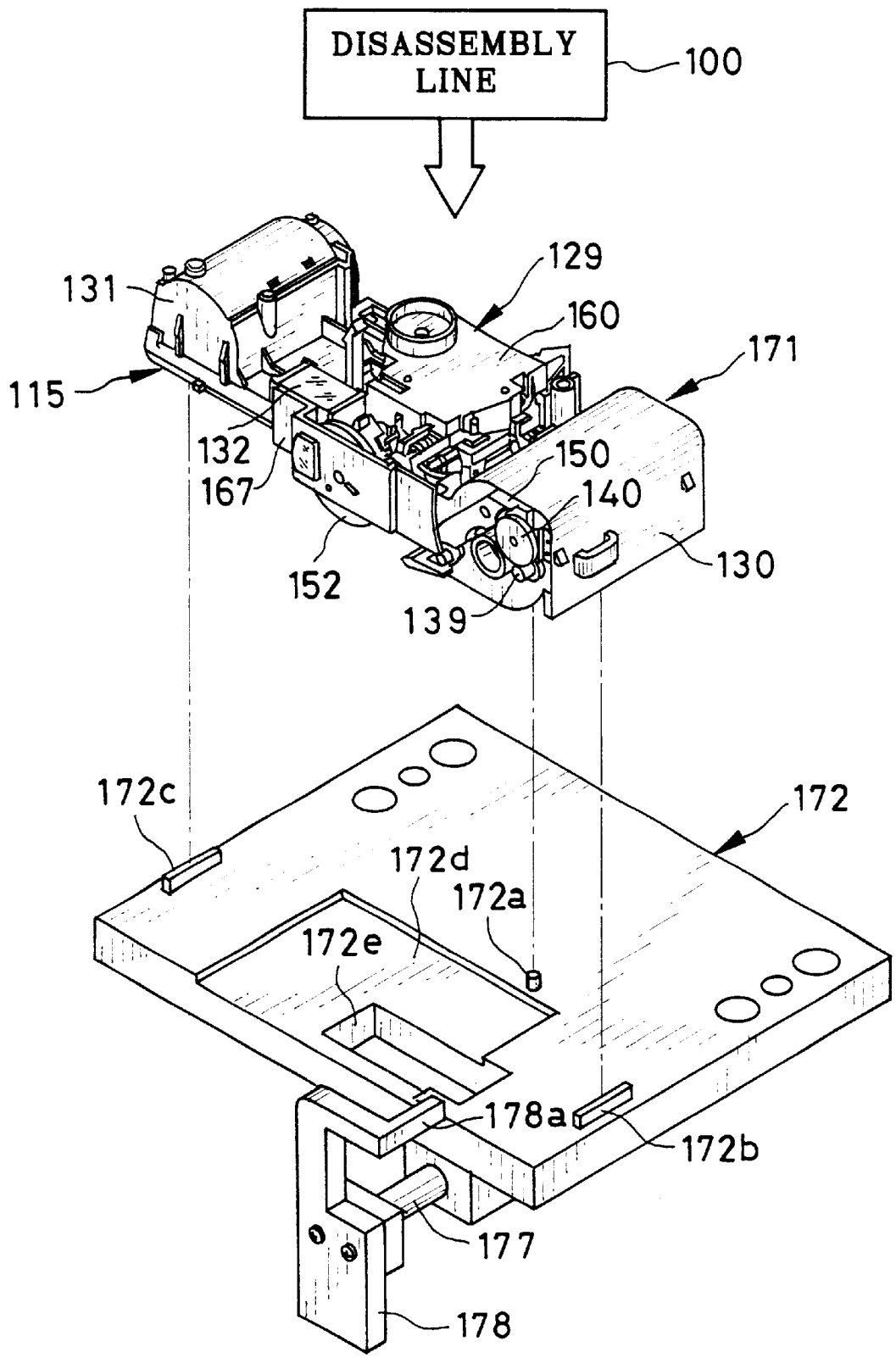
FIG. 15 is a perspective illustrating a pallet and the recyclable main body transferred from a disassembly line.

The above-described inspection/cleaning line is constituted by an intermittently rotating indexing table. Various units or devices are disposed on the periphery of the indexing table for the respective processes. Plural pallets 172 of a plate shape illustrated in FIG. 15, are arranged on the indexing table in an arc-shaped manner. A conveyor belt conveys the recyclable main body 171, which is transferred from the conveyor belt to one of the pallets 172 at a main body supply station by a Pick-&-Place (P-&-P) device comprising a robot hand or the like. The recyclable main body 171 is positioned on the pallet 172 with its front face directed upwards.

The pallet 172 has a plate shape. A top face of the pallet 172 includes a positioning pin 172a and positioning ridges 172b and 172c. The positioning pin 172a is inserted in a positioning hole in a rear wall of the main body 115. The positioning ridges 172b and 172c contact inner faces of the cassette holder chamber 130 and a roll holder chamber 131. Also the pallet 172 has a recess 172d and an access opening 172e. The recess 172d operates to avoid interference with the counter disk 152. The access opening 172e receives insertion of various jigs or tools. A sliding shaft 177 is disposed on a bottom face of the pallet 172 in a manner slidable toward and away from the pallet 172. A push member 178 or push jig is secured to an axial end of the sliding shaft 177. A push portion 178a of the push member 178 projects toward the recyclable main body 171. In each station for the above-described various processes, a driving device is disposed, which drives the push member 178 to move between two positions. The push member 178 operates for initial setting of the cassette shutter closing mechanism.

Figure 16:
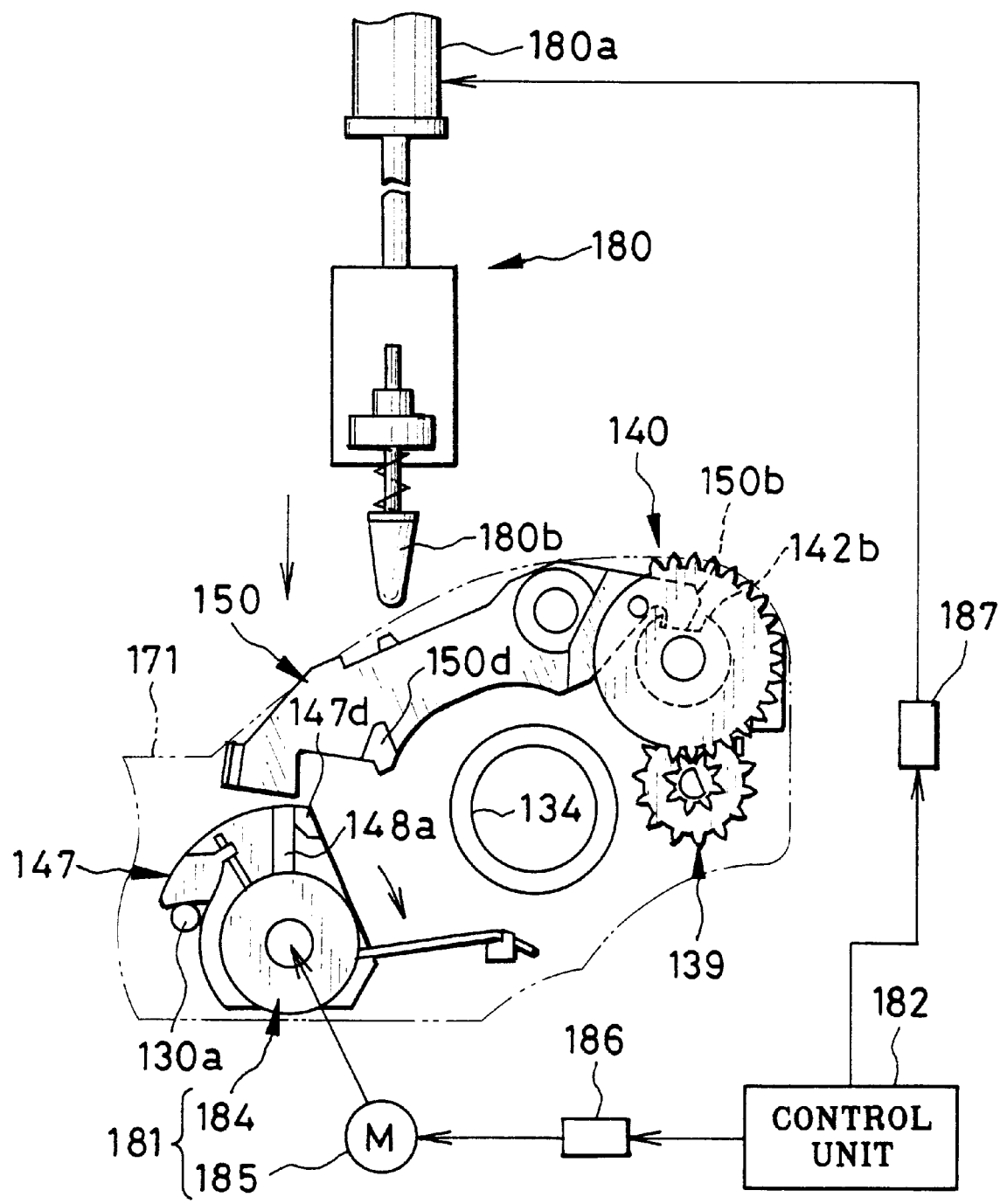
FIG. 16 is an explanatory view in elevation, illustrating a lock lever setter and a closing member setter both actuated in a closing mechanism setting sequence.

In the station for the cleaning process, there are a device for blow of antistatic air and an air suction device. To the recyclable main body 171, the antistatic air blow device blows the recyclable main body 171 with air or antistatic air, to remove dust or unwanted particles, or static charge from the recyclable main body 171. The air suction device sucks the removed dust and keeps from sticking again to the recyclable main body 171. The recyclable main body 171 being cleaned is transferred to stations for the process of setting the cassette shutter closing mechanism. In FIG. 16, the cassette shutter closing mechanism is in such a state that the cam notch 142b of the cam wheel portion 142 is engaged with the detection projection 150b of the lock lever 150, and that the cassette shutter closing member 147 is kept by the bias spring 148 in a shutter closing position associated with the closed position of the cassette shutter 127.

The sequence of setting the cassette shutter closing mechanism is constituted by a process of moving the cassette shutter and the lock lever and a process of setting the cam member in an initial position. The sequence of setting the cam member in the initial position is constituted by a process of positioning the speed reduction gear and a process of setting the detection gear in an initial position. For the sequence of moving the cassette shutter and the lock lever, there is used a closing mechanism setter device, which includes a lock lever setter 180, a closing member setter 181 and a control unit 182. The lock lever setter 180 is constituted by a drive section 180a and a push member 180b. The drive section 180a causes the push member 180b to move between a retracted position and a push position. The push member 180b, when in the retracted position, is away from the recyclable main body 171, and when in the push position, pushes the lock lever 150 toward the locking position.

The closing member setter 181 is constituted by a rotating shaft 184, a moving mechanism (not shown) and a motor 185. An end of the rotating shaft 184 is provided with an engaging portion 184a which is engageable with a reset projection 147d of the lever portion 147b of the cassette shutter closing member 147. The engaging portion 184a is rotatable about an axis of the cassette shutter closing member 147. The moving mechanism consists of a solenoid, an air cylinder, a cam mechanism and the like, and moves the rotating shaft 184 between a retracted position and an engaged position. The engaging portion 184a, when the rotating shaft 184 is in the retracted position, is away from the recyclable main body 171, and when the rotating shaft 184 is in the engaged position, is engaged with the reset projection 147d. The motor 185 rotates the rotating shaft 184 toward the shutter opening position of the cassette shutter closing member 147. The motor 185 may be a replaced by power source of any type, for example an actuator.

Figure 17:
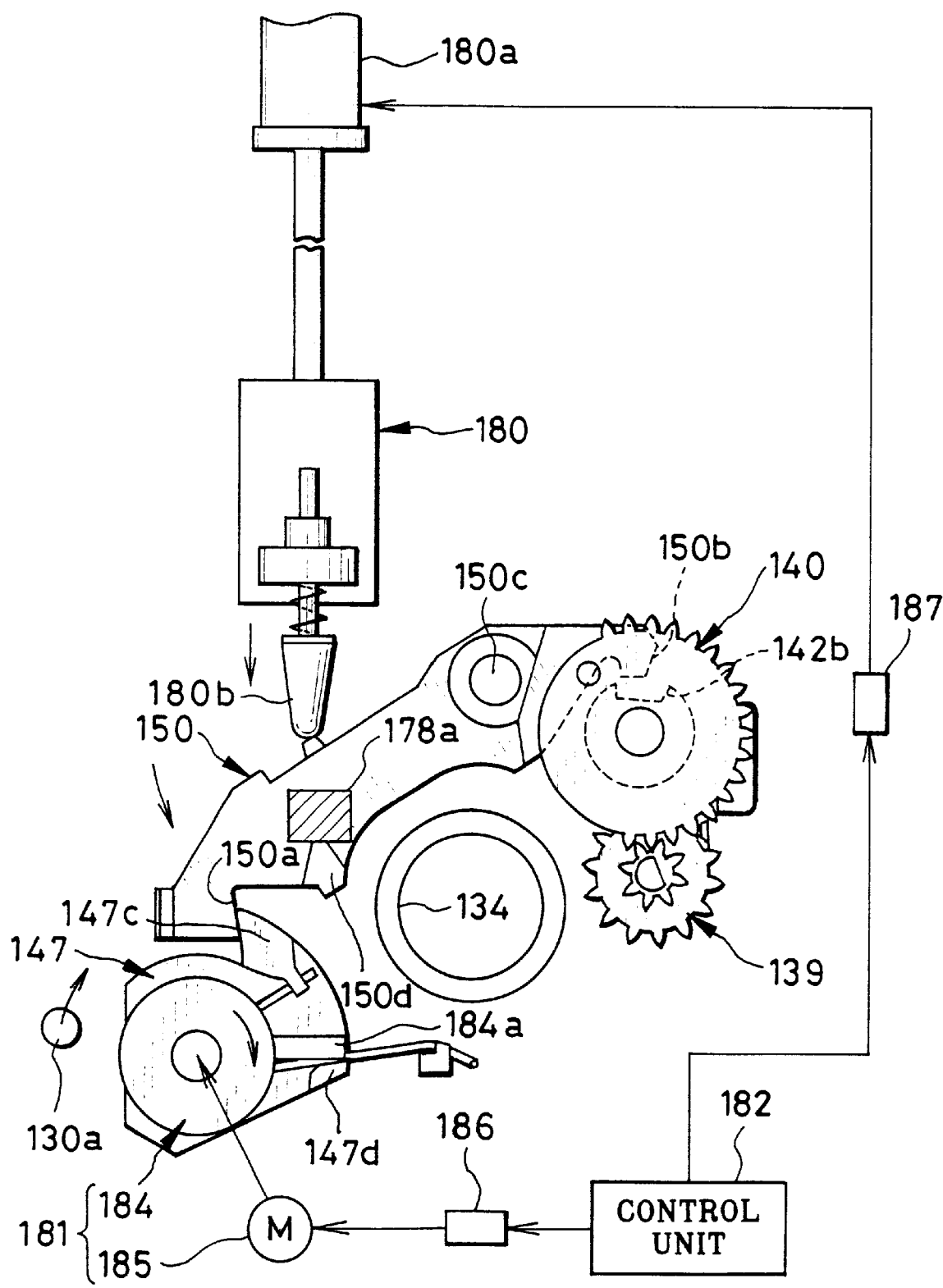
FIG. 17 is an explanatory view in elevation, illustrating the same as FIG. 16 but in which a lock lever and a cassette shutter closing member have been shifted.

The control unit 182 controls the lock lever setter 180 and the closing member setter 181 in an overall manner. The control unit 182 causes a driver 187 to drive the drive section 180a, so that the lock lever 150 is pushed by the push member 180b toward the locking position. At the same time, the control unit 182 actuates the moving mechanism to engage the engaging portion 184a of the rotating shaft 184 with the reset projection 147d, and causes a driver 186 to drive the motor 185. Thus the cassette shutter closing member 147 is rotated to the shutter opening position. As illustrated in FIG. 17, the lock lever 150 is rotated to the locking position to lock the cassette shutter closing member 147 in the shutter opening position. The detection projection 150b of the lock lever 150 is disengaged from the cam notch 142b. The toothed wheel portion 140 and the speed reduction gear 139 become rotationally free.

At present the cam notch 142b still remains positioned to face the detection projection 150b. Should there occur vibration or shock to the lock lever 150, the lock lever 150 is likely to rotate toward the unlocking position. Accordingly the closing mechanism setter device is provided with a drive member which moves the push member 178 of the pallet 172 from the retracted position to the push position. After the push member 180b pushes the lock lever 150 to the locking position, the control unit 182 controls the drive member to move the push member 178 of the pallet 172 to the push position. Then the push portion 178a keeps the lock lever 150 set in the locking position by means of a stopper projection 150d. As the lock lever 150 is kept in the locking position on the pallet 172, there does not occur inadvertent movement of the lock lever 150 to the unlocking position before the reach of the pallet 172 to a station for positioning the speed reduction gear. Afterwards, relevant moving mechanisms cause the rotating shaft 184 and the lock lever setter 180 to move to their retracted positions.

For the process of positioning the speed reduction gear, the closing mechanism setter device includes a reduction gear rotating wheel 189, a moving mechanism (not shown), a motor 190, a position detector 191 and a control unit 192. See FIG. 18. Those cooperate for setting the speed reduction gear 139 in the predetermined position. The speed reduction gear 139 is a combination of the great-diameter gear portion 139a and the small-diameter gear portion 139b, which are different in the number of the teeth. Even while the toothed wheel portion 140 is simply meshed with the single tooth 137a, there are plural different rotational positions of the speed reduction gear 139 due to the orientation of the great-diameter gear portion 139a and the small-diameter gear portion 139b. Should the speed reduction gear 139 not be rotationally set in a precise predetermined one of the positions, the position of the toothed wheel portion 140 to finish the winding may be incorrect. Note that the predetermined position of the speed reduction gear 139 is defined one tooth short of its meshing position with the toothed wheel portion 140 which is in its initial position.

The reduction gear rotating wheel 189 includes a shaft portion 193 and a gear portion 194. The shaft portion 193 is inserted in and engaged with the sleeve portion 134 of the shaft portion 112b of the winder wheel 112. The gear portion 194 comes in mesh with the great-diameter gear portion 139a of the speed reduction gear 139 when the shaft portion 193 is inserted in the sleeve portion 134. The gear portion 194 has four teeth arranged on the periphery at a regular pitch, and rotates the speed reduction gear 139 without degrading resiliency of the plate spring 144. The moving mechanism consists of a solenoid, an air cylinder, a cam mechanism and the like, and moves the reduction gear rotating wheel 189 between a retracted position and an inserted position. The reduction gear rotating wheel 189, when in the retracted position, is away from the recyclable main body 171, and when in the inserted position, causes the shaft portion 193 to enter the sleeve portion 134. The position detector 191 is so disposed that the positioning shaft 139c of the recyclable main body 171 is located between two parts of the position detector 191.

The motor 190 rotates the gear portion 194 for rotating the speed reduction gear 139 in one direction. The motor 190 may be replaced by a power source of any type, for example an actuator. The position detector 191 is constituted by a beam projector 195 and a beam receiver 196, which are combined as a transmission type of a photoelectric sensor. A beam projecting axis 191a of the beam projector 195 is positioned to be perpendicular to a rotational axis of the positioning shaft 139c. The beam projecting axis 191a is directed to pass precisely along the face of the positioning shaft 139c having the D-shape in section at the time that the speed reduction gear 139 is set in a predetermined rotational position. A beam emitted by the beam projector 195 is received by the beam receiver 196 to detect the rotational position of the speed reduction gear 139 in a manner without contact.

The control unit 192 actuates the moving mechanism to move the reduction gear rotating wheel 189 to the inserted position. Then a driver 190a is caused to drive the motor 190. Thus the reduction gear rotating wheel 189 rotates the speed reduction gear 139. During the rotation of the reduction gear rotating wheel 189, the control unit 192 monitors an output of the beam receiver 196, and when the control unit 192 receives a detection signal from the beam receiver 196, stops the motor 190. The toothed wheel portion 140 is so oriented that the toothless arc-shaped section 140a of the toothed wheel portion 140 is opposed to a meshing position of the small-diameter gear portion 139b of the speed reduction gear 139. The toothed wheel portion 140 is now rotationally free, as disengaged from the small-diameter gear portion 139b of the speed reduction gear 139. Note that the rotationally free state of the toothed wheel portion 140 is in consideration of an unexpected rotational orientation of the toothed wheel portion 140 which is different from that of FIG. 16 even upon withdrawal of the lens-fitted photo film unit. As the cassette shutter closing mechanism must be set back to the initial position irrespective of unexpected rotational orientation of the toothed wheel portion 140, the meshed state between the toothed wheel portion 140 and the speed reduction gear 139 should be released in the course of the readjustment.

Figure 18:
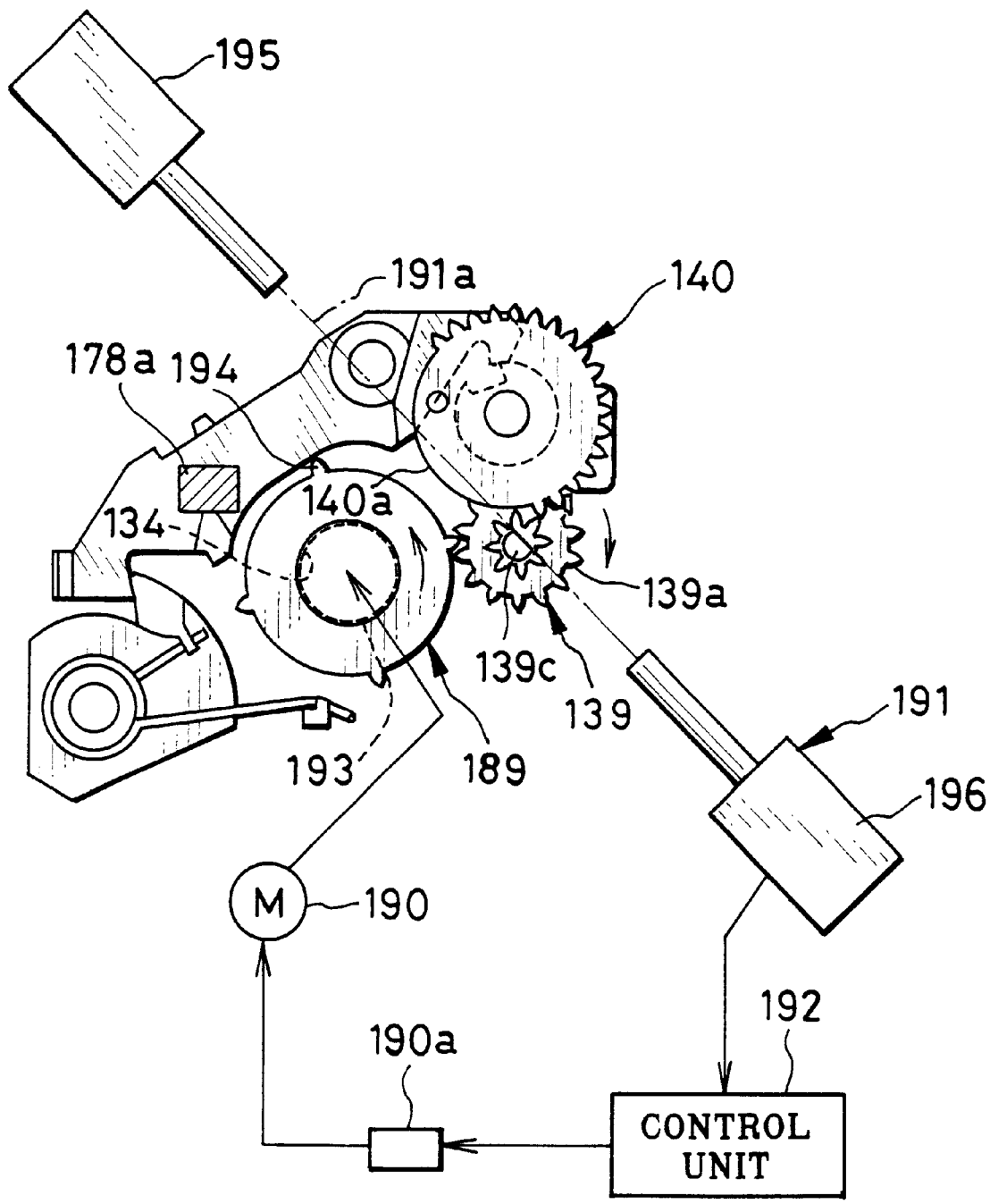
FIG. 18 is an explanatory view in elevation, illustrating a speed reduction gear setter actuated in the closing mechanism setting sequence.

The cam notch 142b, when in the position illustrated in FIG. 18, rotates away from the detection projection 150b. The cam surface 142a becomes opposed to the detection projection 150b, and keeps the lock lever 150 in the locking position. There is a drive member which causes the push member 178 of the pallet 172 to move to the retracted position. The control unit 192 controls the drive member to move the push member 178 of the pallet 172 to the retracted position. In response to this, the push portion 178a releases the lock lever 150 from being kept in the locking position. Even though the lock lever 150 is rendered free on the side of the pallet 172, the lock lever 150 still remains in the locking position, and does not cause a problem.

Figure 19:
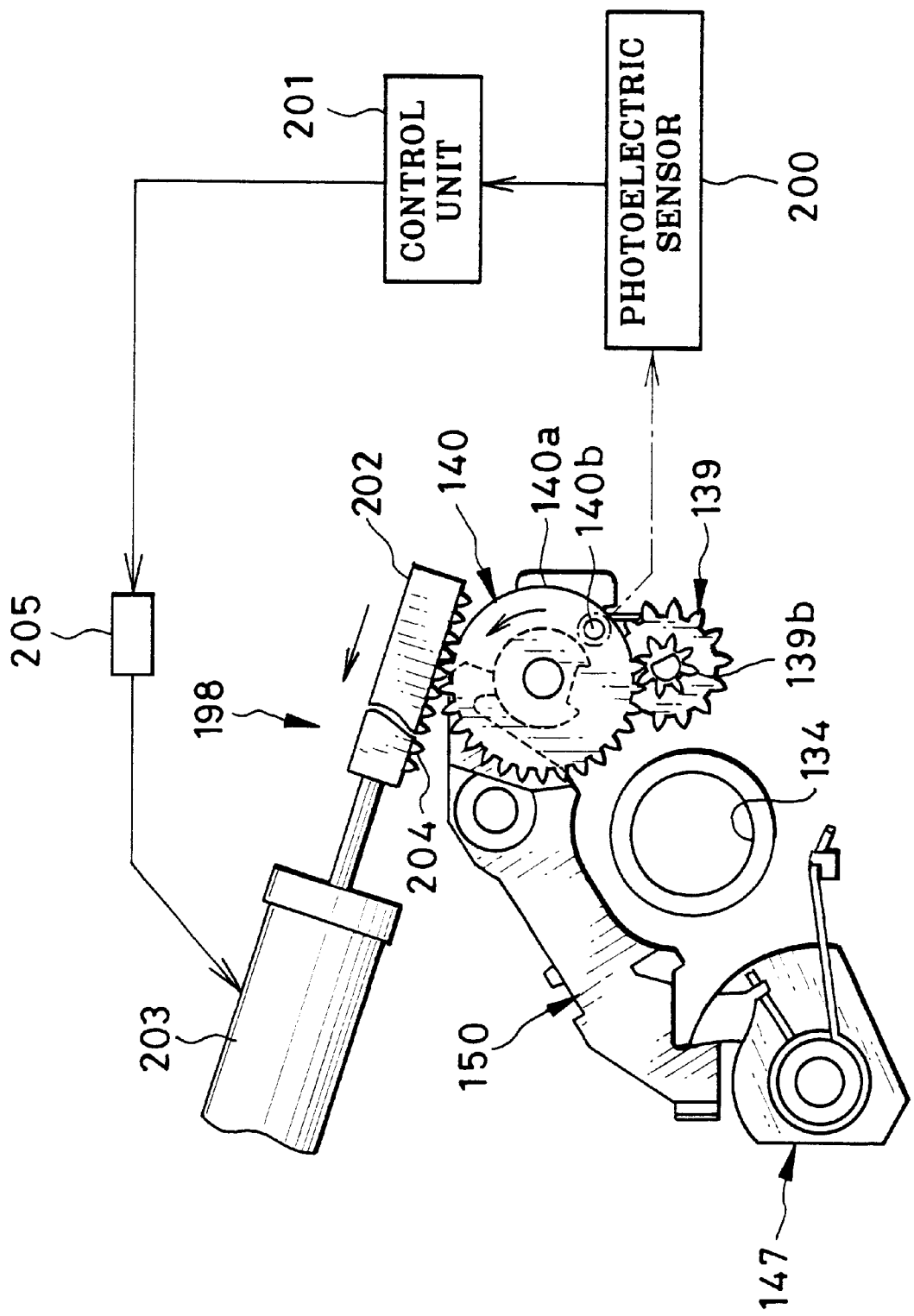
FIG. 19 is an explanatory view in elevation, illustrating a detection gear setter actuated in the closing mechanism setting sequence.

In FIG. 19, the closing mechanism setter device also includes a detection gear setter 198, a rack moving mechanism (not shown), a position detector and a control unit 201. The detection gear setter 198 is constituted by a rack plate 202 and a drive mechanism 203. The rack plate 202 has a rack 204 meshed with the toothed wheel portion 140. The drive mechanism 203 causes the rack plate 202 to move back and forth in parallel with its pitch plane in the position of meshing with the toothed wheel portion 140. The rack moving mechanism is a combination of, for example, a solenoid, an air cylinder, a cam mechanism and the like, and causes the detection gear setter 198 to move between a retracted position and a meshing position. The rack plate 202, when the detection gear setter 198 is in the retracted position, is away from the recyclable main body 171, and when the detection gear setter 198 is in the meshing position, is meshed with the toothed wheel portion 140. The movement of the rack plate 202 is parallel with a rotational axis of the toothed wheel portion 140.

The position detector consists of a reflection type of photoelectric sensor 200, which detects the positioning hole 140b of the toothed wheel portion 140 in a non-contact manner to check whether the toothed wheel portion 140 is rotationally in its initial position. The control unit 201 effects an overall control of the detection gear setter 198, the rack moving mechanism and the position detector, and actuates the rack moving mechanism to mesh the rack 204 with the toothed section around the toothed wheel portion 140. Then a driver 205 is caused to drive the drive mechanism 203 to move the rack plate 202 in one direction by a predetermined amount. Thus the toothed wheel portion 140 rotates in one direction by a predetermined amount. The rack 204 is disengaged from the toothed section of the toothed wheel portion 140, and comes to have a state without being meshed. Then the toothed wheel portion 140 is rotated back to its initial position, comes in mesh with the speed reduction gear 139, and rotates the speed reduction gear 139 by one tooth.

The control unit 201, after completing driving of the rack mechanism, receives a signal of detection of the positioning hole 140b from the photoelectric sensor 200, and checks a return of the toothed wheel portion 140 in its initial position. Presently the gear section of the toothed wheel portion 140 is meshed with the small-diameter gear portion 139b after the toothless arc-shaped section 140a rotates past the meshing position of the small-diameter gear portion 139b of the speed reduction gear 139. Then the toothed wheel portion 140 has returned to the initial position. Also the speed reduction gear 139 has returned to its initial position.

Note that, in the process of setting the toothed wheel portion 140 in its initial position, the positioning of the toothed wheel portion 140 causes the cam surface 142a of the cam wheel portion 142 to face the detection projection 150b of the lock lever 150, to maintain engagement between the lock lever 150 and the cassette shutter closing member 147. There is a jig moving device in the station for the gear setting process. The jig moving device moves the push member 178 away from the pallet 172 to release the lock lever 150 from retention of the push member 178.

A sequence of inspecting the cassette shutter closing mechanism is constituted by a process of quick rotation of the speed reduction gear and a process of inspecting operation of the cassette shutter closing member. In those processes, the speed reduction gear 139 and the toothed wheel portion 140 are rotated by the amount of winding the entirety of the photo film into the photo film cassette shell 123. The cassette shutter closing member 147 is checked as to rotation toward the closed position of the cassette shutter 127.

Figure 20:
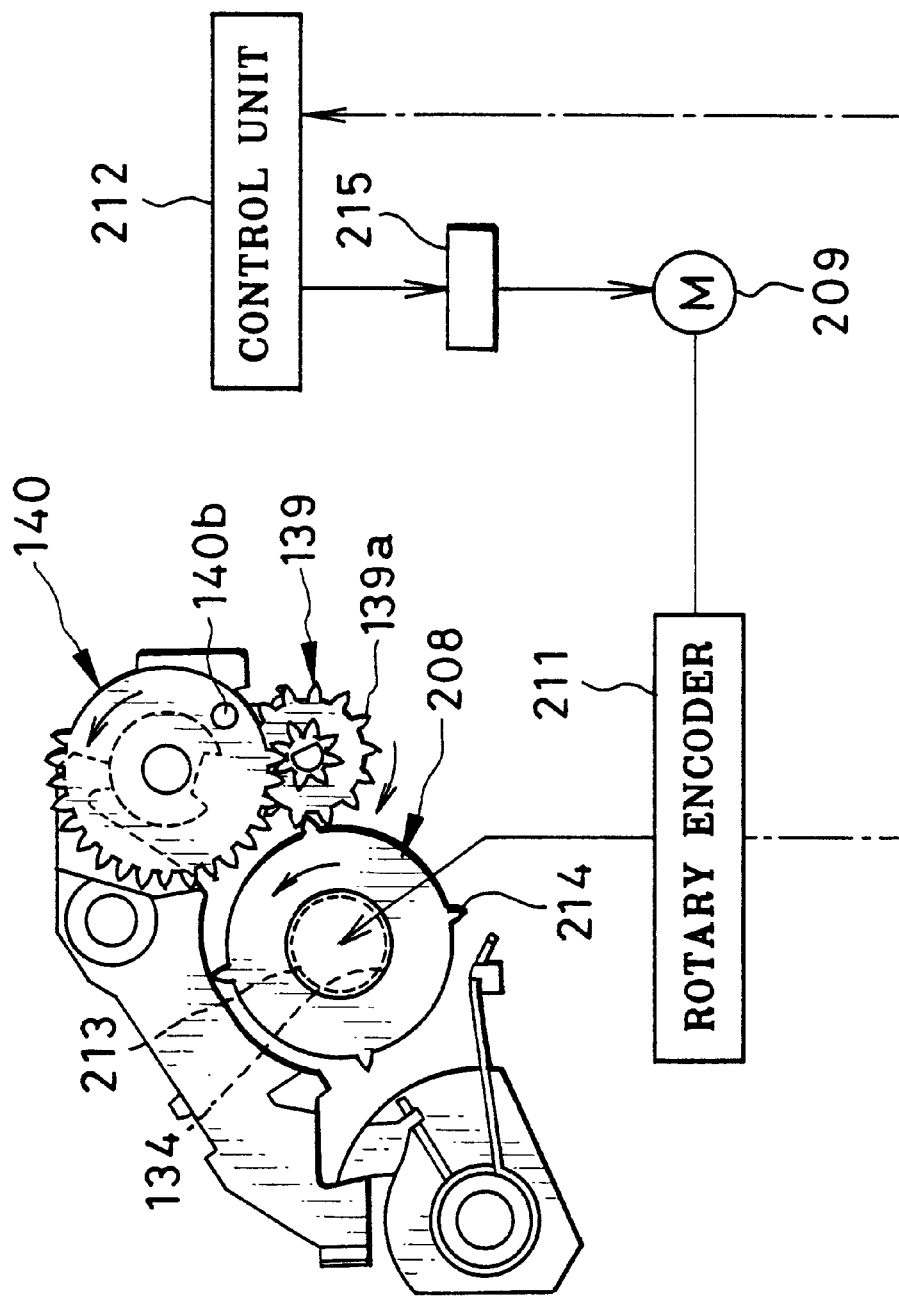
FIG. 20 is an explanatory view in elevation, illustrating a construction, actuated in a closing member inspecting sequence, for quickly rotating the speed reduction gear.

In FIG. 20, a station for the process of quick rotation of the speed reduction gear is provided with a reduction gear rotating wheel 208, a motor 209, a moving mechanism (not shown), a rotary encoder 211, and a control unit 212. The reduction gear rotating wheel 208 includes a shaft portion 213 and a gear portion 214. The shaft portion 213 is inserted in the sleeve portion 134. The gear portion 214 comes in mesh with the great-diameter gear portion 139a of the speed reduction gear 139 when the shaft portion 213 is inserted in the sleeve portion 134. The reduction gear rotating wheel 208 is structurally similar to the reduction gear rotating wheel 189 described above with the process of positioning the speed reduction gear. The moving mechanism consists of a solenoid, an air cylinder, a cam mechanism and the like, and moves the reduction gear rotating wheel 208 between a retracted position and an inserted position. The reduction gear rotating wheel 208, when in the retracted position, is away from the recyclable main body 171, and when in the inserted position, causes the shaft portion 213 to come into the sleeve portion 134. The motor 209 rotates the reduction gear rotating wheel 208, but furthermore may be a power source of any type, for example a rotary actuator. The rotary encoder 211 detects a rotational angle of the motor 209, and each time that the motor 209 rotates by a predetermined angle, sends a detection signal to the control unit 212.

The control unit 212, after the moving mechanism moves the reduction gear rotating wheel 208 to the inserted position, causes a driver 215 to drive the motor 209, so that the reduction gear rotating wheel 208 rotates the speed reduction gear 139. A signal is generated by the rotary encoder 211 during the rotation, and is counted. When the counted number becomes the same as corresponds to an amount of rotation of the winder wheel 112 up to a final one of frames, then the motor 209 is stopped. Then the toothed wheel portion 140 comes to a position determined upon winding to the final frame, namely a position one step short of the winding completing position.

Figure 21:
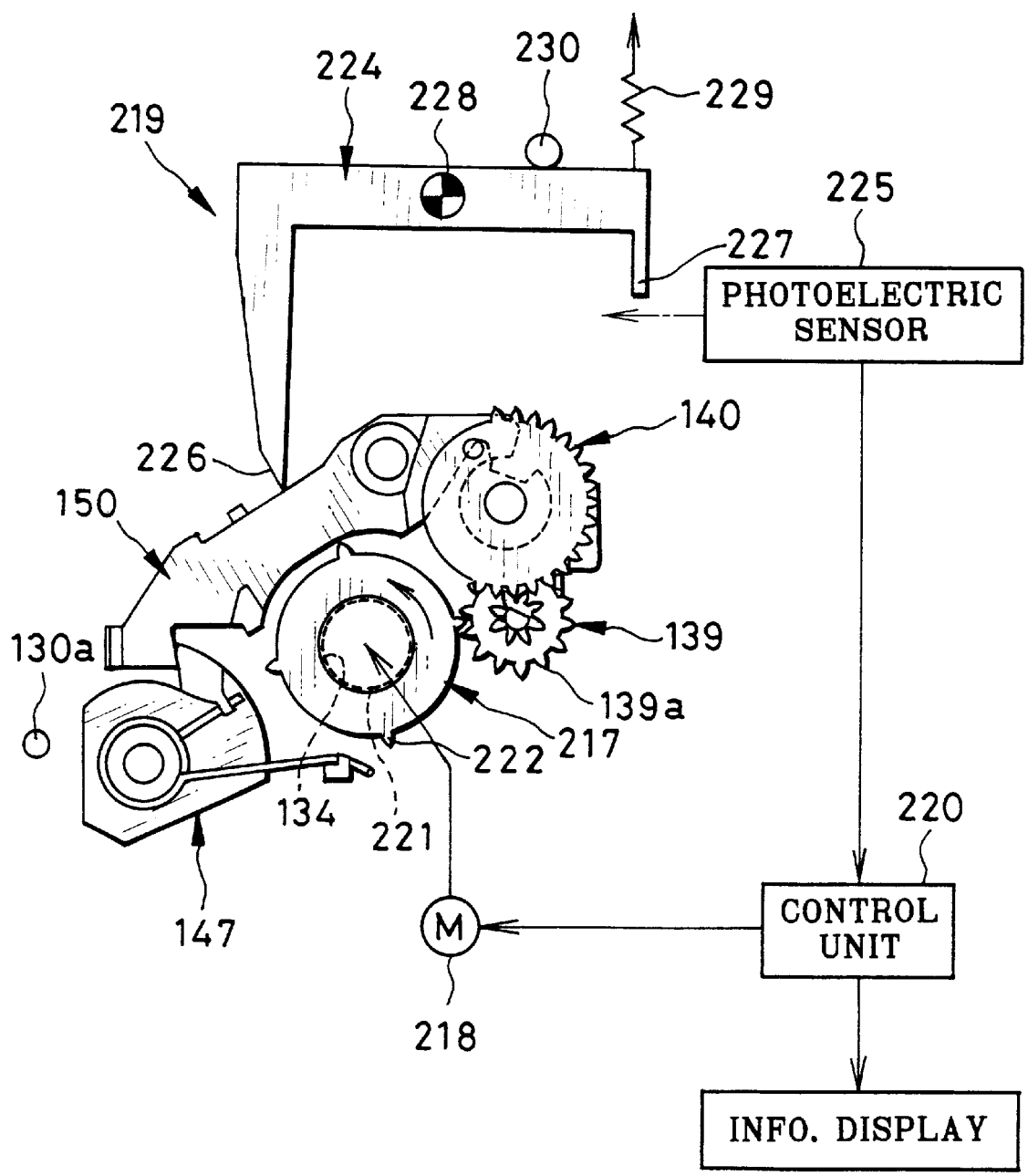
FIG. 21 is an explanatory view in elevation, illustrating a construction, actuated in the closing member inspecting sequence, for checking the cassette shutter closing member.

In FIG. 21, a station for the process of inspecting operation of the cassette shutter closing member is illustrated. The station is provided with a reduction gear rotating wheel 217, a motor 218, a moving mechanism (not shown), an inspector unit 219 and a control unit 220. The reduction gear rotating wheel 217 is constituted by a shaft portion 221 and a gear portion 222, and structured similarly to the reduction gear rotating wheel 189 or 208. The moving mechanism consists of a solenoid, an air cylinder, a cam mechanism and the like, and moves the reduction gear rotating wheel 217 between a retracted position and an inserted position. The reduction gear rotating wheel 217, when in the retracted position, is away from the recyclable main body 171, and when in the inserted position, causes the shaft portion 221 to be inserted into the sleeve portion 134. Also the moving mechanism moves the inspector unit 219 between a retracted position away from the recyclable main body 171 and a detection position close to the recyclable main body 171. The motor 218 may be replaced by a power source of any type, for example a rotary actuator.

The inspector unit 219 is constituted by an L-shaped detection arm 224 and a photoelectric sensor 225. The detection arm 224 is rotatable about a pivot 228 between a first end 226 and a second end 227, and kept in a predetermined orientation by a spring 229, a stopper 230 and the like. When the detection arm 224 is moved to the detection position by the moving mechanism, the first end 226 comes in contact with the lock lever 150, or enter a rotational orbit of the lock lever 150. The photoelectric sensor 225 is disposed in a position opposed to a rotational orbit of the second end 227. Upon the reach of the lock lever 150 to the unlocking position, the detection arm 224 is rotated in a clockwise direction against the spring 229. The second end 227 of the detection arm 224 is detected by the photoelectric sensor 225, to check the operation of the lock lever 150.

Figure 22:
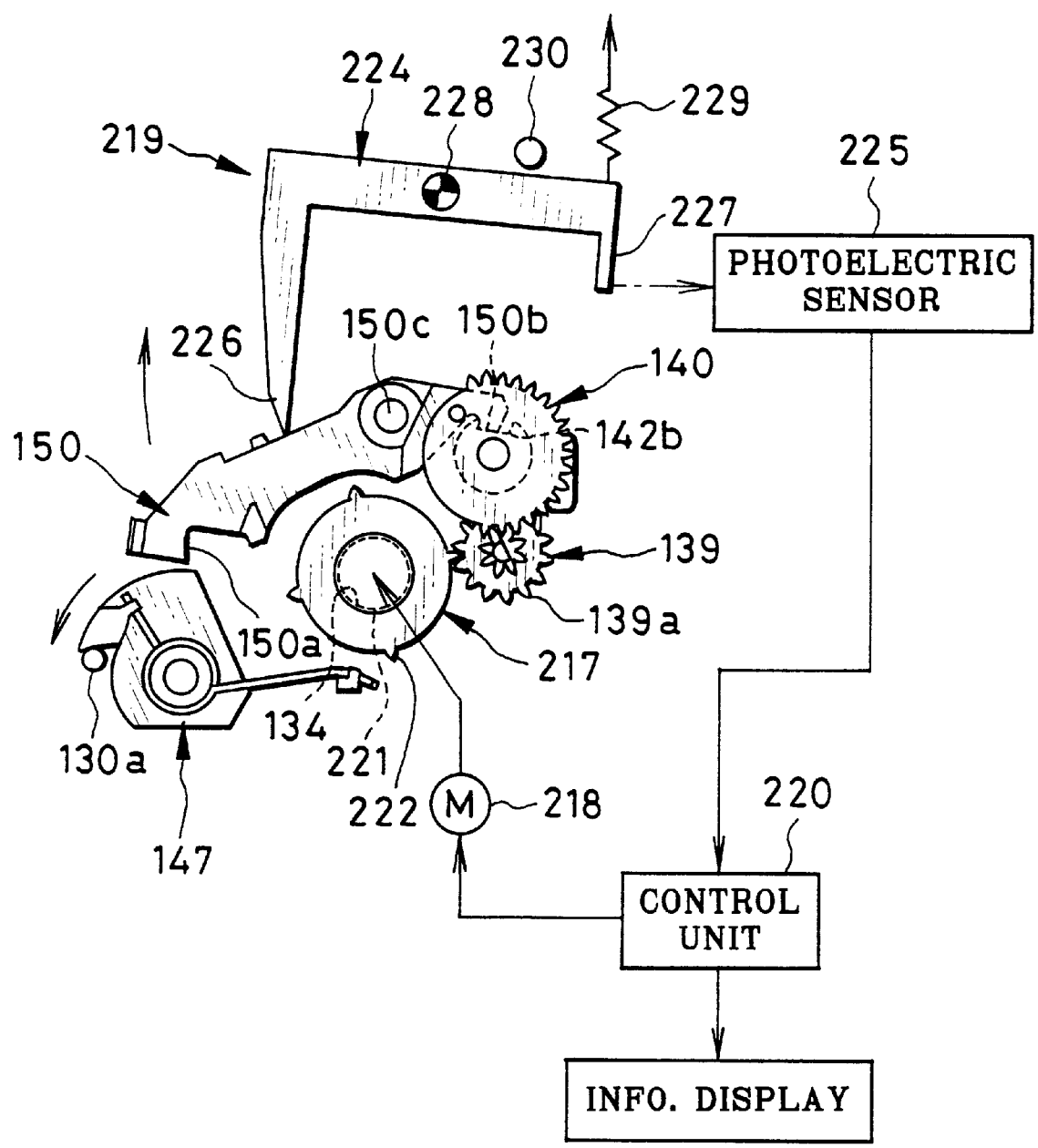
FIG. 22 is an explanatory view in elevation, illustrating the same as FIG. 21 but in which the cassette shutter closing member is being found acceptable.

The control unit 220 actuates the moving mechanism to move the reduction gear rotating wheel 217 to the inserted position, and also moves the inspector unit 219 to the detection position at the same time. Then the moving mechanism drives the motor 218 by a predetermined amount, so that the speed reduction gear 139 is rotated by such an amount as corresponds to photo film winding of the entirety of the photo film 124 into the photo film cassette shell 123 after exposure to a final frame. In FIG. 22, the toothed wheel portion 140 rotationally comes to a position at the time of completion of the entire winding of the photo film 124 into the photo film cassette shell 123. The cam notch 142b of the cam wheel portion 142 becomes opposed to the detection projection 150b of the lock lever 150, which is caused by the force of the bias spring 148 at the cassette shutter closing member 147 to rotate clockwise about the axial hole 150c to the unlocking position. The cassette shutter closing member 147 is unlocked from the lock lever 150, and is rotated by the bias spring 148 toward the closed position of the cassette shutter 127.

The control unit 220 monitors a signal generated by the photoelectric sensor 225 while the control unit 220 drives the motor 218. When the lock lever 150 moves to the unlocking position, the first end 226 of the detection arm 224 is pushed by the lock lever 150, and rotates in the counterclockwise direction against the bias of the spring 229. The second end 227 is detected by the photoelectric sensor 225, from which a detection signal is sent to the control unit 220. The control unit 220 monitors the detection signal, and if the detection signal is received before lapse of a predetermined time after stop of rotation of an amount enough for photo film winding, then recognizes acceptable rotation of the cassette shutter closing member 147 to the shutter opening position. If no detection signal is received, then failure is detected in rotation of the cassette shutter closing member 147 to the shutter opening position. In the case of failing operation of the cassette shutter closing member 147, the control unit 220 sends data of the unacceptability to a control unit in a station for ejection of unacceptable articles.

Stations for the second process of setting the cassette shutter closing mechanism are provided with devices or constructions the same as those of the process of moving the cassette shutter and the lock lever, the process of positioning the speed reduction gear, and the process of setting the detection gear in the initial position. Those processes are described by referring to FIGS. 15–18. The cassette shutter closing mechanism is set again to the initial position.

Figure 23:
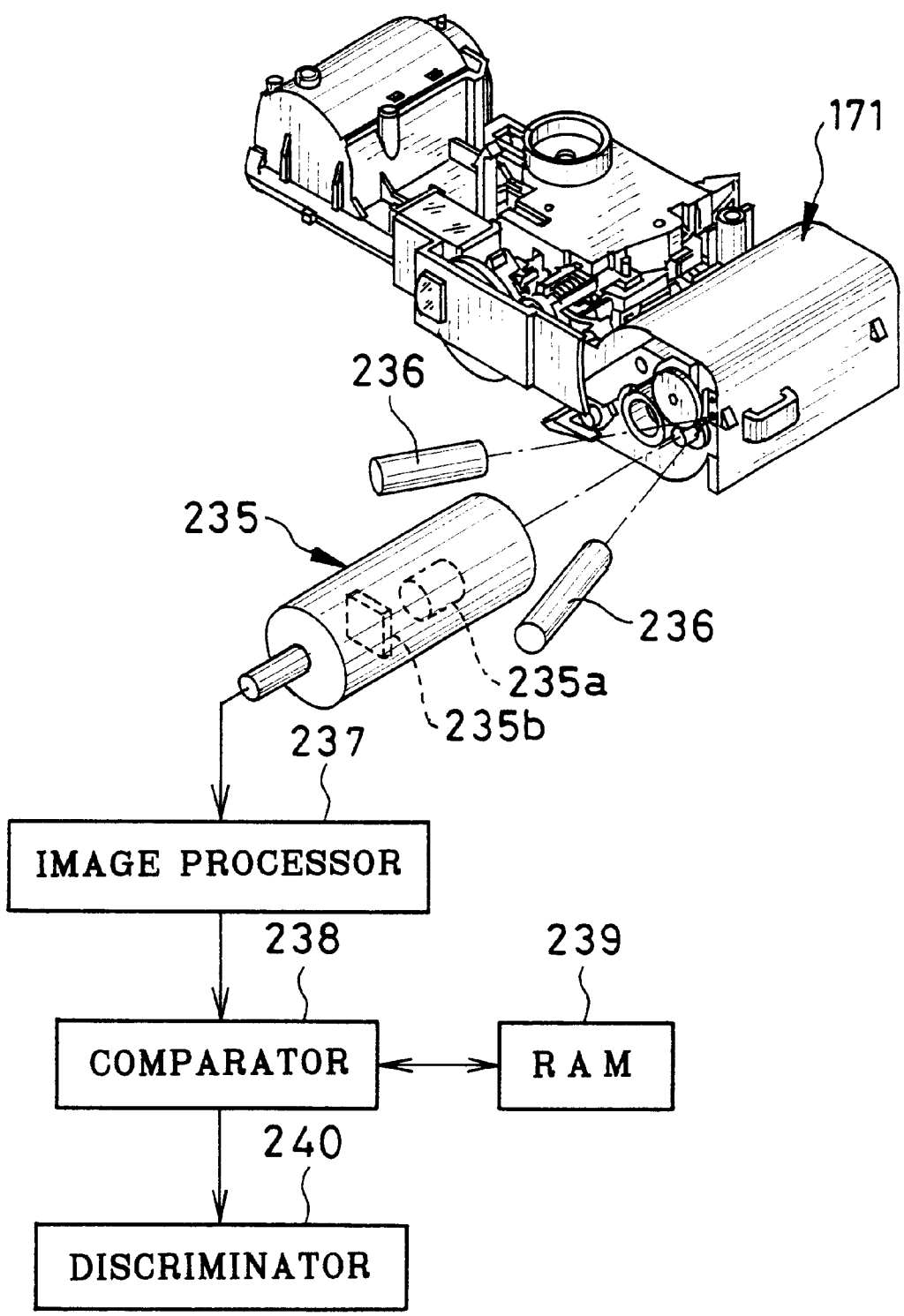
FIG. 23 is an explanatory view illustrating the recyclable main body and an inspector unit for a plate spring.

An inspector for deformation of the plate spring as illustrated in FIG. 23 is constituted by a pick-up unit 235, a light source 236, an image processor 237, a comparator 238, a RAM (random access memory) 239, and a discriminator 240. The light source 236 includes a plurality of fibre light sources for illumination with light fluxes of a small diameter by guiding halogen light through optical fibres, and applies light to the resilient portion 144a of the plate spring 144 in the recyclable main body 171 in a diffused manner. The pick-up unit 235 is constituted by an enlarging lens 235a and a CCD camera 235b, and picks up the light reflected by the resilient portion 144a in a direction perpendicular to a direction of resilient deformation of the resilient portion 144a. The image processor 237 binarizes information of the image being picked up, and displays it on a monitor screen. A window W is preset in the image processor 237 in a region inside the monitor screen and corresponding to a shape of the resilient portion 144a without irrecoverable deformation. See FIG. 24A. The image processor 237 obtains an area of pixels with white color inside the window W. A reinforcer portion 144b is formed with the resilient portion 144a of the plate spring 144 and has an L-shape bent perpendicular to the resilient portion 144a. The pick-up unit 235 picks up light reflected by a surface of the reinforcer portion 144b.

The comparator 238 compares the obtained area of the white pixels and a reference white pixel area previously stored in RAM 239. As the plate spring 144 is a piece of copper, the plate spring 144 is picked up as bright white image with reflected light upon application of halogen light. The plate spring 144, if deformed, is located offset from the window W, to reduce the number of white pixels located in the window W. The discriminator 240 checks whether the plate spring 144 can be reused or not according to the result of comparison from the comparator 238. The discriminator 240 stores a predetermined threshold value, for example 50%, for the retrieved area of the white pixels relative to the reference white pixel area. If the retrieved area of white pixels is equal to or more than 50% as illustrated in FIG. 24B, then the plate spring 144 is detected reusable. If the retrieved area of white pixels is less than 50% as illustrated in FIG. 24C, then the plate spring 144 is detected not reusable. In the case of the unacceptability of the plate spring 144, the discriminator 240 sends data of the unacceptability to a control unit in a station for ejection of unacceptable articles.

In the present embodiment, the window determining method is used, in which the window is preset in a predetermined position inside the monitor screen, for the purpose of inspection according to the number of pixels with white color or black color. Alternatively a characteristic deriving method may be used, in which characteristic values are derived from the image of the plate spring being picked up, and compared with reference values. Also, a pattern matching method may be used, in which the image being picked up is superimposed with preset data in a memory.

In the present embodiment, the CCD camera 235b is used. Of course a MOS type of a solid-state pick-up element, an image area sensor and other types of photo sensor may be used in the present invention.

The recyclable main body 171, after the first setting, the inspection and the second setting of the cassette shutter closing mechanism, is transferred by rotation of the indexing table to a station of cleaning the viewfinder lens 132. At first, the viewfinder lens 132 is subjected to air blow for removing dust or particles from the viewfinder lens 132 with the air. Then cleaning liquid is applied to surfaces of the viewfinder lens 132. Finally the surfaces of the viewfinder lens 132 are wiped with a cleaning tape.

After the viewfinder lens cleaning process, the recyclable main body 171 is sent to a station for setting the photo film counter mechanism to an initial position. A sequence of setting the photo film counter mechanism to an initial position is constituted by a shutter charging process, a counter disk rotating process, a shutter releasing process, a sprocket wheel rotating process, and a second shutter releasing process.

The shutter mechanism of the recyclable main body 171 is in a state of the finish of the use of the lens-fitted photo film unit. See FIG. 25. The shutter drive lever 154 is in the released position. The retainer lever 153 is in the non-retention position. The sprocket wheel 161, upon the final winding of the photo film 124, is in such a state that the sprocket teeth 161a and 161b are positioned inside the photo film rail surface 129c, as the sprocket wheel 161 has been rotated by a final one of the perforations 124a close to the end of the photo film 124. The cam member 155 has been rotated with the sprocket wheel 161. The cam notch 155f of the one-frame advancing cam 155b is not opposed to the one-frame advancing arm 153d of the retainer lever 153. The counter disk 152 is in such a finish position that the number "0" is pointed by the pointer 167b, as the final tooth 152c of the retention gear 152a is meshed with the retention cam 155g.

When the counter disk 152 is in the finish position, a lateral face of the sector-shaped lock portion 165 on the bottom of the counter disk 152 is contacted by the projection 153g of the retainer lever 153. The counter disk 152, the cam member 155 and the sprocket wheel 161 are kept from rotating.

Figure 25:
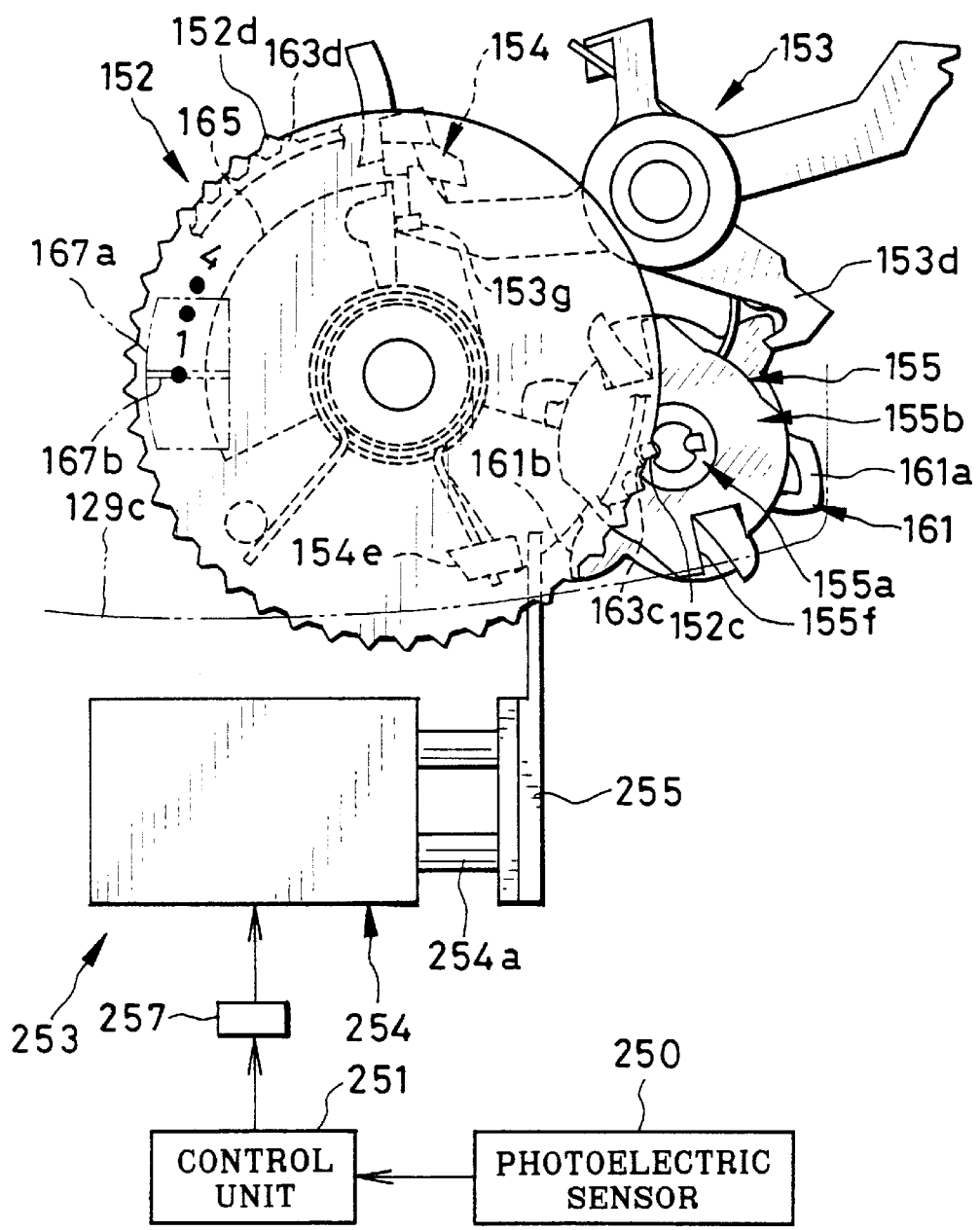
FIG. 25 is an explanatory view in elevation, illustrating a drive mechanism setter actuated in a counter setting sequence.

In the shutter charging process, the shutter mechanism is forcibly charged. In FIG. 25, a counter setter device has a station for the shutter charging process, and includes a drive mechanism setter 253 and a moving mechanism (not shown) for moving the drive mechanism setter 253. The moving mechanism consists of an air cylinder, a cam mechanism and the like, and moves the drive mechanism setter 253 between a retracted position away from the recyclable main body 171 and an effective position close to the recyclable main body 171. The drive mechanism setter 253 for charging is constituted by an air cylinder section 254 and a charger plate 255 or jig, which has a stick shape and secured to a plunger 254a of the air cylinder section 254. The plunger 254a is biased by a spring in a direction to protrude from the air cylinder section 254. When the air cylinder section 254 is driven, the plunger 254a becomes located inside the air cylinder section 254 against the bias of the spring.

Figure 26:
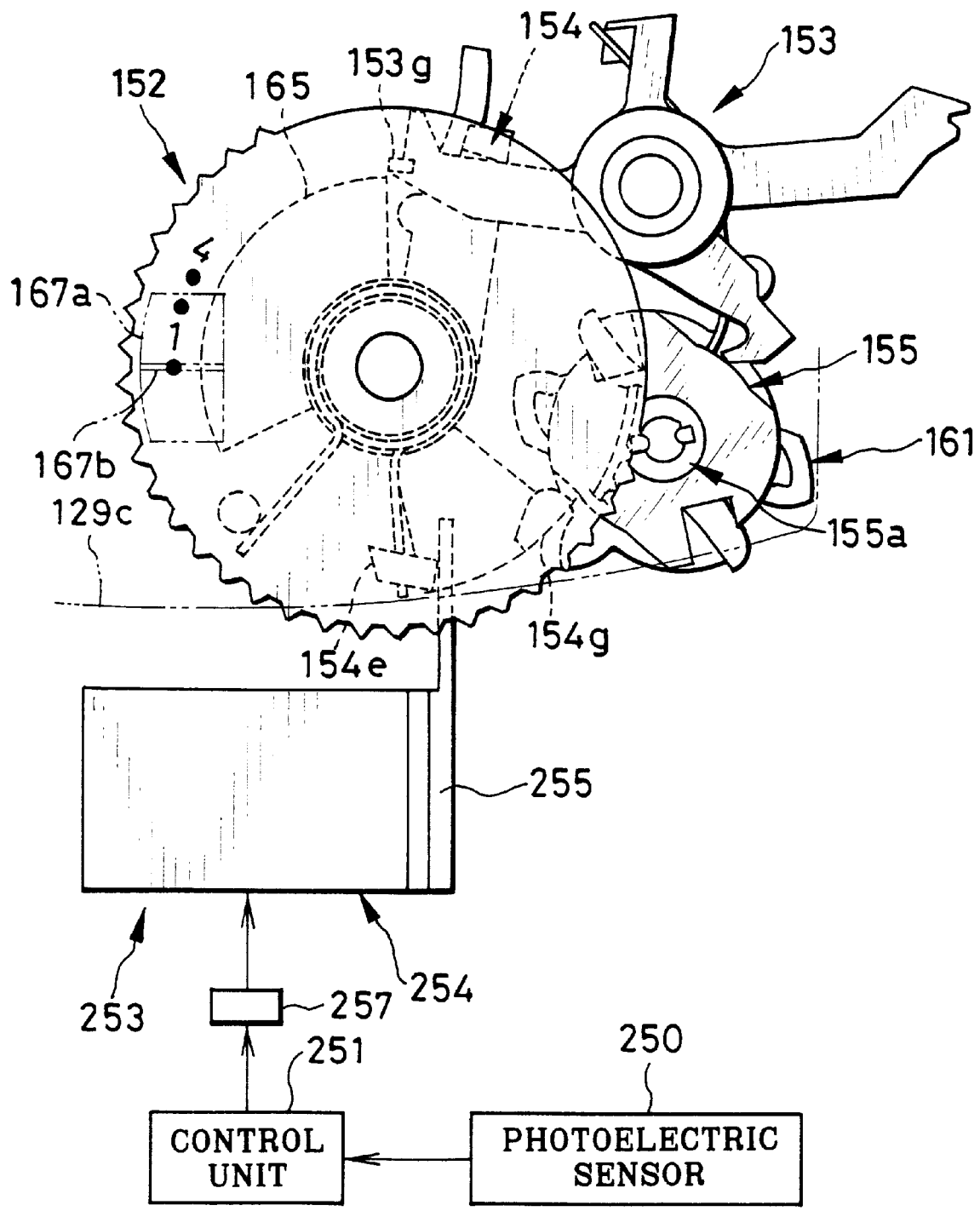
FIG. 26 is an explanatory view in elevation, illustrating the same as FIG. 25 but in which a shutter drive mechanism has been shifted to a charge position.

When the drive mechanism setter 253 is moved from the retracted position to the effective position by the moving mechanism, the charger plate 255 is inserted into the access opening 172e in the pallet 172. A tip of the charger plate 255 is moved into a gap between the spring retainer 154e and the projection portion 154g of the shutter drive lever 154. Then a control unit 251 causes a driver 257 to drive the air cylinder section 254. In FIG. 26, the plunger 254a is moved back into the air cylinder section 254. The charger plate 255 pushes the spring retainer 154e, and causes the shutter drive lever 154 to rotate from the release position to the charge position clockwise. The retainer lever 153 biased by the second coil spring 157 rotates from a free position to a retained position clockwise, becomes engaged with the shutter drive lever 154 being in the charge position, and keeps the shutter drive lever 154 positioned. Upon rotation of the retainer lever 153 to the retained position, the projection 153g of the retainer lever 153 moves away from the sector-shaped lock portion 165. Thus the counter disk 152 is allowed to rotate in the clockwise direction.

Note that a photoelectric sensor 250 may be used to detect a rotational position of the retainer lever 153, to check the result of charging of the shutter mechanism.

Figure 27:
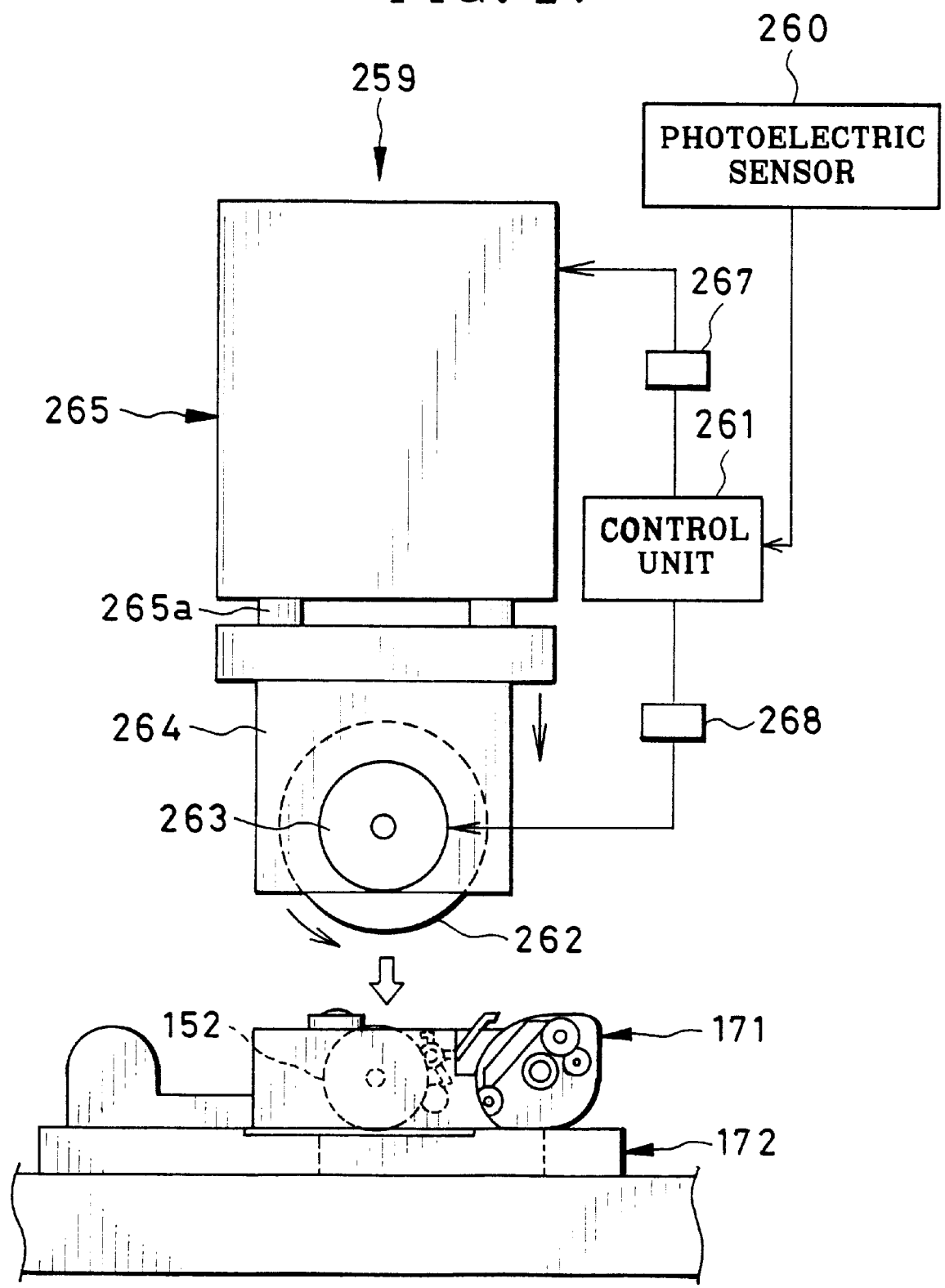
FIG. 27 is an explanatory view in elevation, illustrating a counter setter section actuated in the counter setting sequence.
Figure 28:
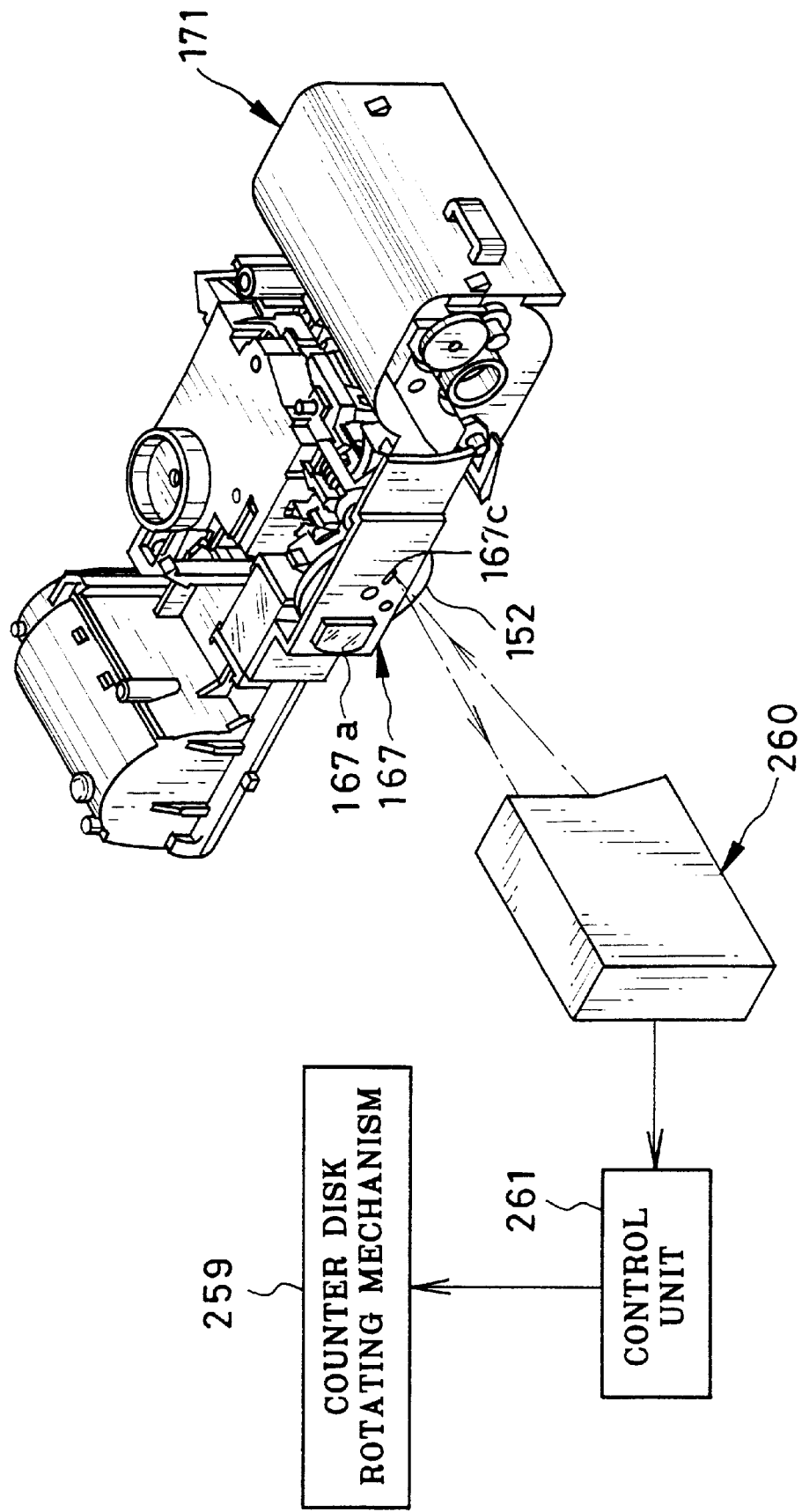
FIG. 28 is an explanatory view in perspective, illustrating detection of a disk rotational position according to the counter setter section of FIG. 27.
Figure 29:
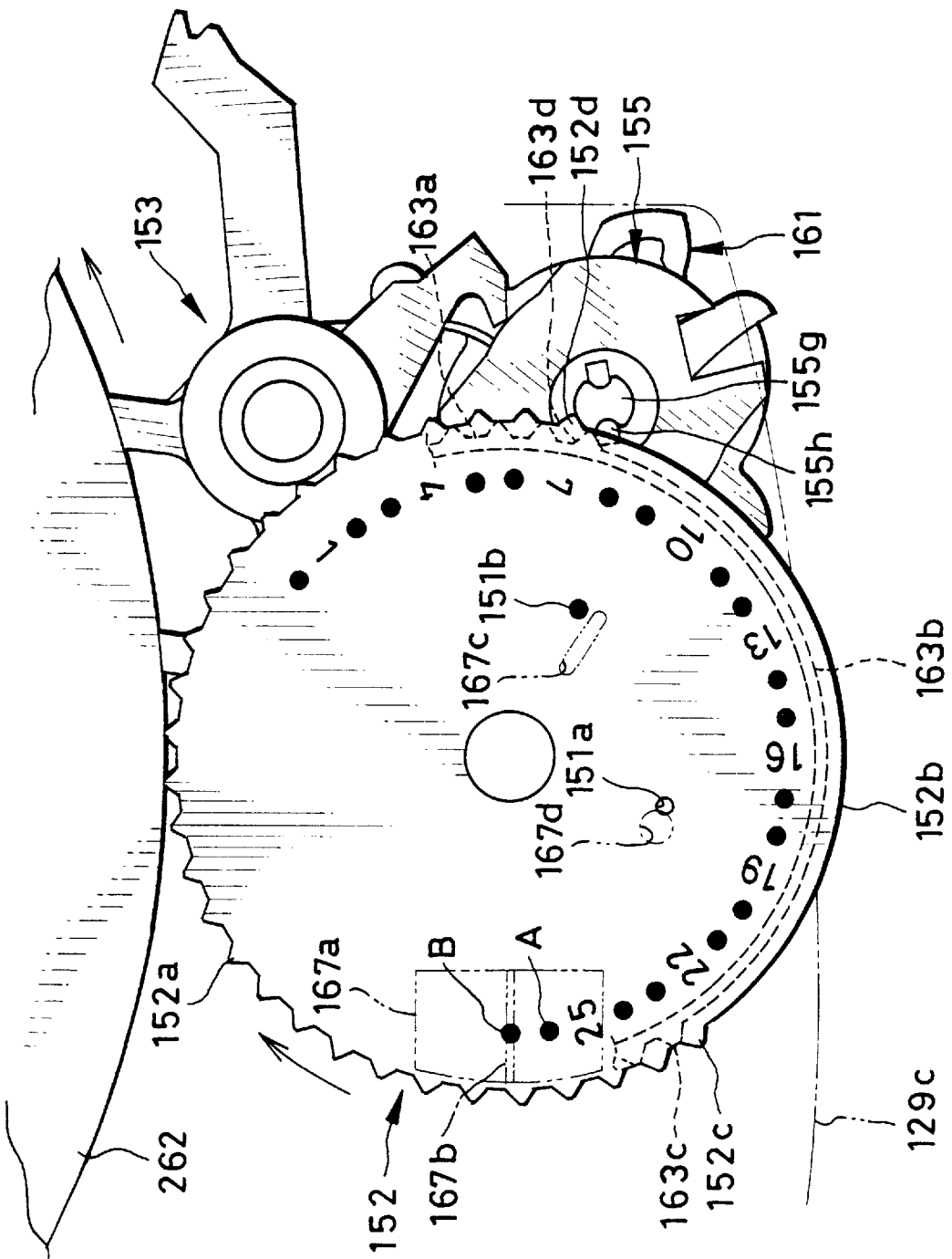
FIG. 29 is an explanatory view in elevation, illustrating a state in which the counter setter section rotates a frame counter disk.
Figure 30:
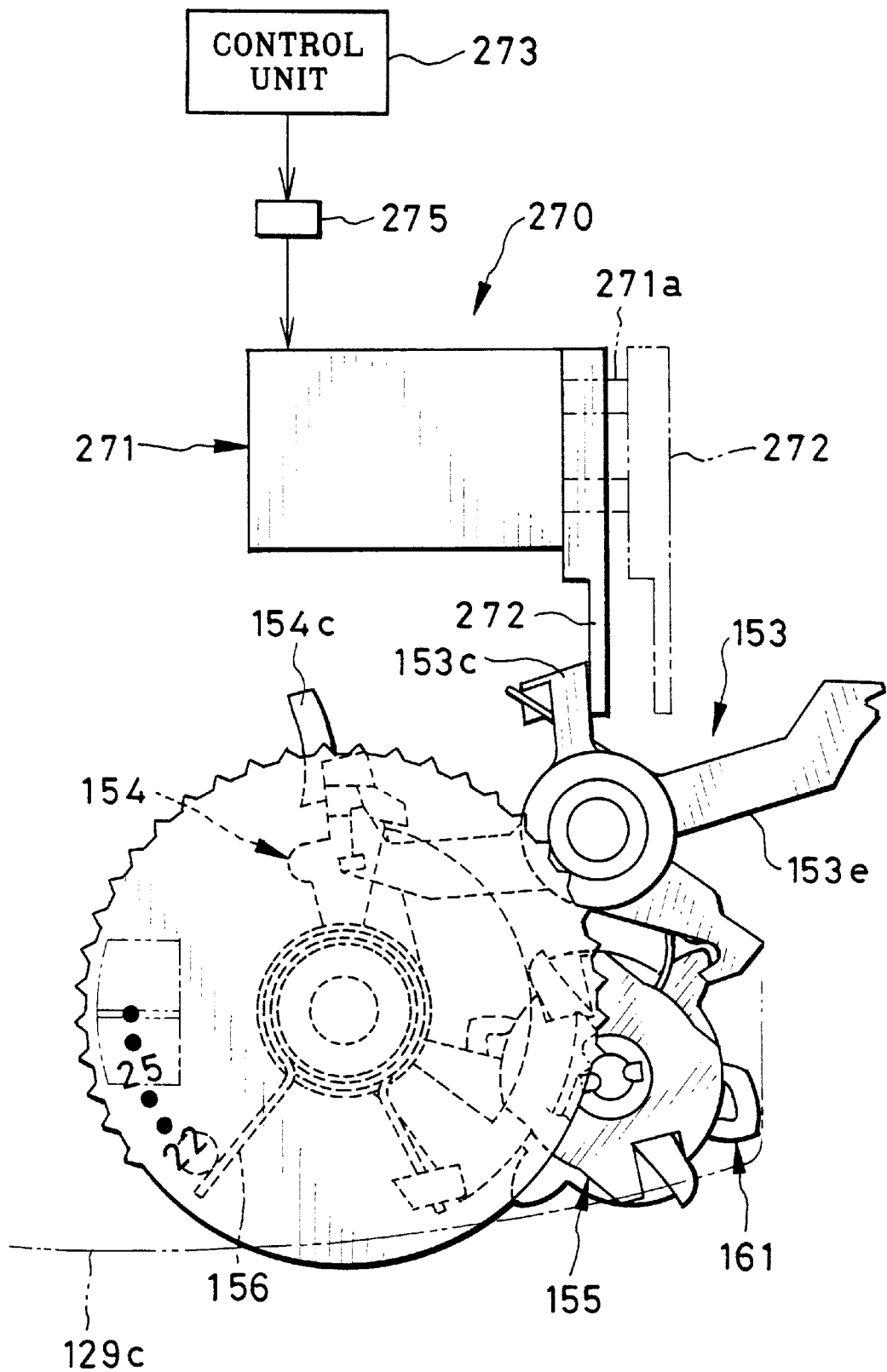
FIG. 30 is an explanatory view in elevation, illustrating a second drive mechanism setter actuated in the counter setting sequence for shifting the shutter drive mechanism to a release position.
Figure 31:
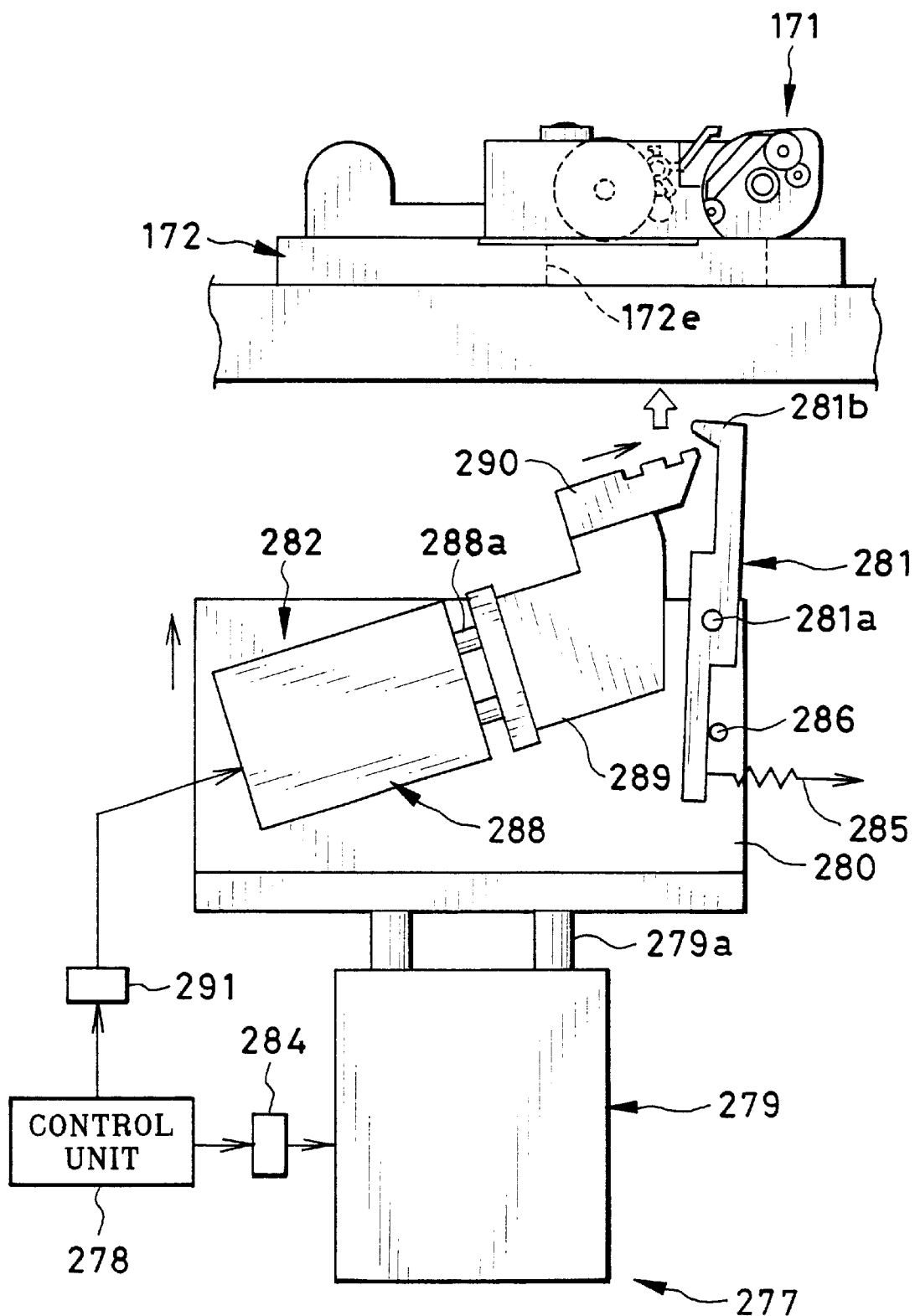
FIG. 31 is an explanatory view in elevation, illustrating a sprocket wheel setter actuated in the counter setting sequence.

In FIGS. 27 and 28, a station for the counter disk rotating process is depicted. For this process, the counter setter device includes a counter setter 259, a photoelectric sensor 260 and a control unit 261. The counter setter 259 rotates the counter disk 152. The photoelectric sensor 260 detects a rotational position of the counter disk 152. The control unit 261 controls the counter setter 259 and the photoelectric sensor 260. The counter setter 259 is constituted by a wheel or drum 262, a motor 263, a support plate 264 and an air cylinder section 265. The wheel 262 contacts a peripheral face of the counter disk 152. The motor 263 rotates the wheel 262. The support plate 264 supports the wheel 262 and the motor 263 secured thereto, is moved by the air cylinder section 265 between a retracted position and an effective position, and when in the retracted position, is located away from the recyclable main body 171, and when in the effective position, causes the wheel 262 to contact the counter disk 152. The wheel 262 is formed from rubber or other material which is soft and has high friction, and causes the counter disk 152 to rotate by frictional contact.

The air cylinder section 265 is a driving section which also may have a structure other than an air cylinder. A plunger 265a is provided with the support plate 264, and when not actuated, is kept located inside the air cylinder section 265 by a spring, and locates the support plate 264 in the retracted position. A driver 267 is caused by the control unit 261 to drive the air cylinder section 265, from which the plunger 265a is protruded against the bias of the spring. The support plate 264 is moved to the effective position. In response to this, a peripheral face of the wheel 262 comes in contact with the peripheral face of the counter disk 152. See FIG. 29. Upon the contact, a driver 268 is caused by the control unit 261 to drive the motor 263. The wheel 262 is rotated in the counterclockwise direction, to cause the counter disk 152 to rotate in the clockwise direction.

While the wheel 262 rotates the counter disk 152, the control unit 261 detects a rotational position of the counter disk 152 by use of the photoelectric sensor 260. The photoelectric sensor 260 is a reflection type constituted by a beam projector and a beam receiver, and detects passage of the detection hole 151a of the counter disk 152 by monitoring through the slot 167c of the upper plate 167. When the photoelectric sensor 260 detects the detection hole 151a, the photoelectric sensor 260 sends a detection signal to the control unit 261. When the motor 263 rotates by a predetermined amount after the receipt of the detection signal, the control unit 261 stops the motor 263. While the counter disk 152 is stopped, the first tooth 152d of the retention gear 152a contacts the retention cam 155g. The indicia B is pointed by the slot 167c.

For the process of shutter releasing, the counter setter device includes a drive mechanism setter 270, a moving mechanism (not shown), and a control unit 273. See FIG. 30. The moving mechanism includes for example an air cylinder, a cam mechanism and the like, and moves the drive mechanism setter 270 between a retracted position away from the recyclable main body 171 and an effective position close to the recyclable main body 171. The drive mechanism setter 270 for releasing operation includes an air cylinder section 271 and a release plate 272 or jig, which has a stick shape and secured to a plunger 271a of the air cylinder section 271. As indicated by the phantom line in the drawing, the plunger 271a is biased by a spring in a direction to protrude from the air cylinder section 271. When the air cylinder section 271 is driven, the plunger 271a becomes located inside the air cylinder section 271 against the bias of the spring.

When the moving mechanism moves the drive mechanism setter 270 from the retracted position to the effective position, an end of the release plate 272 is moved into a gap between the release arm 153c and the lock arm 153e of the retainer lever 153 as indicated by the phantom lines in the drawing. A driver 275 is caused by the control unit 273 to drive the air cylinder section 271, to move the plunger 271a to the inside of the air cylinder section 271 as indicated by the solid line. Thus the release arm 153c is pushed by the release plate 272 to rotate the retainer lever 153 in the counterclockwise direction from the retained position to the released position. The shutter drive lever 154 is released from the retention of the retainer lever 153 in the charged position, and thus rotated by the first coil spring 156 from the charged position to the released position in the counterclockwise direction. As illustrated in FIG. 12, the knocker arm 154c knocks the driven projection 158a of the shutter blade 158, which is swung to open and close the shutter opening 129a.

The recyclable main body 171, after the shutter releasing, is transferred to a station for the sprocket wheel rotating process. For the sprocket wheel rotating process, the counter setter device includes a sprocket wheel setter 277 under the pallet 172 and a control unit 278. See FIG. 31. The sprocket wheel setter 277 includes an air cylinder section 279, a support plate 280, a first pusher 281 and a second pusher 282. The support plate 280 is secured to a plunger 279a of the air cylinder section 279. The first pusher 281 and the second pusher 282 are mounted on the support plate 280.

The air cylinder section 279 moves the support plate 280 between an effective position close to the recyclable main body 171 and a retracted position away from the recyclable main body 171. A plunger 279a, when not actuated, is kept located inside the air cylinder section 279 by a spring. A driver 284 is caused by the control unit 278 to drive the air cylinder section 279, from which the plunger 279a is protruded against the bias of the spring. The first pusher 281 includes a pivot 281a and a push projection 281b, and is secured to the support plate 280 in a manner rotatable about the pivot 281a. The push projection 281b has an L-shape. A spring 285 is secured to the rear end of the first pusher 281, and biases the first pusher 281 in the counterclockwise direction. A pin 286 is disposed on the support plate 280 for contacting the first pusher 281 to prevent rotation of the first pusher 281 in spite of the bias of the spring 285.

The second pusher 282 is constituted by an air cylinder section 288, a support arm 289, and a tooth moving plate 290 or jig. The support arm 289 is secured to a plunger 288a of the air cylinder section 288. The tooth moving plate 290 is secured to the support arm 289. The second pusher 282 is disposed with inclination relative to the recyclable main body 171 so as to cause the first or third sprocket tooth 161b of the sprocket wheel 161 without interference with the photo film rail surface 129c. See FIG. 32. The air cylinder section 288 moves the support arm 289 between an effective position close to the recyclable main body 171 and a retracted position away from the recyclable main body 171. The plunger 288a, when not actuated, is kept located inside the air cylinder section 288 by a spring. A driver 291 is caused by the control unit 278 to drive the air cylinder section 288, from which the plunger 288a is protruded against the bias of the spring.

Figure 32:
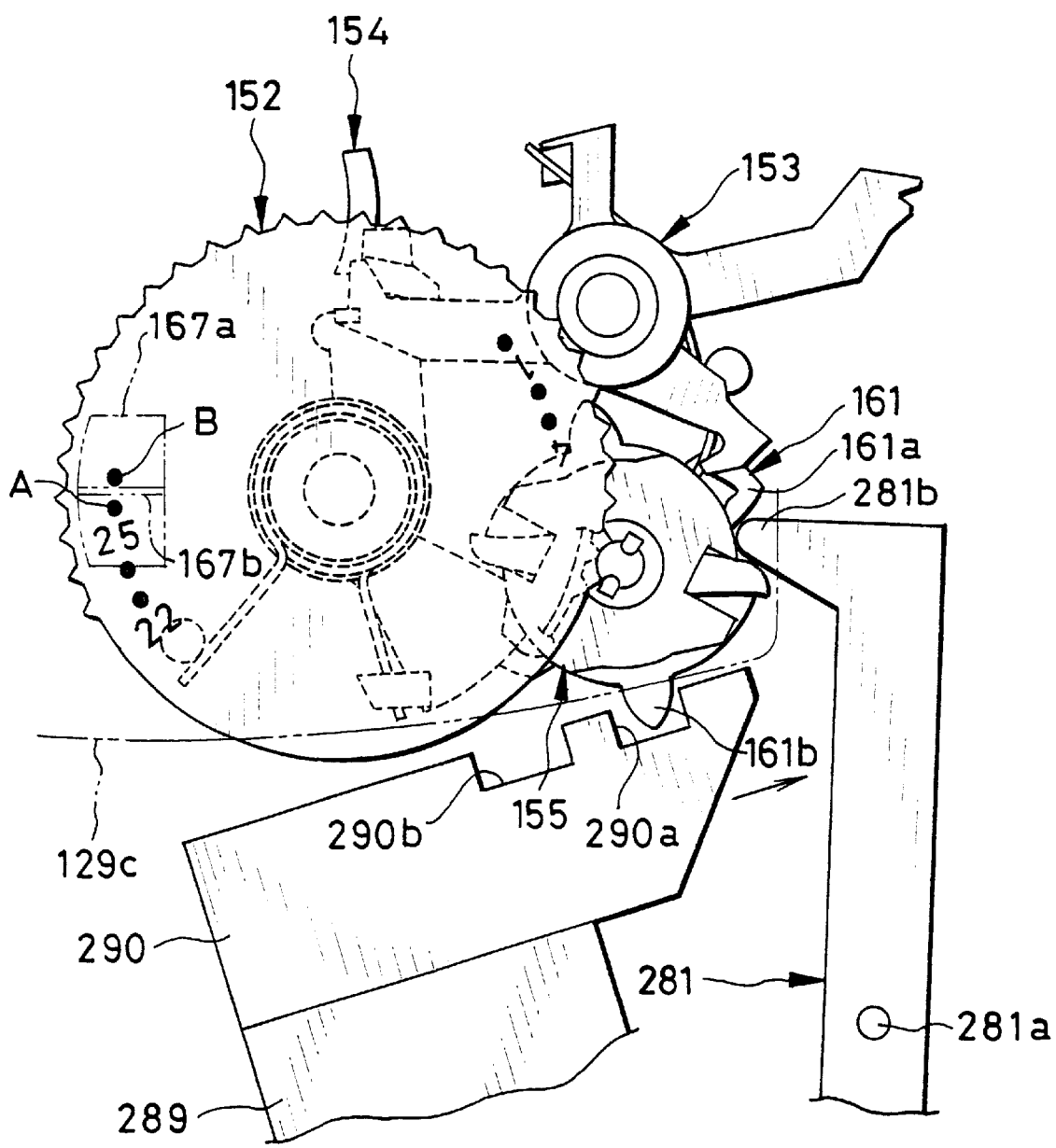
FIG. 32 is an explanatory view in elevation, illustrating the same as FIG. 31 but in which a first pusher with a projection pushes one of the sprocket teeth.

When the air cylinder section 279 is driven by the control unit 278, the support plate 280 moves up to the effective position, to insert the first pusher 281 and the tooth moving plate 290 into the access opening 172e in the pallet 172. In FIG. 32, the push projection 281b of the first pusher 281 inside the access opening 172e pushes the second or fourth sprocket tooth 161a of the sprocket wheel 161 in a region within the photo film rail surface 129c, to cause the sprocket wheel 161 to rotate in the counterclockwise direction. The sprocket wheel 161 rotates to a position where the charge cam protection portion 155c of the cam member 155 contacts the projection portion 154g of the shutter drive lever 154, to cause the first or third sprocket tooth 161b to protrude from the photo film rail surface 129c.

The first or third sprocket tooth 161b protruded from the photo film rail surface 129c is inserted in a notch 290a formed in the tooth moving plate 290. After the air cylinder section 279 is driven for a predetermined period, the control unit 278 drives the air cylinder section 288 of the second pusher 282, to cause the tooth moving plate 290 to project to the right. The portion of the tooth moving plate 290 at the notch 290a pushes the first or third sprocket tooth 161b of the sprocket wheel 161 for rotation in the counterclockwise direction. An end of the tooth moving plate 290 pushes the first pusher 281. The first pusher 281 is rotated in the direction of moving the push projection 281b away from the sprocket wheel 161 against the spring.

Figure 33:
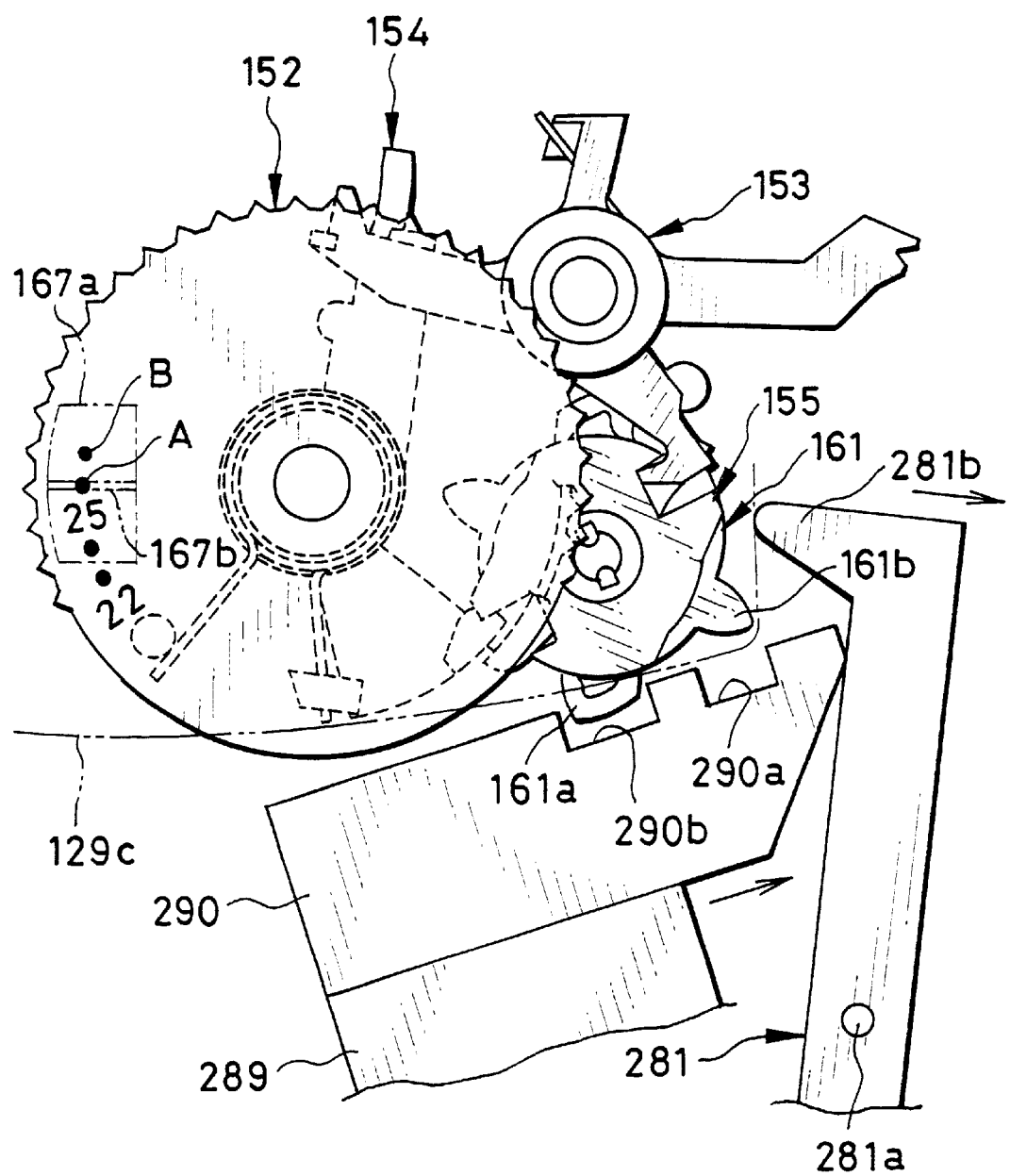
FIG. 33 is an explanatory view in elevation, illustrating the same as FIG. 31 but in which a second pusher with notches pushes a succeeding one of the sprocket teeth.
Figure 34:
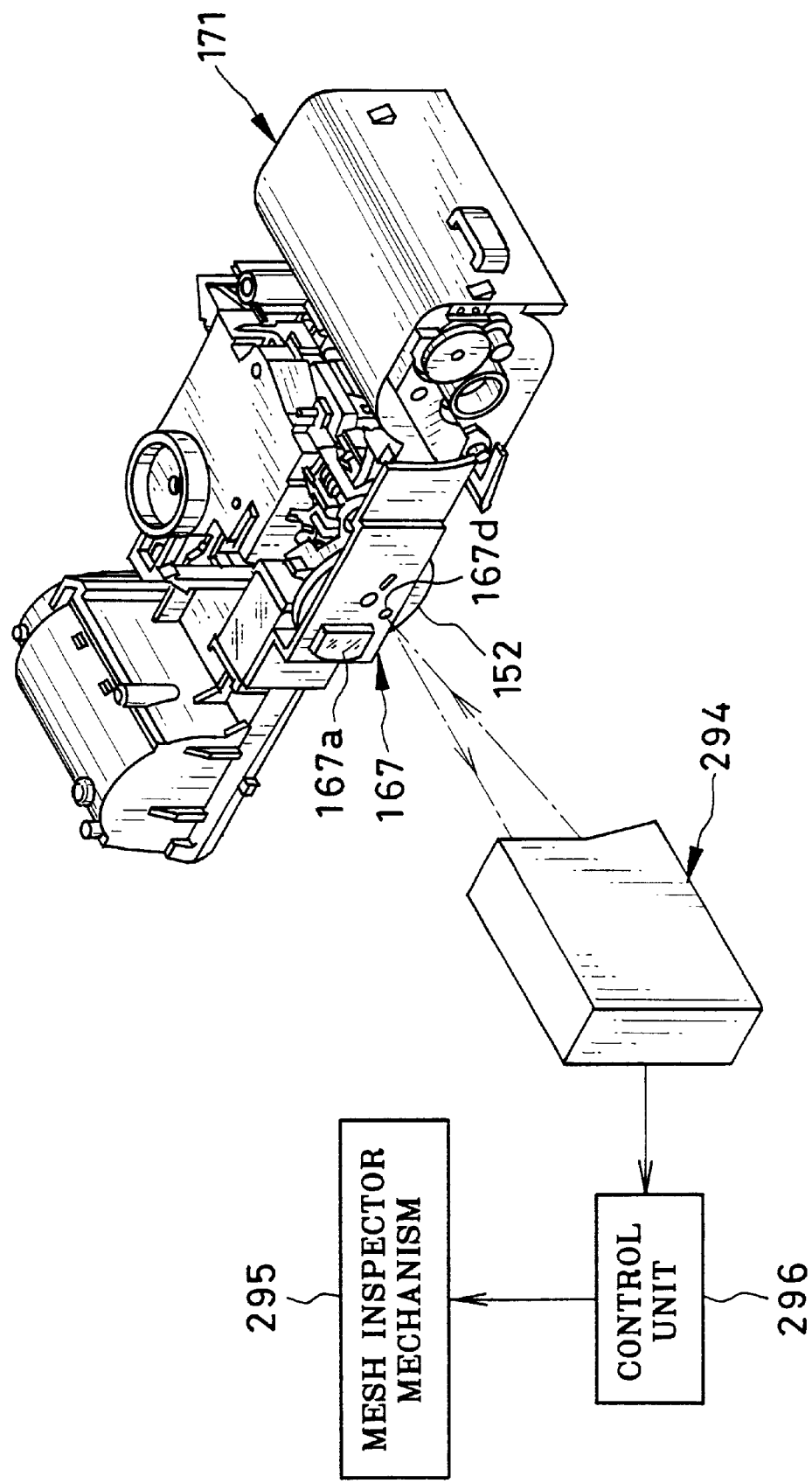
FIG. 34 is an explanatory view in perspective, illustrating the recyclable main body and a mesh inspector mechanism for the sprocket wheel.
Figure 35:
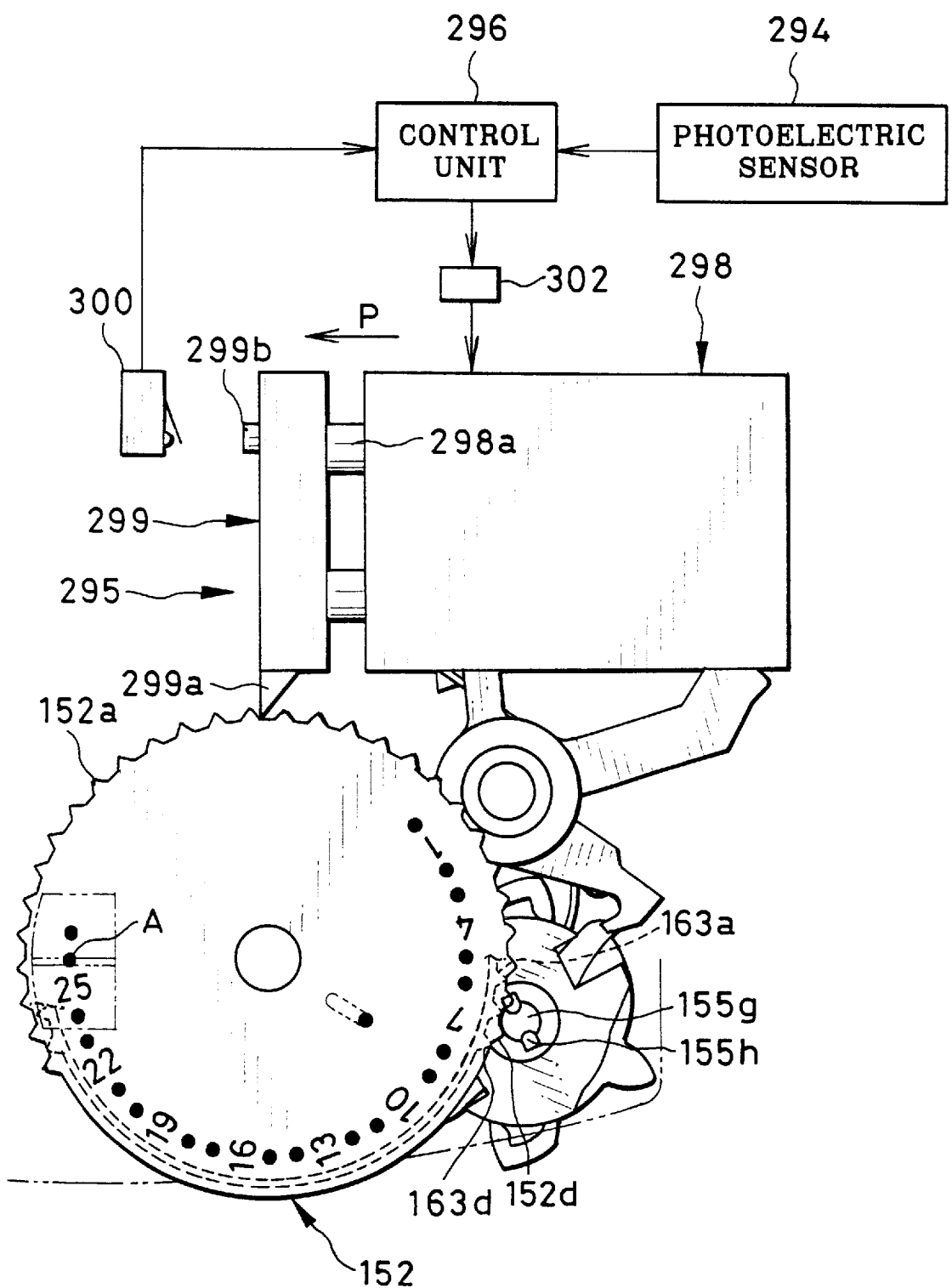
FIG. 35 is an explanatory view in elevation, illustrating the same as FIG. 34.

In FIG. 33, the second or fourth sprocket tooth 161a comes to project from the photo film rail surface 129c. The cam member 155 causes the shutter drive lever 154 and the retainer lever 153 to rotate to charge the shutter mechanism. Another notch 290b is formed in the tooth moving plate 290, and contains the second or fourth sprocket tooth 161a protruded from the photo film rail surface 129c. Thus the tooth moving plate 290 does not interfere with the second or fourth sprocket tooth 161a. The counter drive portion 155a of the cam member 155 causes the retention gear 152a and the stepping tooth train 163a to rotate the counter disk 152 stepwise by one step. In FIG. 13B, the counter disk 152 is set in the initial position where the indicia A is pointed by the pointer 167b. The first pusher 281 and the tooth moving plate 290 do not interfere with the sprocket wheel 161 while returned to their retracted position.

Next to the station for the sprocket wheel rotating process, a station for the second shutter releasing process is disposed with the construction the same as the station for the first shutter releasing process. The retainer lever 153 is forcibly rotated to release the shutter mechanism, which is set in an initial manner. Note that it is possible to use a photoelectric sensor for detection of the movement of the shutter blade 158 in the course of the second shutter releasing process, for the purpose of inspecting normality of the speed and opening amount of the shutter releasing.

The recyclable main body 171 of which the frame counter mechanism has been set to the initial position is transferred to a station for inspection of the frame counter mechanism. In this station, an inspector device includes a reflection type of photoelectric sensor 294, a mesh inspector mechanism 295, a moving mechanism (not shown), and a control unit 296. The moving mechanism moves the mesh inspector mechanism 295. See FIGS. 34 and 35. The mesh inspector mechanism 295 is moved by the moving mechanism between a retracted position away from the recyclable main body 171 and an effective position close to the recyclable main body 171.

The control unit 296 detects a rotational position of the counter disk 152 by use of the photoelectric sensor 294. The photoelectric sensor 294 has a structure the same as that of the photoelectric sensor 260 used in the counter disk rotating process, and detects the detection hole 151a in the counter disk 152 through the hole 167d in the upper plate 167. Upon the detection, the photoelectric sensor 294 sends a detection signal to the control unit 296. If no detection signal is received by the control unit 296, then the control unit 296 determines that the recyclable main body 171 is unacceptable, and sends data of the unacceptability to a control unit in the station for ejection of unacceptable articles.

The mesh inspector mechanism 295 inspects the meshed state between the retention gear 152a of the counter disk 152 and retention cam 155g and that between the stepping tooth train 163a and the drive gear 155h. The mesh inspector mechanism 295 is constituted by an air cylinder section 298, a push plate 299 or jig and a detector switch 300. The air cylinder section 298 is a driving section which also may have a structure other an air cylinder. The push plate 299 is secured to a plunger 298a of the air cylinder section 298. The detector switch 300 is a push type of switch. The plunger 298a, when not actuated, is kept located inside the air cylinder section 298 by a spring. When the air cylinder section 298 is energized, the plunger 298a is protruded with the predetermined force P and against the bias of the spring.

The mesh inspector mechanism 295, when moved to the effective position by the moving mechanism, a push ridge 299a of the push plate 299 comes in contact with the retention gear 152a. A driver 302 is caused by the control unit 296 to drive the air cylinder section 298. The plunger 298a protrudes to the left with predetermined force P of push, so that the push ridge 299a pushes the retention gear 152a. The force P is a value short of starting rotation of the counter disk 152 while the retention gear 152a, the stepping tooth train 163a, the retention cam 155g and the drive gear 155h are in an acceptably meshed state. If the counter disk 152 is rotated upon application of the force P, it is possible to detect failure in the meshed state of the retention gear 152a, the stepping tooth train 163a, the retention cam 155g and the drive gear 155h. Upon rotation of the counter disk 152 with the force P, a projection 299b on the push plate 299 pushes the detector switch 300, which sends a detection signal to the control unit 296. The control unit 296 determines that the recyclable main body 171 is unacceptable, and sends data of the unacceptability to a control unit in the station for ejection of unacceptable articles.

After the inspection of the frame counter mechanism, the recyclable main body 171 is transferred to the ejection station. In the ejection station, the recyclable main body 171 detected as unacceptable in any of the inspecting processes is lifted from the pallet 172 by a P-&-P device comprising a robot hand or the like, and placed in a withdrawing tray in a collective manner. The recyclable main body 171 in the withdrawing tray is conveyed to a part disassembly line, and disassembled into parts to be recycled as raw material.

Then in a transfer process, the cassette shutter closing mechanism and the frame counter mechanism are reset. The recyclable main body 171 detected as acceptable after the various inspections is lifted by the P-&-P device from the pallet 172, and transferred to a conveyor belt connected to an assembly line of lens-fitted photo film units. The recyclable main body 171 in the assembly line is reused as components of new lens-fitted photo film units.

The pallet 172, from which the recyclable main body 171 is removed, is conveyed to a station for a pallet cleaning process. The pallet 172 is subjected to blow of antistatic air, and to air suction, and cleaned by removing dust or unwanted particles dropped from the recyclable main body 171. Then the recyclable main body 171 newly obtained is placed on the pallet 172 in the station for the main body supply process.

In the above embodiment, the various inspections are effected for the main body of the lens-fitted photo film unit to be reused. However an unused main body for a new lens-fitted photo film unit can be inspected according to the above embodiment. In the above embodiment, a conveying amount of the photo film is measured according to a rotating amount of the spool in relation to the cassette shutter closing mechanism. Alternatively the conveying amount of the photo film may be measured according to a counted number of the frame counter mechanism, and a rotating amount of the sprocket wheel.

It is to be noted that the resilient portion 144a retains the speed reduction gear 139 and keeps it from rotating further upon disengagement of the small-diameter gear portion 139b from the one-toothed gear portion 137. The resilient portion 144a, when the small-diameter gear portion 139b comes in mesh with the one-toothed gear portion 137, is deformed resiliently to allow the speed reduction gear 139 to rotate, and to prevent the speed reduction gear 139 and the toothed wheel portion 140 from erroneously rotating even upon a shock or vibration.

Figure 36:
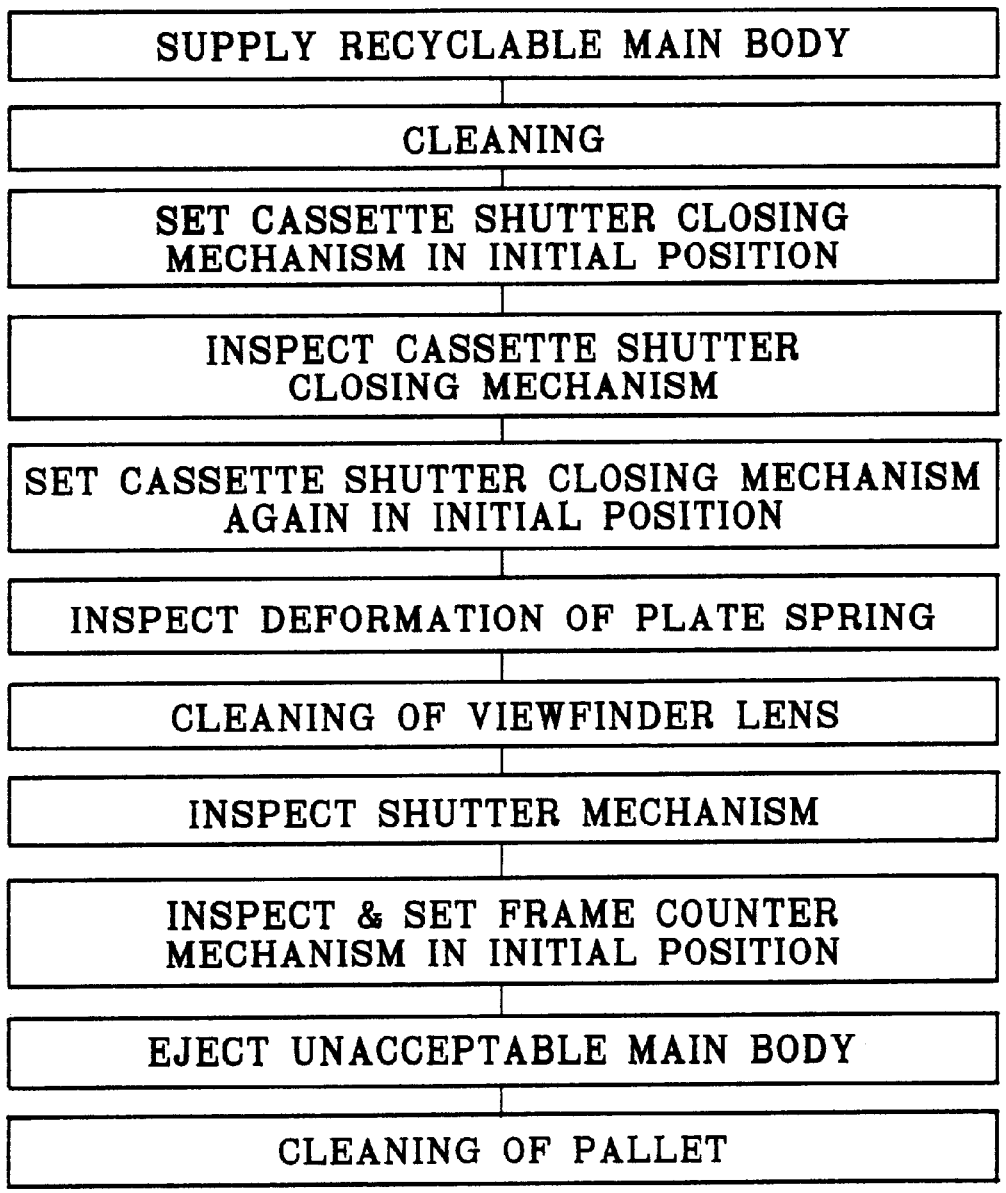
FIG. 36 is a flow chart illustrating another preferred recycling method, in which a shutter mechanism is inspected in the course of the readjustment.

In FIG. 36, another preferred embodiment for inspecting the main body is illustrated, in which a sequence of inspecting the main body includes the cleaning process, the process of setting the cassette shutter closing mechanism, the process of inspecting the cassette shutter closing mechanism, the second process of setting the cassette shutter closing mechanism, the process of inspecting deformation of the plate spring for the speed reduction gear, the process of cleaning the viewfinder lens, a process of inspecting the shutter mechanism, the process of inspecting and initially setting the counter mechanism, the process of ejecting unacceptable articles, and the process of cleaning pallets.

The taking lens 105 is cleaned and inspected, and only if detected acceptable, is reused. The front cover and the rear cover are pelletized, and used as raw material.

Figure 37:
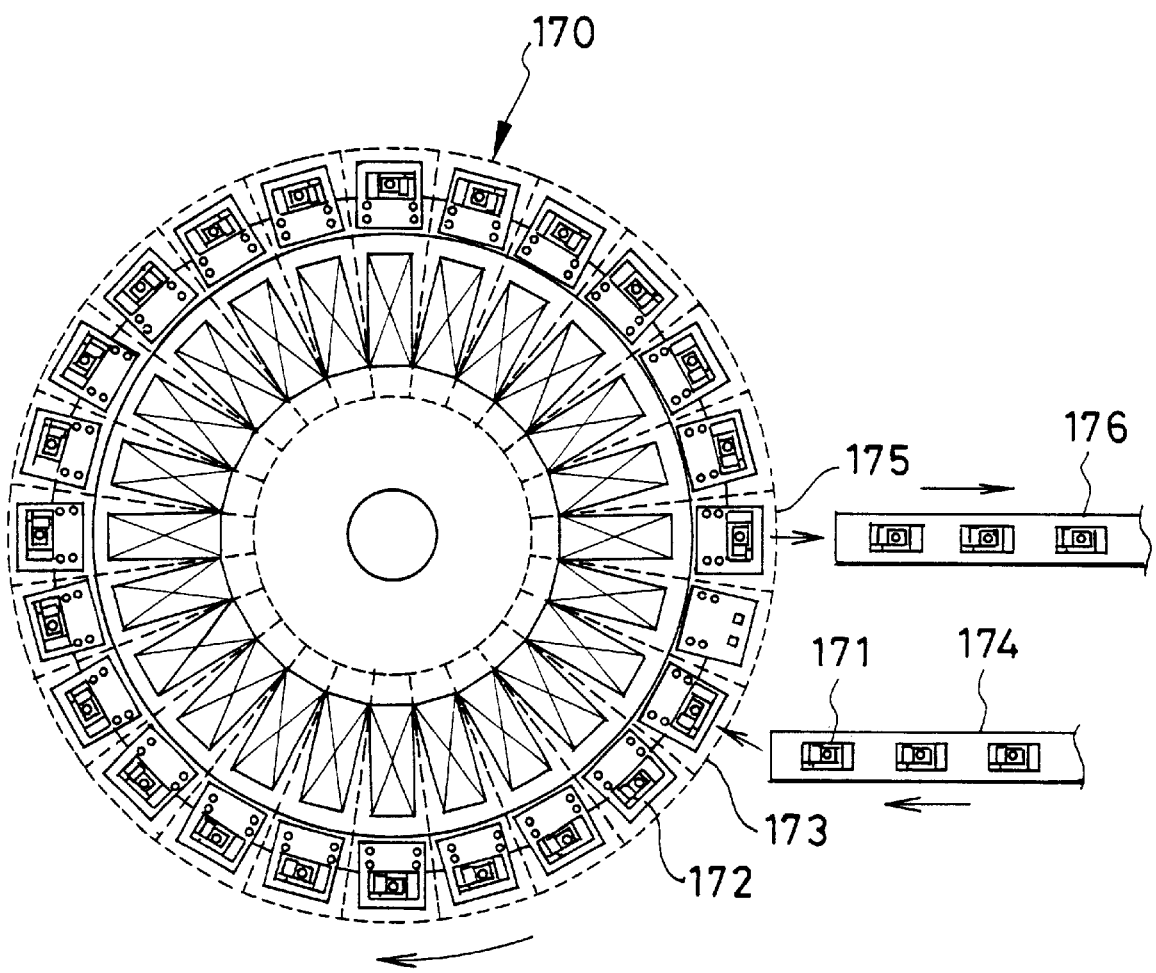
FIG. 37 is an exploded explanatory view in plan, illustrating an indexing table for conveying each recyclable main body on a pallet.

In FIG. 37, an indexing table 170 is disposed to support the various stations. The indexing table 170 intermittently rotates to cause devices to operate in the relevant stations automatically. The pallet 172 on the indexing table 170 supports the recyclable main body 171 in an orientation to direct the taking lens 105 upwards. In a first station 173, the recyclable main body 171 supplied by a supply conveyor belt 174 is transferred to the pallet 172. The pallet 172 is circulated in an endless manner to move past the stations serially for the purpose of the inspections. In a final station 175, the recyclable main body 171 is ejected to an ejection conveyor belt 176. Then the recyclable main body 171 is conveyed from the ejection conveyor belt 176 to an assembly line, to be reused as a component of a new lens-fitted photo film unit.

The recyclable main body 171 supplied to the pallet 172 is positioned in the various stations while oriented to direct the taking lens 105 upwards. In the station for a cleaning process, there is an air blow device or a device for blow of antistatic air. To the recyclable main body 171, this device applies air or antistatic air, to remove dust or unwanted particles, or static charge from the recyclable main body 171.

In the above embodiments, the plate spring 144 associated with the cassette shutter closing mechanism is inspected. However any deformable member incorporated in a lens-fitted photo film unit, such as plastic spring, may be inspected according to the present invention. To be precise, a tension coil spring, a compression coil spring, a torsion coil spring, a plastic retention claw, or the like may be inspected by the construction of the present invention.

In the above embodiments, the frame counter mechanism counts decrementally. However a lens-fitted photo film unit may be provided with a frame counter mechanism which counts incrementally to indicate the number of exposed frames.

In the above embodiments, the counter disk has the train of the numbers as an arithmetic progression of integers with a regular difference of three (3). However a frame counter disk can have a train of numbers in any suitable progression.

Also, a frame counter disk can have a train of numbers without any dots or signs, and can have a train of consecutive integers. Or a frame counter disk can have a train of dots or signs without any numbers. Furthermore, a frame counter disk can have a train of alphabets, any letters or characters.

Another preferred embodiment is now described with reference to FIGS. 38–44, in which a cleaning line is connected after an inspecting line. Elements similar to those of the above embodiments are referred to with identical reference numerals.

Figure 38:
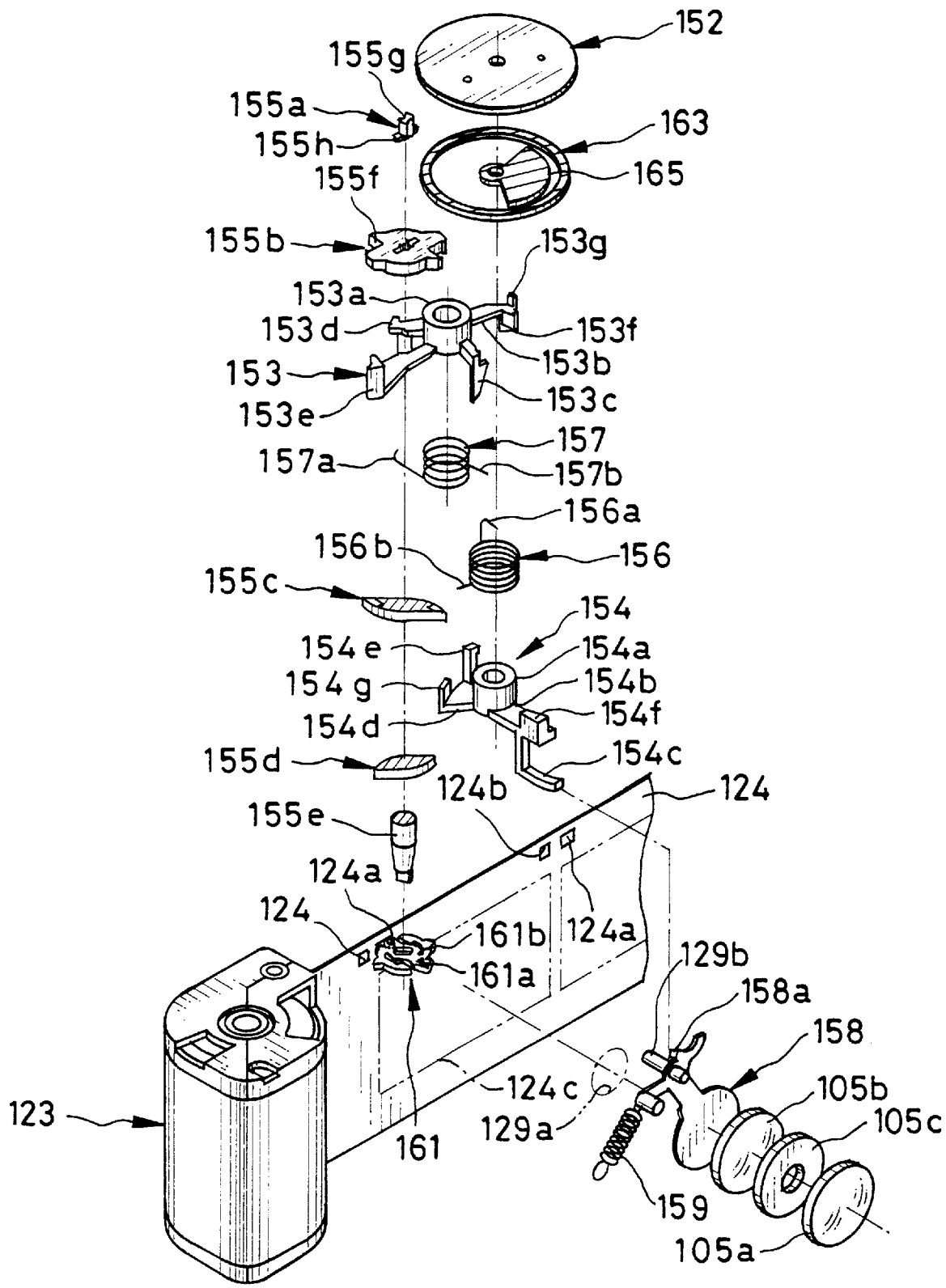
FIG. 38 is a perspective illustrating mechanical parts of a lens-fitted photo film unit with another preferred taking lens.
Figure 42:
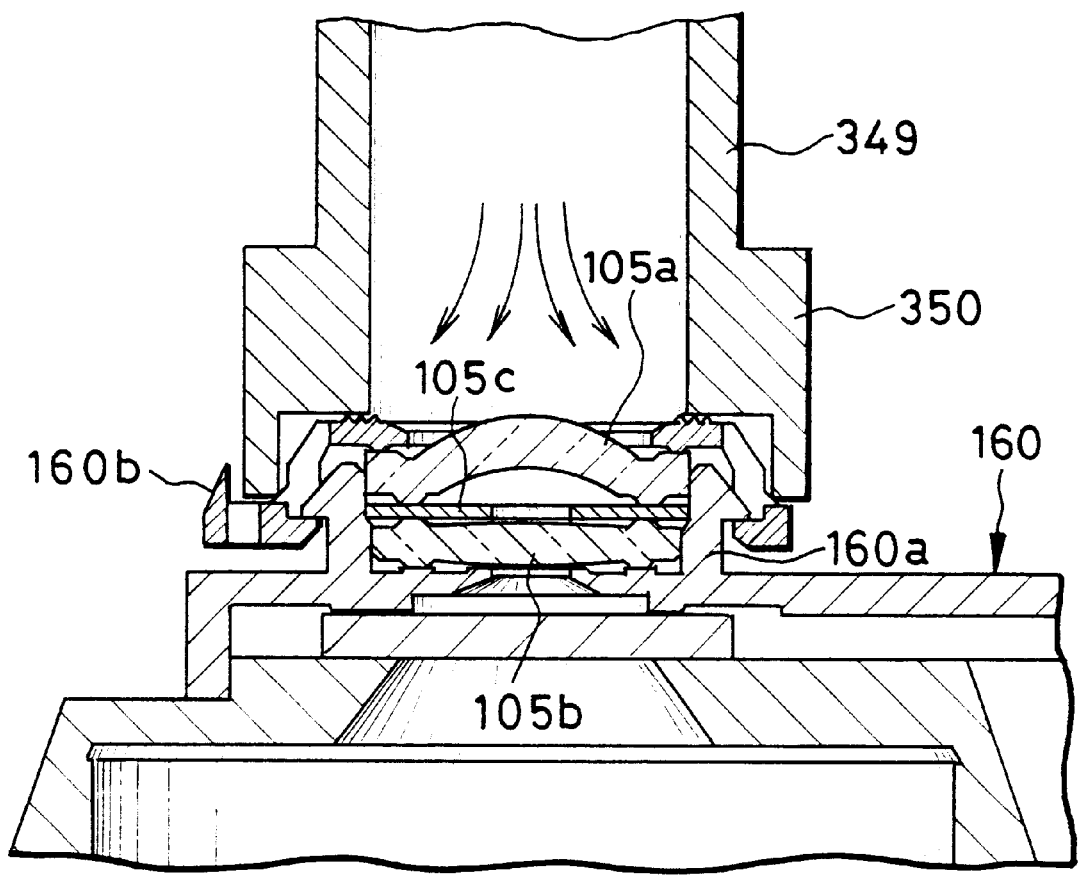
FIG. 42 is an explanatory view in section, illustrating air blow operation in the cleaning of the taking lens.

In FIG. 38, the taking lens 105 consists of a combination of a front lens element 105a and a rear lens element 105b. There is a spacer 105c disposed between the front lens element 105a and the rear lens element 105b. A lens holder ridge 160a of FIG. 42 is formed on the lens-holder/shutter-cover 160, and defines a gap, in which the front lens element 105a, the rear lens element 105b and the spacer 105c are placed. A lens retainer plate is fitted on to them from the objective side and fixed on the lens holder ridge 160a on the light-shielded tunnel 129.

Figure 39:
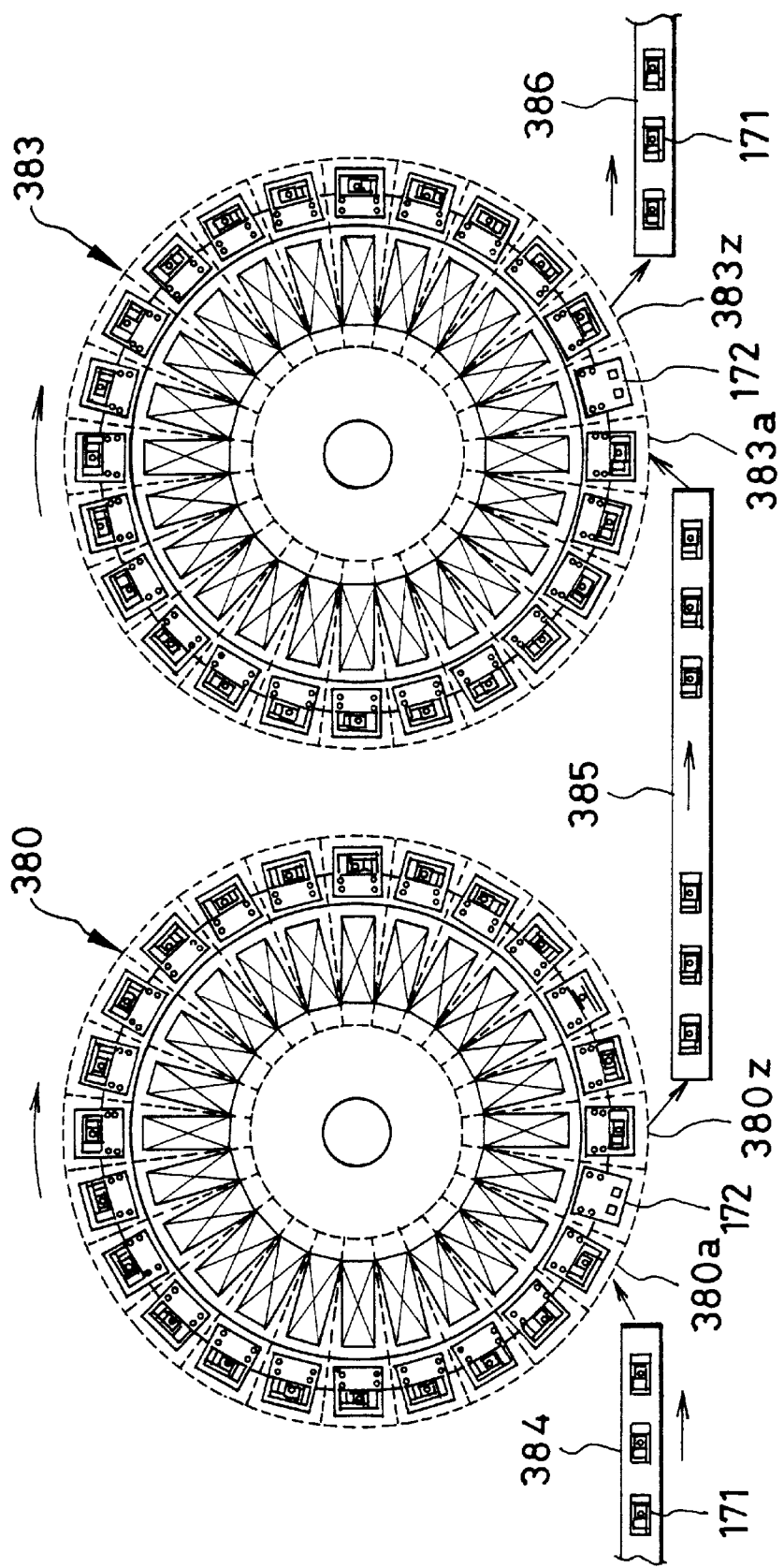
FIG. 39 is an explanatory view in plan, illustrating another preferred embodiment including a readjusting indexing table and a cleaning indexing table.

In FIG. 39, an inspecting/cleaning line for the recyclable main body 171 is constituted by an inspection line 380 or inspection indexing table and a cleaning line 383 or cleaning indexing table. The inspection line 380 is provided with various stations in a concentrated manner for inspecting parts on the recyclable main body 171 such as the cassette shutter closing mechanism and the frame counter mechanism, and for setting the position of those parts in an initialized manner. The cleaning line 383 is provided with various stations in a concentrated manner for cleaning the taking lens 105 or the viewfinder lens 132. In the present embodiment, the inspection line 380 used for the inspection is separate from the cleaning line 383 for the cleaning, which is effective in preventing the inspection from being influenced by dust or particles scattered during the cleaning.

The various devices are arranged along the periphery of the indexing tables of the inspection line 380 and the cleaning line 383. The plural pallets 172 are arranged on the inspection line 380 and the cleaning line 383 in an arc-shaped manner. A conveyor belt 384 conveys the recyclable main body 171, which is transferred from the conveyor belt 384 to the pallet 172 at a first station 380a by a Pick-&-Place (P-&-P) device comprising a robot hand or the like disposed in the first station 380a. The recyclable main body 171 is positioned on the pallet 172 with the taking lens 105 directed upwards. The recyclable main body 171 exits from the inspection line 380 at a final station 380z, and is transferred by a conveyor belt 385 to a first station 383a of the cleaning line 383. After the operation on the cleaning line 383, the recyclable main body 171 exits from the cleaning line 383 at a final station 383z, and is transferred by a conveyor belt 386 to the assembly line in which parts of new lens-fitted photo film units will be assembled.

In the present embodiment, the pitch of the stations is a $1/24$ rotation. But a pitch of the stations is of course changeable.

Figure 40:
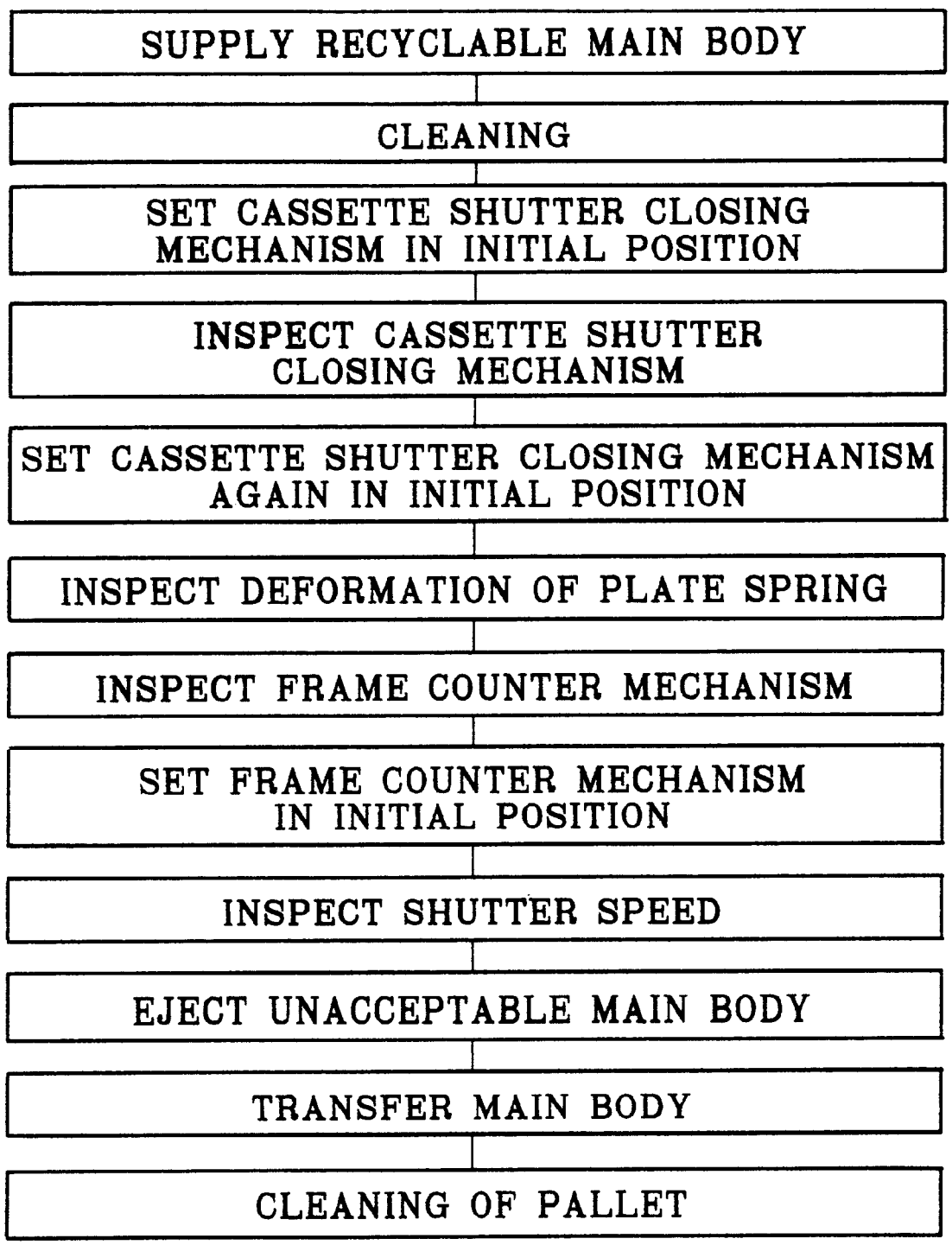
FIG. 40 is a flow chart illustrating a sequence of the inspection and the readjustment.

In FIG. 40, a flow of operations on the inspection line 380 is illustrated. Processes in the flow of the inspection line 380 includes the process of cleaning the recyclable main body, the process of setting the cassette shutter closing mechanism, the process of inspecting the cassette shutter closing mechanism, the second process of setting the cassette shutter closing mechanism, the process of inspecting deformation of the plate spring for the speed reduction gear, the process of initially setting the counter mechanism, the process of inspecting the counter mechanism, a process of inspecting shutter speed of the shutter mechanism, the process of ejecting unacceptable articles, a process of transferring the main body, and the process of cleaning pallets.

Figure 41:
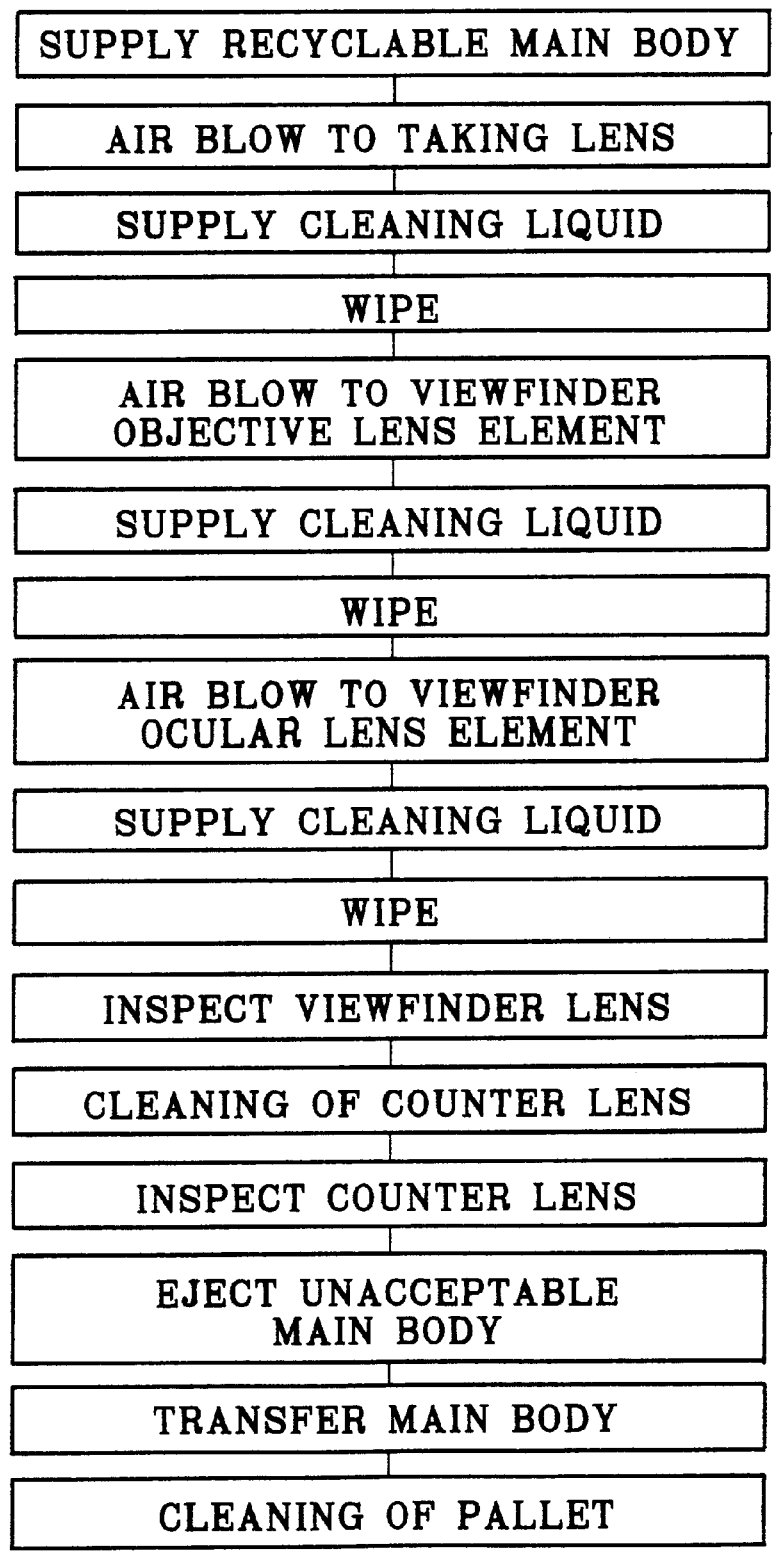
FIG. 41 is a flow chart illustrating a sequence of the cleaning.

In FIG. 41, a flow of various processes at the work stations on the cleaning line 383 is illustrated. The processes as operation of the cleaning line are as follows: air blow to the taking lens 105, supply of the taking lens 105 with cleaning liquid, wiping, air blow to a viewfinder objective lens element, supply of the viewfinder objective lens element with cleaning liquid, wiping, air blow to a viewfinder ocular lens element, supply of the viewfinder ocular lens element with cleaning liquid, wiping, inspection of the viewfinder lens 132, cleaning of the counter lens 167a, inspection of the counter lens 167a, ejection of the recyclable main body 171 being unacceptable, transfer of the recyclable main body 171, and cleaning of the pallet 172.

After the inspection of the frame counter mechanism, the recyclable main body 171 is transferred to a station for inspecting the shutter speed. According to the checked shutter speed, acceptability or unacceptability of the recyclable main body 171 is detected, before the recyclable main body 171 is transferred to the station for ejection of unacceptable articles.

The stations disposed with the cleaning line 383 or the cleaning indexing table are now described. In FIG. 42, a station for blowing air at the taking lens 105 is illustrated which is included in a taking lens cleaner 390 of FIG. 44. An air hose 349 is disposed in a vertically movable manner. A cover 350 or positioning cap is secured to the air hose 349, and covers the top and the periphery of a lens retainer plate 160b. Antistatic air is sent through the air hose 349 and applied toward the inside of the lens retainer plate 160b. An objective surface of the front lens element 105a directed to a photographic field is cleaned by blow of the air to dust while the lens retainer plate 160b remains fixed.

The supply of the taking lens 105 with cleaning liquid is referred to now. Non-woven fabric is used, and is caused to absorb cleaning liquid. The non-woven fabric is pressed on to a surface of the taking lens 105 on the objective side, to supply the taking lens 105 with the cleaning liquid. Note that the taking lens 105 may be directly coated with the cleaning liquid. Or the cleaning liquid may be sprayed or jetted to the taking lens 105.

Figure 43:
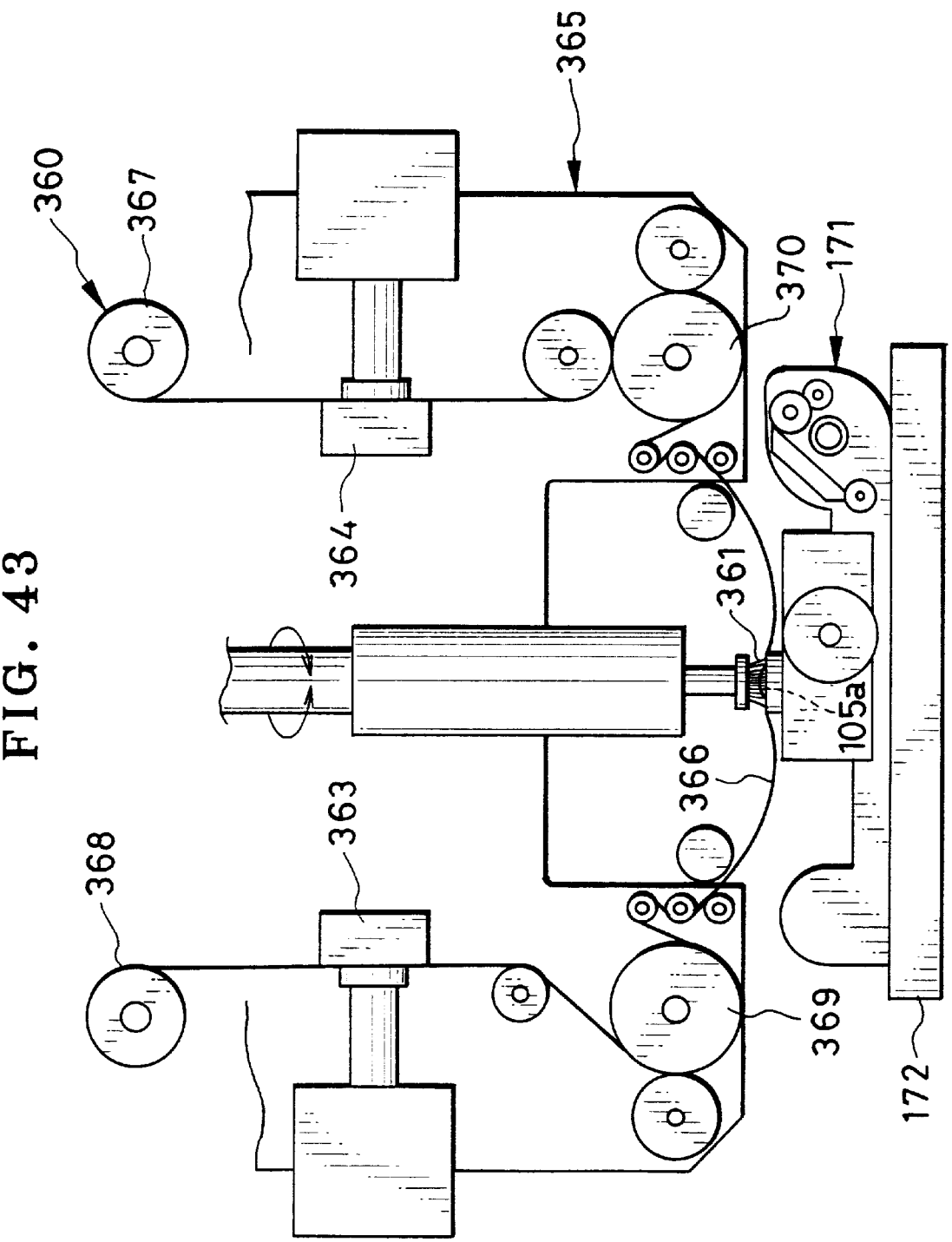
FIG. 43 is a front elevation, partially cutaway, illustrating wiping operation in the taking lens cleaning.

In a station for the wiping process in the taking lens cleaner 390, the recyclable main body 171 is positioned to direct the taking lens 105 upwards. The taking lens 105 is cleaned while the lens retainer plate 160b remains. In FIG. 43, the wiping station is provided with a tape feed unit 360, a cleaning head 361, nipping mechanisms 363 and 364, a cleaner holder plate 365 and a moving mechanism (not shown). The cleaning head 361 has a brush. The cleaner holder plate 365 supports the tape feed unit 360, the cleaning head 361 and the nipping mechanisms 363 and 364. The moving mechanism moves the cleaner holder plate 365 between a cleaning position and a retracted position. The cleaner holder plate 365, when in the cleaning position, presses the cleaning head 361 with a cleaning tape 366 against the front lens element 105a, and when in the retracted position, keeps the cleaning head 361 away from the front lens element 105a upwards. The tape feed unit 360 is constituted by a supply reel 367, a winder reel 368, a tension roller 369 and an advancing roller 370 or a remaining tension roller. The supply reel 367 supplies the cleaning tape 366. The winder reel 368 winds the cleaning tape 366. The tension roller 369 and the advancing roller 370 support the cleaning tape 366 on positions beside the cleaning head 361. Each time that the moving mechanism moves the cleaner holder plate 365 to the cleaning position, the winder reel 368 winds the cleaning tape 366 by a predetermined amount. The tension roller 369 and the advancing roller 370 operate to loosen the cleaning tape 366 beside the cleaning head 361 when the winder reel 368 winds the cleaning tape 366.

The nipping mechanisms 363 and 364 are actuated after the moving mechanism has moved the cleaner holder plate 365 to the cleaning station, and grasp two portions of the cleaning tape 366 between the supply reel 367 and the winder reel 368, to keep the looseness of the cleaning tape 366 unchanged after the loosening operation of the tension roller 369 and the advancing roller 370. The cleaning head 361 is actuated after actuation of the nipping mechanisms 363 and 364, and rotates back and forth in a range smaller than one rotation about the photographing optical axis of the taking lens 105. Thus the cleaning tape 366 is rotated back and forth within the range of the looseness to clean the objective surface of the front lens element 105a.

A viewfinder lens cleaner 392 is now described. In the process of blowing air to a viewfinder objective lens element, antistatic air blown at an objective surface of the objective lens element of the viewfinder lens 132 is directed to a photographic field to remove dust and the like. In the process of supply of cleaning liquid, cleaning liquid is applied to the objective lens element.

In the wiping process, an objective surface of the viewfinder objective lens element is cleaned by a device similar to that in FIG. 43.

In the process of blowing air to the viewfinder ocular lens element, antistatic air is blown at an ocular surface of the ocular lens element of the viewfinder lens 132 to remove dust and the like. The recyclable main body 171 is kept in place while the viewfinder ocular lens element is blown with air through the access opening 172e of the pallet 172. In the process of supply of the viewfinder ocular lens element with cleaning liquid, cleaning liquid is applied to a surface of the viewfinder ocular lens element on the ocular side. In the wiping process, an objective surface of the viewfinder ocular lens element is cleaned through the access opening 172e by a device similar to that in FIG. 43.

A viewfinder lens inspector 394 is operated in the process of inspecting the viewfinder lens 132. A beam projector projects a laser beam as parallel light to the objective lens element in a scanning manner from a photographic field side. A beam receiver is disposed on a side of a viewer's eye, and receives the laser beam passed through the ocular lens element, for inspection of scratch or dirt of the viewfinder lens 132. If the viewfinder lens 132 is a convex lens, the laser beam passed through the viewfinder lens 132 converges upon a certain single point. The beam receiver has a beam receiving surface positioned at this single point, and is also provided with a mask in a region on the beam receiving surface having a focal point. The beam receiver receives only a portion of the laser beam that does not converge upon the focal point but is reflected by scratches or dirt of the viewfinder lens 132. If the beam receiver receives the laser beam, then the main body with the viewfinder lens 132 is detected unacceptable. The information of the unacceptability is sent to the station for ejection of unacceptable articles. Note that it is alternatively possible to use an image recognition apparatus, which may inspect scratches, dirt or the like on an objective surface of the objective lens element or an ocular surface of the ocular lens element.

A counter lens cleaner 396 is operated in the cleaning process for the counter lens 167a. The counter lens 167a is supplied with cleaning liquid, and then cleaned by use of a cleaning tape and a cleaning head.

A station for inspecting the counter lens is provided with a counter lens inspector 398, which includes a pick-up unit, a light source, an image processor, a comparator section, RAM and a discriminator. The light source illuminates a surface of the counter lens 167a by application of light to it. The pick-up unit consists of a CCD (charge coupled device) camera or the like, and picks up light reflected by the counter lens 167a. The image processor retrieves an image being picked up by conversion in the gray scale, and subjects the image to processing of differentiation. Two threshold values are predetermined, one for the brightness difference, and another for the number. The image processor extracts from the image the points where brightness differences are great between adjacent pixels, and the positions where a plural number of points with great brightness differences exist in the vicinity over the predetermined number. In general, if the image retrieved according to the gray scale has a contour with surface dirt or a scratch of the counter lens 167a, a plural number of points with great brightness differences exist in the vicinity over the predetermined number. In case such positions are extracted, it is detected that the counter lens 167a has a scratch, dirt or the like. The information of unacceptability with a scratch, dirt or the like is transmitted of the station for ejection of unacceptable articles.

The recyclable main body 171, if detected acceptable in all of the inspecting stations of the cleaning line, is transferred to an assembly line in a state in which the spacer 105c is separated from the taking lens 105. The recyclable main body 171 is reused as a component of a new lens-fitted photo film units.

In the present embodiment, the cleaning line cleans the taking lens, the viewfinder lens and the counter lens. It is possible that a cleaning line operates to clean only one or two of the taking lens, the viewfinder lens and the counter lens. In particular, the taking lens may be removed in a disassembly line which is connected before the cleaning line. Then a cleaning line can operate to clean only one or both of the viewfinder lens and the counter lens.

It is also possible that the cleaning line 383 is connected before the entirety of the inspection line 380 depicted in FIGS. 16–35.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A lens cleaning method of cleaning a taking lens of a used lens-fitted photo film unit, comprising steps of:

opposing loosened cleaning tape to said taking lens;

causing a cleaning head to press said cleaning tape against said taking lens; and while said cleaning tape is pressed against said taking lens, rotating said cleaning head, to wipe said taking lens with said cleaning tape.

2. A lens cleaning method as defined in claim 1, wherein said cleaning head is rotated back and forth alternately.

3. A lens cleaning method of cleaning a taking lens of a used lens-fitted photo film unit, comprising steps of:

opposing loosened cleaning tape to said taking lens;

causing a cleaning head to press said cleaning tape against said taking lens;

while said cleaning tape is pressed against said taking lens, rotating said cleaning head, to wipe said taking lens with said cleaning tape; and before wiping with said cleaning tape, brushing said taking lens with a brush device.

4. A lens cleaning method as defined in claim 3, wherein said brush device rotates and swings simultaneously.

5. A lens cleaning method as defined in claim 4, further comprising a step of, before wiping with said cleaning tape, supplying said taking lens with cleaning liquid.

6. A lens cleaning apparatus for cleaning a taking lens of a used lens-fitted photo film unit, comprising:

a tape feed unit operable in a conveying step and a cleaning step alternately, said tape feed unit, when in said conveying step, conveying cleaning tape by a predetermined amount, and when in said cleaning step, loosening said cleaning tape within a first section; and a cleaning head for pressing a portion of said cleaning tape against said taking lens and for rotating back and forth alternately when said tape feed unit is in said cleaning step, to wipe said taking lens, said portion being within said first section and opposed to said taking lens.

7. A lens cleaning apparatus as defined in claim 6, wherein said tape feed unit includes:

a first roller disposed upstream from said cleaning head, said cleaning head being supplied with said cleaning tape after contact with said first roller;

a second roller disposed downstream from said cleaning head, said cleaning tape being withdrawn from said cleaning head before contact with said second roller, said first section being defined between said first and second rollers;

a cleaner holder having said first and second rollers and said cleaning head mounted thereon;

a third roller, disposed between said first roller and said cleaning head in a stationary manner, for contacting said cleaning tape;

a fourth roller, disposed between said second roller and said cleaning head in a stationary manner, for contacting said cleaning tape; and a moving mechanism for moving said cleaner holder to a retracted position when in said conveying step, and to a cleaning position when in said cleaning step, wherein said first and second rollers, when said cleaner holder is in said retracted position, are located away from said third and fourth rollers, for contact of said cleaning tape with said third and fourth rollers, and when said cleaner holder is in said cleaning position, are located nearer to said third and fourth rollers, for loosening said cleaning tape.

8. A lens cleaning apparatus as defined in claim 7, wherein said cleaning head is movable on said cleaner holder.

9. A lens cleaning apparatus as defined in claim 8, further comprising:
   a supply reel about which said cleaning tape being unused is wound in a roll form, and which supplies said first roller with said cleaning tape;
   a winder reel for winding said cleaning tape from said second roller in a roll form; and
   a stationary stand for supporting said cleaner holder movably, said stationary stand being provided with said third and fourth rollers mounted thereon.

10. A lens cleaning apparatus as defined in claim 9, further comprising a cleaning liquid supplier for supplying said taking lens with cleaning liquid before said cleaning tape wipes said taking lens.

11. A lens cleaning apparatus as defined in claim 9, wherein said tape feed unit advances said cleaning tape by a predetermined length from said supply reel by movement of said cleaner holder.

12. A lens cleaning apparatus for cleaning a taking lens of a used lens-fitted photo film unit, comprising:
   a tape feed unit operable in a conveying step and a cleaning step alternately, said tape feed unit, when in said conveying step, conveying cleaning tape by a predetermined amount, and when in said cleaning step, loosening said cleaning tape within a first section; and
   a cleaning head for pressing a portion of said cleaning tape against said taking lens and for rotating back and forth alternately when said tape feed unit is in said cleaning step, to wipe said taking lens, said portion being within said first section and opposed to said taking lens
   wherein said tape feed unit includes:
      a first roller disposed upstream from said cleaning head, said cleaning head being supplied with said cleaning tape after contact with said first roller;
      a second roller disposed downstream from said cleaning head, said cleaning tape being withdrawn from said cleaning head before contact with said second roller, said first section being defined between said first and second rollers;
      a cleaner holder having said first and second rollers and said cleaning head mounted thereon;
      a third roller, disposed between said first roller and said cleaning head in a stationary manner, for contacting said cleaning tape;
      a fourth roller, disposed between said second roller and said cleaning head in a stationary manner, for contacting said cleaning tape; and
      a moving mechanism for moving said cleaner holder to a retracted position when in said conveying step, and to a cleaning position when in said cleaning step, wherein said first and second rollers, when said cleaner holder is in said retracted position, are located away from said third and fourth rollers, for contact of said cleaning tape with said third and fourth rollers, and when said cleaner holder is in said cleaning position, are located nearer to said third and fourth rollers, for loosening said cleaning tape, wherein said cleaning head is movable on said cleaner holder;
   a supply reel about which said cleaning tape being unused is wound in a roll form, and which supplies said first roller with said cleaning tape;
   a winder reel for winding said cleaning tape from said second roller in a roll form;
   a stationary stand for supporting said cleaner holder movably, said stationary stand being provided with said third and fourth rollers mounted thereon; and
   a brush device, actuated before wiping with said cleaning head, for moving in contact with said taking lens to brush said taking lens.

13. A lens cleaning apparatus for cleaning a taking lens of a used lens-fitted photo film unit, comprising:
   a tape feed unit operable in a conveying step and a cleaning step alternately, said tape feed unit, when in said conveying step, conveying cleaning tape by a predetermined amount, and when in said cleaning step, loosening said cleaning tape within a first section; and
   a cleaning head for pressing a portion of said cleaning tape against said taking lens and for rotating back and forth alternately when said tape feed unit is in said cleaning step, to wipe said taking lens, said portion being within said first section and opposed to said taking lens
   wherein said tape feed unit includes:
      a first roller disposed upstream from said cleaning head, said cleaning head being supplied with said cleaning tape after contact with said first roller;
      a second roller disposed downstream from said cleaning head, said cleaning tape being withdrawn from said cleaning head before contact with said second roller, said first section being defined between said first and second rollers;
      a cleaner holder having said first and second rollers and said cleaning head mounted thereon;
      a third roller, disposed between said first roller and said cleaning head in a stationary manner, for contacting said cleaning tape;
      a fourth roller, disposed between said second roller and said cleaning head in a stationary manner, for contacting said cleaning tape; and
      a moving mechanism for moving said cleaner holder to a retracted position when in said conveying step, and to a cleaning position when in said cleaning step, wherein said first and second rollers, when said cleaner holder is in said retracted position, are located away from said third and fourth rollers, for contact of said cleaning tape with said third and fourth rollers, and when said cleaner holder is in said cleaning position, are located nearer to said third and fourth rollers, for loosening said cleaning tape, wherein said cleaning head is movable on said cleaner holder;
   a supply reel about which said cleaning tape being unused is wound in a roll form, and which supplies said first roller with said cleaning tape;
   a winder reel for winding said cleaning tape from said second roller in a roll form;
   a stationary stand for supporting said cleaner holder movably, said stationary stand being provided with said third and fourth rollers mounted thereon, wherein said tape feed unit advances said cleaning tape by a predetermined length from said supply reel by movement of said cleaner holder, and wherein said tape feed unit further includes:
- an advancing roller, disposed between said first roller and said supply reel, for contacting said cleaning tape;
- a cam groove, formed in said stationary stand, and having an inclination relative to a moving direction of said cleaner holder;
- a cam lever, having first and second ends, said first end being supported on said cleaner holder rotatably;
- a cam follower pin, disposed on said second end, driven by said cam groove, for rotating in a forward direction about said first end when said cleaner holder moves toward said retracted position; and
- a one-way clutch for connection and disconnection of said first end with a roller shaft of said advancing roller,
- said one-way clutch, when said cam follower pin rotates in said forward direction, transmitting rotation of said first end to said roller shaft to rotate said advancing roller by a predetermined amount, so as to convey said cleaning tape by said predetermined length from said supply reel, and when said cam follower pin rotates in a direction reverse to said forward direction, keeping said roller shaft rotationally free from said first end.

14. A recycling apparatus for a used lens-fitted photo film unit, said lens-fitted photo film unit including:
- a main body, having a cassette holder chamber and a roll holder chamber;
- a cassette shell contained in said cassette holder chamber;
- photo film, previously drawn from said cassette shell, wound in a roll form, and contained in said roll holder chamber;
- a shutter mechanism, mounted in said main body, for providing a frame of said photo film with an exposure;
- a frame counter mechanism, mounted in said main body, having a train of indicia, for counting a frame number by designating a portion of said indicia train each time that said frame is exposed;
- a spool, contained in said cassette shell rotatably, for winding said photo film thereabout;
- a photo film passageway, formed in said cassette shell, for passage of said photo film;
- a cassette shutter, disposed in said photo film passageway rotatably, for closing said photo film passageway openably;
- a cassette shutter closing mechanism, mounted in said main body, for shifting from a shutter opening position to a shutter closing position after said photo film is entirely wound into said cassette shell, said cassette shutter closing mechanism, when in said shutter opening position, keeping said cassette shutter open to allow winding said photo film, and when in said shutter closing position, closing said cassette shutter;

said recycling apparatus comprising:
- a disassembly line for disassembling said lens-fitted photo film unit after removal of said cassette shell with said photo film being exposed, so as to obtain said main body with at least said cassette shutter closing mechanism and said frame counter mechanism;
- a closing mechanism setting device for setting said cassette shutter closing mechanism in said shutter opening position; and
- a counter setting device for setting said frame counter mechanism in an initial position thereof, said frame counter mechanism, when in said initial position, designating an initial one of said indicia in said train.

15. A recycling apparatus as defined in claim 14, wherein said closing mechanism setting device includes:
- a first unit for shifting said cassette shutter closing mechanism to said shutter opening position;
- an inspector unit for inspecting rotation of said cassette shutter closing mechanism toward said shutter closing position from said shutter opening position, wherein said inspector unit, if said rotation is acceptable, judges that said main body is acceptable, and if said rotation is unacceptable, judges that said main body is unacceptable; and
- a second unit, operated for said main body judged acceptable by said inspector unit, for shifting said cassette shutter closing mechanism again to said shutter opening position.

16. A recycling apparatus as defined in claim 14, further comprising an inspector unit for inspecting said frame counter mechanism after said counter setting device sets said frame counter mechanism.

17. A recycling apparatus as defined in claim 14, wherein said cassette shutter closing mechanism includes a cassette shutter closing member engaged with an axial end of said cassette shutter;

said lens-fitted photo film unit further includes:
- a bias member for biasing said cassette shutter closing member toward said shutter closing position;
- a lock lever mounted in said main body in a pivotally movable manner, said lock lever, when in a first position, retaining said cassette shutter closing member in said shutter opening position, and when in a second position, allowing said cassette shutter closing member to rotate to said shutter closing position;
- a detection gear, mounted in said main body, having a toothed wheel portion and a cam wheel portion, said toothed wheel portion being rotated by operation of winding of said photo film by said frame, wherein said cam wheel portion, when offset from a predetermined rotational position, retains said lock lever in said first position, and when in said predetermined rotational position, allows said lock lever to rotate to said second position, said cam wheel portion comes in said predetermined rotational position when all frames of said photo film are wound;

said closing mechanism setting device includes:
- a first setter member for rotating said cassette shutter closing member from said shutter closing position to said shutter opening position against said bias member, so as to open said cassette shutter;
- a second setter member for swinging said lock lever to said first position, to engage said lock lever with said cassette shutter closing member, so as to keep said cassette shutter closing member in said shutter opening position; and
- a third setter member for setting said detection gear in an initial rotational position by rotation thereof, so as to offset said cam wheel portion from said predetermined rotational position.

18. A recycling apparatus as defined in claim 17, wherein a periphery of said toothed wheel portion has a toothed section and a toothless arc-shaped section, said toothed section, when in a predetermined meshing position associated with a first gear rotatable upon winding of said photo film, causes said toothed wheel portion to rotate, said toothless arc-shaped section, upon winding of all frames of said photo film, prevents said toothed wheel portion from rotating further with said first gear;

wherein said third setter member rotates said toothed wheel portion to move said toothless arc-shaped section past said meshing position, so as to set one end of said toothed section in said meshing position, said detection gear thereby being set in said initial rotational position.

19. A recycling apparatus as defined in claim 18, wherein said lens-fitted photo film unit further includes:

a winder wheel, having a shaft portion, a wheel portion and a one-toothed gear portion, said shaft portion being engaged with an axial end of said spool, said wheel portion being externally rotated to wind said photo film about said spool by said frame, and said one-toothed gear portion having a single tooth; and a speed reduction gear, having a great-diameter gear portion and a small-diameter gear portion, said great-diameter gear portion being rotated by said single tooth, said small-diameter gear portion constituting said first gear, for rotating said toothed wheel portion;

wherein said disassembly line removes said winder wheel from said speed reduction gear, then said closing mechanism setting device is actuated.

20. A recycling apparatus as defined in claim 14, wherein said lens-fitted photo film unit further includes:

at least one outer cover fitted outside said main body;

a resilient member mounted in said main body and covered by said outer cover;

further comprising:

a pick-up unit for picking up said resilient member partially uncovered externally after removal of said outer cover from said main body, to obtain shape information representing a shape of said resilient member;

a comparator for effecting comparison to check whether said shape information is within a predetermined acceptable range; and a discriminator for determining that said resilient member is unacceptable if said shape information is outside said acceptable range, so as to discriminate said main body having said resilient member being unacceptable.

21. A recycling apparatus as defined in claim 20, further comprising:

a light source for applying inspecting light to said resilient member;

said pick-up unit for operating in a predetermined pick-up direction to pick up said inspecting light reflected by said resilient member for generating a photoelectric signal, said predetermined pick-up direction being substantially perpendicular to a resiliently deformable direction of said resilient member;

an image processor, operated in accordance with said photoelectric signal, for obtaining an area of a reflection surface of said resilient member having reflected said inspecting light toward said pick-up unit, said reflection surface area constituting said shape information;

if said reflection surface area is smaller than said acceptable range, said discriminator determines that said resilient member is unacceptable.

22. A recycling apparatus as defined in claim 20, wherein said lens-fitted photo film unit includes:

a one-toothed gear, having a single tooth, and rotated by operation of winding of said frame of said photo film; and a speed reduction rear rotated by said single tooth;

said cassette shutter closing mechanism includes a cassette shutter closing member engaged with an axial end of said cassette shutter, and rotated to said shutter closing position by rotating force transmitted by said speed reduction gear;

said resilient member is a plate spring, said plate spring, when said speed reduction gear is disengaged from said single tooth, keeps said speed reduction gear stopped by pressing said speed reduction gear, and when said speed reduction gear is meshed with said single tooth, becomes deformed to allow said speed reduction gear to rotate;

said disassembly line disengages said one-toothed gear from said speed reduction gear before said pick-up unit operates.

23. A recycling apparatus as defined in claim 14, wherein said photo film has a train of perforations;

(A) said lens-fitted photo film unit includes:

a sprocket wheel, mounted in said main body, meshed with said perforations in said photo film, and rotated by a predetermined amount each time that said photo film is moved by said frame;

a charge cam projection portion provided to be integral with said sprocket wheel;

a shutter drive mechanism, mounted in said main body, shiftable between a charge state and a release state, set to said charge state by said charge cam projection portion each time that said photo film moves by said frame, and shifted to said release state in response to a releasing operation, for driving said shutter mechanism;

a drive gear provided to be integral with said sprocket wheel;

(B) said frame counter mechanism includes:

a rotatable counter disk provided with said indicia train on one face thereof;

a stepping tooth train of plural stepping teeth, formed on a periphery of said counter disk, and rotated by said drive gear at a predetermined angle in response to movement of said photo film by said frame, for stepping said indicia train by one;

said stepping tooth train including a first tooth and a final tooth, said first tooth being meshed with said drive gear when said counter disk is in said initial position, and said final tooth is meshed with said drive gear when frames of said photo film are exposed to use up said photo film;

a toothless arc-shaped portion, formed on said periphery of said counter disk and between said final and first teeth, for rendering said counter disk free from said drive gear when opposed to said drive gear;

(C) said counter setting device includes:

a counter setter for rotating said counter disk while said toothless arc-shaped portion is opposed to said drive gear, to cause said first tooth to contact said drive gear;

a sprocket wheel setter for rotating said sprocket wheel by said predetermined amount, to mesh said first tooth with said drive gear by rotation of said drive gear, so as to set said shutter drive mechanism to said charge state; and a first drive mechanism setter for shifting said shutter drive mechanism from said charge state to said release state.

24. A recycling apparatus as defined in claim 23, wherein said lens-fitted photo film unit further includes a sector-shaped lock portion, disposed on said counter disk, retained by a part of said shutter drive mechanism while said shutter dive mechanism is in a release state after all frames of said photo film are wound, for blocking rotation of said counter disk;

further comprising a second drive mechanism setter for setting said shutter drive mechanism to said charge state before said counter setter rotates said counter disk, for releasing said sector-shaped lock portion from being retained.

25. A recycling apparatus as defined in claim 24, further comprising a third drive mechanism setter, operated after said counter setter rotates said counter disk, for shifting said shutter drive mechanism to said release state.

26. A recycling apparatus as defined in claim 25, wherein said shutter drive mechanism includes a shutter drive lever and a retainer lever, and when said shutter drive mechanism is set in said charge state, said retainer lever retains said shutter drive lever, and when said shutter drive mechanism is shifted in said release state, said shutter drive lever is disengaged from said retainer lever, and drives said shutter mechanism; and said first, second and third drive mechanism setters drive said retainer lever.

27. A recycling apparatus as defined in claim 23, wherein said perforation train includes perforation pairs which are arranged at a pitch equal to a pitch of exposing said frame, and each of which has first and second perforations;

said sprocket wheel includes first to fourth sprocket teeth, said third sprocket tooth is rotationally symmetrical to said first sprocket tooth, said fourth sprocket tooth is rotationally symmetrical to said second sprocket tooth, and while said photo film is wound, said first and third perforations come in mesh with said first perforation, and said second and fourth perforations come in mesh with said second perforation;

said sprocket wheel setter includes:
a first pusher for pushing said second or fourth sprocket tooth by moving in a direction crosswise to a periphery of said sprocket wheel, so as to rotate said sprocket wheel in a predetermined rotational direction; and
a second pusher for pushing said third or first sprocket tooth by moving in a direction along a tangent of said sprocket wheel with reference to said predetermined rotational direction, so as to rotate said sprocket wheel further in said predetermined rotational direction.

28. A recycling apparatus as defined in claim 14, wherein said lens-fitted photo film unit further includes a taking lens and a viewfinder lens; and further comprising:
a first cleaning station for cleaning said taking lens;
a second cleaning station for cleaning said viewfinder lens; and
an indexing table for conveying said lens-fitted photo film unit to said first and second cleaning stations.

29. A recycling method for a used lens-fitted photo film unit, said lens-fitted photo film unit including:
a main body, having a cassette holder chamber and a roll holder chamber;
a cassette shell contained in said cassette holder chamber;
photo film, previously drawn from said cassette shell, wound in a roll form, and contained in said roll holder chamber;

a shutter mechanism, mounted in said main body, for providing a frame of said photo film with an exposure;
a frame counter mechanism, mounted in said main body, having a train of indicia, for counting a frame number by designating a portion of said indicia train each time that said frame is exposed;
a spool, contained in said cassette shell rotatably, for winding said photo film thereabout;
a photo film passageway, formed in said cassette shell, for passage of said photo film;
a cassette shutter, disposed in said photo film passageway rotatably, for closing said photo film passageway openably;
a cassette shutter closing mechanism, mounted in said main body, for shifting from a shutter opening position to a shutter closing position after said photo film is entirely wound into said cassette shell, said cassette shutter closing mechanism, when in said shutter opening position, keeping said cassette shutter open to allow winding said photo film, and when in said shutter closing position, closing said cassette shutter;
said recycling method comprising steps of:
disassembling said lens-fitted photo film unit so as to obtain said main body with at least said cassette shutter closing mechanism and said frame counter mechanism;
setting said cassette shutter closing mechanism in said shutter opening position; and
setting said frame counter mechanism in an initial position thereof, said frame counter mechanism, when in said initial position, designating an initial one of said indicia in said train.

30. A recycling method as defined in claim 29, wherein said cassette shutter closing mechanism is engaged with an axial end of said cassette shutter, and rotatable between said shutter opening position and said shutter closing position.

31. A recycling apparatus for a used lens-fitted photo film unit, said lens-fitted photo film unit including a taking lens, a viewfinder lens, and plural mechanical parts, said recycling apparatus comprising:
an inspection line for inspecting operation of said mechanical parts;
a cleaning line for cleaning at least said viewfinder lens; and
a conveyor for conveying said lens-fitted photo film unit between said inspection line and said cleaning line,
wherein said lens-fitted photo film unit further includes:
a main body, having a cassette holder chamber and a roll holder chamber;
a cassette shell contained in said cassette holder chamber;
photo film, previously drawn from said cassette shell, wound in a roll form, and contained in said roll holder chamber;
a spool, contained in said cassette shell rotatably, for winding said photo film thereabout;
a photo film passageway, formed in said cassette shell, for passage of said photo film;
a cassette shutter, disposed in said photo film passageway rotatably, for opening and closing said photo film passageway;
said mechanical parts include:
a shutter mechanism, mounted in said main body, for providing a frame of said photo film with an exposure;

a frame counter mechanism, mounted in said main body, having a train of indicia, for counting a frame number by designating a portion of said indicia train each time that said frame is exposed;

a cassette shutter closing mechanism, mounted in said main body, for shifting from a shutter opening position to a shutter closing position after said photo film is entirely wound into said cassette shell, said cassette shutter closing mechanism, when in said shutter opening position, keeping said cassette shutter open to allow winding said photo film, and when in said shutter closing position, closing said cassette shutter;

further comprising:

a disassembly station for disassembling said lens-fitted photo film unit after removal of said cassette shell with said photo film being exposed, so as to obtain said main body with at least said cassette shutter closing mechanism and said frame counter mechanism;

a closing mechanism setting device for setting said cassette shutter closing mechanism in said shutter opening position;

a first inspector device for inspecting said cassette shutter closing mechanism after said cassette shutter closing mechanism is set in said shutter opening position;

a counter setting device for setting said frame counter mechanism in an initial position thereof, said frame counter mechanism, when in said initial position, designating an initial one of said indicia in said train; and a second inspector device for inspecting said frame counter mechanism after said frame counter mechanism is set in said initial position.

32. A recycling apparatus as defined in claim 31, wherein said lens-fitted photo film unit further includes a counter lens, mounted in said main body, for covering said frame counter mechanism in an externally observable manner and for enlarging an image thereof;

said cleaning line includes:

a first cleaner for cleaning said taking lens;
a second cleaner for cleaning said viewfinder lens;
a first inspector for optically inspecting said viewfinder lens;
a third cleaner for cleaning said counter lens; and
a second inspector for optically inspecting said counter lens.

33. A readjusting apparatus for a used lens-fitted photo film unit, said lens-fitted photo film unit including:

a main body, having a cassette holder chamber and a roll holder chamber;

a cassette shell contained in said cassette holder chamber;

photo film, previously drawn from said cassette shell, wound in a roll form, and contained in said roll holder chamber;

a spool, contained in said cassette shell rotatably, for winding said photo film thereabout;

a photo film passageway, formed in said cassette shell, for passage of said photo film;

a cassette shutter, disposed in said photo film passageway rotatably, for closing said photo film passageway openably;

a cassette shutter closing member, disposed in said main body rotatably, and engaged with an axial end of said cassette shutter, said cassette shutter closing member, when in a shutter opening position, keeping said cassette shutter open, and when in a shutter closing position, closing said cassette shutter;

a bias member for biasing said cassette shutter closing member toward said shutter closing position;

a lock lever mounted in said main body in a pivotally movable manner, said lock lever, when in a first position, retaining said cassette shutter closing member in said shutter opening position, and when in a second position, allowing said cassette shutter closing member to rotate to said shutter closing position;

a detection gear, mounted in said main body, having a toothed wheel portion and a cam wheel portion, said toothed wheel portion being rotated by operation of winding of said photo film by a frame, wherein said cam wheel portion, when offset from a predetermined rotational position, retains said lock lever in said first position, and when in said predetermined rotational position, allows said lock lever to rotate to said second position, said cam wheel portion comes in said predetermined rotational position when all frames of said photo film are wound;

said readjusting apparatus comprising:

a first setter member for rotating said cassette shutter closing member from said shutter closing position to said shutter opening position against said bias member, so as to open said cassette shutter;

a second setter member for swinging said lock lever to said first position, to engage said lock lever with said cassette shutter closing member, so as to keep said cassette shutter closing member in said shutter opening position; and a third setter member for setting said detection gear in an initial rotational position by rotation thereof, so as to offset said cam wheel portion from said predetermined rotational position.

34. A readjusting method for a used lens-fitted photo film unit, said lens-fitted photo film unit including:

a main body, having a cassette holder chamber and a roll holder chamber;

a cassette shell contained in said cassette holder chamber;

photo film, previously drawn from said cassette shell, wound in a roll form, and contained in said roll holder chamber;

a spool, contained in said cassette shell rotatably, for winding said photo film thereabout;

a photo film passageway, formed in said cassette shell, for passage of said photo film;

a cassette shutter, disposed in said photo film passageway rotatably, for closing said photo film passageway openably;

a cassette shutter closing member, disposed in said main body rotatably, and engaged with an axial end of said cassette shutter, said cassette shutter closing member, when in a shutter opening position, keeping said cassette shutter open, and when in a shutter closing position, closing said cassette shutter;

a bias member for biasing said cassette shutter closing member toward said shutter closing position;

a lock lever mounted in said main body in a pivotally movable manner, said lock lever, when in a first position, retaining said cassette shutter closing member in said shutter opening position, and when in a second position, allowing said cassette shutter closing member to rotate to said shutter closing position;

a detection gear, mounted in said main body, having a toothed wheel portion and a cam wheel portion, said toothed wheel portion being rotated by operation of winding of said photo film by a frame, wherein said cam wheel portion, when offset from a predetermined rotational position, retains said lock lever in said first position, and when in said predetermined rotational position, allows said lock lever to rotate to said second position, said cam wheel portion comes in said predetermined rotational position when all frames of said photo film are wound;

said readjusting method comprising steps of:
rotating said cassette shutter closing member from said shutter closing position to said shutter opening position against said bias member, so as to open said cassette shutter;
swinging said lock lever to said first position, to engage said lock lever with said cassette shutter closing member, so as to keep said cassette shutter closing member in said shutter opening position; and
setting said detection gear in an initial rotational position, so as to offset said cam wheel portion from said predetermined rotational position.

35. An inspecting method for a used lens-fitted photo film unit, said lens-fitted photo film unit including:
a main body pre-loaded with photo film;
at least one outer cover fitted outside said main body; and
a resilient member mounted in said main body and covered by said outer cover;
said inspecting method comprising steps of:
picking up said resilient member partially uncovered externally after removal of said outer cover from said main body, to obtain shape information representing a shape of said resilient member;
checking whether said shape information is within a predetermined acceptable range; and
determining that said resilient member is unacceptable if said shape information is outside said acceptable range.

36. An inspecting apparatus for a used lens-fitted photo film unit, said lens-fitted photo film unit including:
a main body pre-loaded with photo film;
at least one outer cover fitted outside said main body; and
a resilient member mounted in said main body and covered by said outer cover;
said inspecting apparatus comprising:
a pick-up unit for picking up said resilient member partially uncovered externally after removal of said outer cover from said main body, to obtain shape information representing a shape of said resilient member;
a comparator for effecting comparison to check whether said shape information is within a predetermined acceptable range; and
a discriminator for determining that said resilient member is unacceptable if said shape information is outside said acceptable range.

37. A readjusting apparatus for a used lens-fitted photo film unit, said lens-fitted photo film unit including:
a main body pre-loaded with photo film, wherein said photo film has a train of perforations;
a shutter mechanism, mounted in said main body, for providing a frame of said photo film with an exposure;
a sprocket wheel, mounted in said main body, meshed with said perforations in said photo film, and rotated by a predetermined amount each time that said photo film is moved by said frame;
a charge cam projection portion provided to be integral with said sprocket wheel;
a shutter drive mechanism, mounted in said main body, shiftable between a charge state and a release state, set to said charge state by said charge cam projection portion each time that said photo film moves by said frame, and shifted to said release state in response to a releasing operation, for driving said shutter mechanism;
a drive gear provided to be integral with said sprocket wheel;
a counter disk, mounted in said main body rotatably, and provided with a train of indicia on one face thereof;
a stepping tooth train of plural stepping teeth, formed on a periphery of said counter disk, and rotated by said drive gear at a predetermined angle in response to movement of said photo film by said frame, for stepping said indicia train by one;
said stepping tooth train including a first tooth and a final tooth, said first tooth being meshed with said drive gear when said counter disk is in said initial position, and said final tooth is meshed with said drive gear when frames of said photo film are exposed to use up said photo film;
a toothless arc-shaped portion, formed on said periphery of said counter disk and between said final and first teeth, for rendering said counter disk free from said drive gear when opposed to said drive gear;
said readjusting apparatus comprising:
a counter setter for rotating said counter disk while said toothless arc-shaped portion is opposed to said drive gear, to cause said first tooth to contact said drive gear;
a sprocket wheel setter for rotating said sprocket wheel by said predetermined amount, to mesh said first tooth with said drive gear by rotation of said drive gear, so as to set said shutter drive mechanism to said charge state; and
a first drive mechanism setter for shifting said shutter drive mechanism from said charge state to said release state.

38. A readjusting method for a used lens-fitted photo film unit, said lens-fitted photo film unit including:
a main body pre-loaded with photo film, wherein said photo film has a train of perforations;
a shutter mechanism, mounted in said main body, for providing a frame of said photo film with an exposure;
a sprocket wheel, mounted in said main body, meshed with said perforations in said photo film, and rotated by a predetermined amount each time that said photo film is moved by said frame;
a charge cam projection portion provided to be integral with said sprocket wheel;
a shutter drive mechanism, mounted in said main body, shiftable between a charge state and a release state, set to said charge state by said charge cam projection portion each time that said photo film moves by said frame, and shifted to said release state in response to a releasing operation, for driving said shutter mechanism;
a drive gear provided to be integral with said sprocket wheel;
a counter disk, mounted in said main body rotatably, and provided with a train of indicia on one face thereof;

a stepping tooth train of plural stepping teeth, formed on a periphery of said counter disk, and rotated by said drive gear at a predetermined angle in response to movement of said photo film by said frame, for stepping said indicia train by one;

said stepping tooth train including a first tooth and a final tooth, said first tooth being meshed with said drive gear when said counter disk is in said initial position, and said final tooth is meshed with said drive gear when frames of said photo film are exposed to use up said photo film;

a toothless arc-shaped portion, formed on said periphery of said counter disk and between said final and first teeth, for rendering said counter disk free from said drive gear when opposed to said drive gear;

said readjusting method comprising steps of:
  rotating said counter disk while said toothless arc-shaped portion is opposed to said drive gear, to cause said first tooth to contact said drive gear;
  rotating said sprocket wheel by said predetermined amount, to mesh said first tooth with said drive gear by rotation of said drive gear, so as to set said shutter drive mechanism to said charge state; and
  shifting said shutter drive mechanism from said charge state to said release state.

39. An inspecting method for a used lens-fitted photo film unit, said lens-fitted photo film unit including:

a main body pre-loaded with photo film;

at least one outer cover fitted outside said main body; and a resilient member mounted in said main body and covered by said outer cover;

said inspecting method comprising steps of:
  picking up said resilient member partially uncovered externally after removal of said outer cover from said main body, to obtain shape information representing a shape of said resilient member;
  checking whether said shape information is within a predetermined acceptable range; and
  determining that said resilient member is unacceptable if said shape information is outside said acceptable range;
  further comprising steps of:
    applying inspecting light to said resilient member;
    wherein said step of picking up includes picking up in a predetermined pick-up direction said inspecting light reflected by said resilient member for generating a photoelectric signal, said predetermined pick-up direction being substantially perpendicular to a resiliently deformable direction of said resilient member;
    obtaining an area of a reflection surface of said resilient member having reflected said inspecting light in said predetermined pick-up direction, said reflection surface area constituting said shape information;
    wherein said determining step includes determining that said resilient member is unacceptable if said reflection surface area is smaller than said acceptable range.

40. An inspecting apparatus for a used lens-fitted photo film unit, said lens-fitted photo film unit including:

a main body pre-loaded with photo film;

at least one outer cover fitted outside said main body; and a resilient member mounted in said main body and covered by said outer cover;

said inspecting apparatus comprising:
  a pick-up unit for picking up said resilient member partially uncovered externally after removal of said outer cover from said main body, to obtain shape information representing a shape of said resilient member;
  a comparator for effecting comparison to check whether said shape information is within a predetermined acceptable range; and
  a discriminator for determining that said resilient member is unacceptable if said shape information is outside said acceptable range;

further comprising a light source for applying inspecting light to said resilient member;

said pick-up unit for operating in a predetermined pick-up direction to pick up said inspecting light reflected by said resilient member for generating a photoelectric signal, said predetermined pick-up direction being substantially perpendicular to a resiliently deformable direction of said resilient member;

an image processor, operated in accordance with said photoelectric signal, for obtaining an area of a reflection surface of said resilient member having reflected said inspecting light toward said pick-up unit, said reflection surface area constituting said shape information;

wherein if said reflection surface area is smaller than said acceptable range, said discriminator determines that said resilient member is unacceptable.

* * * * *